US008869477B2

(12) United States Patent
Ha et al.

(10) Patent No.: US 8,869,477 B2
(45) Date of Patent: *Oct. 28, 2014

(54) FORMED BUILDING MATERIALS

(75) Inventors: Eric Ha, San Jose, CA (US); Guillaume Calas, Campbell, CA (US); Peng Lu, Los Gatos, CA (US); Chris Camire, San Jose, CA (US); William Bourcier, Livermore, CA (US); Treavor Kendall, Menlo Park, CA (US); Irvin Chen, Santa Clara, CA (US); Martin Devenney, Mountain View, CA (US)

(73) Assignee: Calera Corporation, Los Gatos, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/285,534

(22) Filed: Oct. 31, 2011

(65) Prior Publication Data

US 2012/0082839 A1    Apr. 5, 2012

Related U.S. Application Data

(60) Continuation-in-part of application No. 13/191,209, filed on Jul. 26, 2011, now Pat. No. 8,431,100, which is (Continued)

(51) Int. Cl.
*E04C 5/08*    (2006.01)
*E04C 2/02*    (2006.01)

(Continued)

(52) U.S. Cl.
CPC ................ *C04B 22/10* (2013.01); *B28B 17/02* (2013.01); *E01C 5/04* (2013.01);

(Continued)

(58) Field of Classification Search
CPC ............ C04B 7/14; C04B 7/36; C04B 7/364; C04B 7/367; C04B 14/00; C04B 18/06; C04B 18/08; C04B 18/162; C04B 22/10; C04B 22/106; B01D 2257/504; B28B 17/02; E01C 5/04; E01C 5/06; E01C 5/065; B32B 13/00; B32B 13/04; B32B 13/08; B32B 17/06; B32B 29/00; E04C 2/02; E04C 2/04; E04C 2/041; E04C 5/08
USPC .......... 52/223.1, 223.6, 223.8, 223.14, 223.4, 52/292, 294, 309.17, 596, 782.1, 791.1, 52/799.1; 95/149, 205; 106/15.05, 463, 106/464, 638, 644, 719, 720, 724, 728, 729, 106/705, 772, 78, 9, 817; 210/652, 702, 210/710, 806; 423/220, 223, 232, 419.1, 423/420.2, 430, 431, 437.1, 438, 439, 441; 428/537.7

See application file for complete search history.

(56) References Cited

U.S. PATENT DOCUMENTS 1,169,766 A    2/1916    Brassert
1,172,930 A    2/1916    Brassert et al.
(Continued)

FOREIGN PATENT DOCUMENTS

AU    2001213118 B2    12/2001
AU    2007100157 A4    4/2007
(Continued)

OTHER PUBLICATIONS

U.S. Appl. No. 60/921,598, filed Apr. 3, 2007, Little et al.
(Continued)

*Primary Examiner* — Joseph Drodge
(74) *Attorney, Agent, or Firm* — Vandana Bansal; Calera Corporation

(57) ABSTRACT

Formed building materials comprising a sequestered $CO_2$ are provided. The building materials of the invention include a composition comprising a carbonate/bicarbonate component. Additional aspects of the invention include methods of making and using the formed building materials.

25 Claims, 14 Drawing Sheets

Pavers: Low clinker mix design

Figure 1:
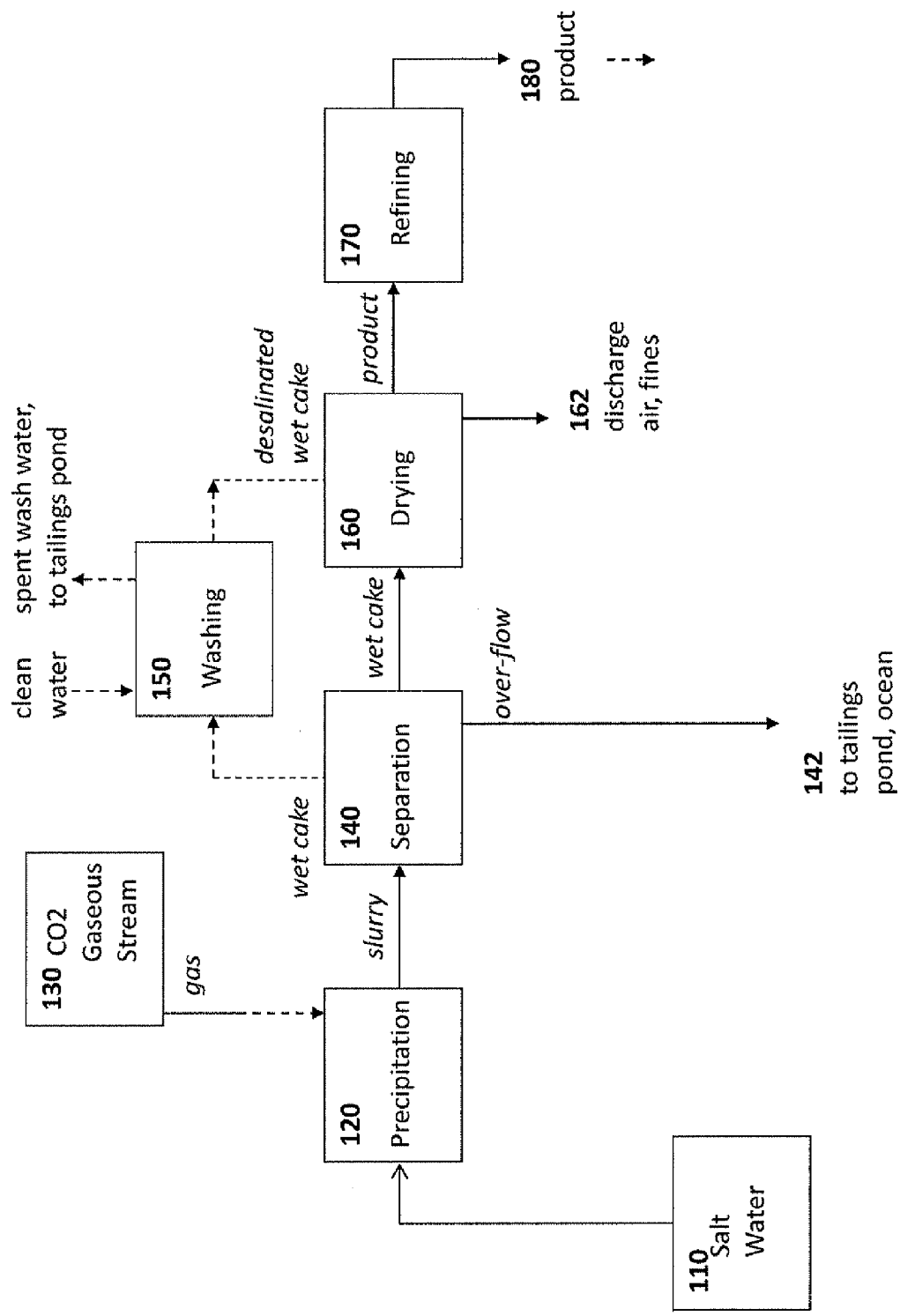

Related U.S. Application Data a division of application No. 12/826,209, filed on Jun. 29, 2010, now Pat. No. 8,006,446, which is a continuation of application No. 12/571,398, filed on Sep. 30, 2009, now Pat. No. 7,771,684.

(60) Provisional application No. 61/110,489, filed on Oct. 31, 2008, provisional application No. 61/149,610, filed on Feb. 3, 2009, provisional application No. 61/246,042, filed on Sep. 25, 2009, provisional application No. 61/101,631, filed on Sep. 30, 2008, provisional application No. 61/475,204, filed on Apr. 13, 2011.

(51) Int. Cl.
*E04C 2/04* (2006.01)
*C04B 7/36* (2006.01)
*E01C 13/08* (2006.01)
*C04B 22/10* (2006.01)
*B28B 17/02* (2006.01)
*E01C 5/04* (2006.01)
*E01C 5/06* (2006.01)
*C04B 28/14* (2006.01)
*C04B 111/00* (2006.01)
*C04B 103/00* (2006.01)

(52) U.S. Cl.
CPC ............ *E01C 5/065* (2013.01); *C04B 28/14* (2013.01); *C04B 2111/0062* (2013.01); *B01D 2257/504* (2013.01); *E01C 5/06* (2013.01); *C04B 2103/0086* (2013.01); *C04B 2111/00629* (2013.01); *C04B 2111/00017* (2013.01)
USPC ... 52/223.6; 52/309.17; 52/791.1; 106/15.05; 106/464; 106/638; 423/220; 423/430; 428/537.7

(56) References Cited

U.S. PATENT DOCUMENTS

| | | |
|---|---|---|
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,273,795 A | 2/1942 | Heise et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,474,381 A | 6/1949 | Sladick |
| 2,606,839 A | 8/1952 | Evans |
| 2,650,084 A | 8/1953 | White |
| 2,776,132 A | 1/1957 | Pyzel |
| 2,810,450 A | 10/1957 | Hartmann |
| 2,934,419 A | 4/1960 | Cook |
| 2,967,807 A | 1/1961 | Osborne et al. |
| 3,046,152 A | 7/1962 | Tsuneyoshi |
| 3,067,007 A | 8/1962 | Hatch et al. |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Chi-Sun Yang et al. |
| 3,222,267 A | 12/1965 | Tirrell et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,538,036 A | 11/1970 | Frazier et al. |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,912,801 A | 10/1975 | Stephens |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,984,523 A | 10/1976 | Schafer et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,040,852 A | 8/1977 | Jones |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,181,580 A | 1/1980 | Kitayama et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |

(56) References Cited

U.S. PATENT DOCUMENTS

| | | |
|---|---|---|
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,432,175 A | 2/1984 | Smith |
| 4,440,611 A | 4/1984 | Dhar et al. |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,876,097 A | 10/1989 | Autant et al. |
| 4,880,447 A | 11/1989 | Bloch |
| 4,889,633 A | 12/1989 | Pfenninger |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard et al. |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,651 A | 1/1994 | Minayoshi et al. |
| 5,275,794 A | 1/1994 | Luna |
| 5,282,935 A | 2/1994 | Cawlfield et al. |
| 5,318,758 A | 6/1994 | Fujii et al. |
| 5,332,564 A | 7/1994 | Chapnerkar et al. |
| 5,348,712 A | 9/1994 | Marquis et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,455,013 A | 10/1995 | Shibata et al. |
| 5,470,671 A | 11/1995 | Fletcher et al. |
| 5,520,898 A | 5/1996 | Pinnavaia et al. |
| 5,527,387 A | 6/1996 | Anderson et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,587,083 A | 12/1996 | Twardowski |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |
| 5,643,415 A | 7/1997 | Wise et al. |
| 5,676,749 A | 10/1997 | Takagi |
| 5,683,587 A | 11/1997 | Ferrara et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,792,441 A | 8/1998 | Paleologou et al. |
| 5,803,894 A | 9/1998 | Kao et al. |
| 5,833,736 A | 11/1998 | Durham et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,879,948 A | 3/1999 | Van Pelt et al. |
| 5,885,478 A | 3/1999 | Montgomery et al. |
| 5,897,704 A | 4/1999 | Baglin |
| 5,904,829 A | 5/1999 | Foller et al. |
| 5,925,255 A | 7/1999 | Mukhopadhyay |
| 5,958,353 A | 9/1999 | Eyal |
| 5,965,201 A | 10/1999 | Jones, Jr. |
| 5,994,838 A | 11/1999 | Klinedinst et al. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,080,320 A | 6/2000 | von Phul |
| 6,090,197 A | 7/2000 | Vivian et al. |
| 6,129,832 A | 10/2000 | Fuhr et al. |
| 6,139,605 A | 10/2000 | Carnell et al. |
| 6,174,507 B1 | 1/2001 | Wallace et al. |
| 6,180,012 B1 | 1/2001 | Rongved |
| 6,180,074 B1 | 1/2001 | Fourcot et al. |
| 6,186,426 B1 | 2/2001 | Killer |
| 6,190,301 B1 | 2/2001 | Murray et al. |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,228,145 B1 | 5/2001 | Falk-Pedersen et al. |
| 6,235,186 B1 | 5/2001 | Tanaka et al. |
| 6,248,166 B1 | 6/2001 | Solsvik |
| 6,251,255 B1 | 6/2001 | Copping et al. |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,284,208 B1 | 9/2001 | Thomassen |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,824 B1 | 6/2002 | Freeman et al. |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,468,074 B1 | 10/2002 | Wu |
| 6,475,460 B1 | 11/2002 | Max |
| 6,495,013 B2 | 12/2002 | Mazur et al. |
| 6,500,319 B2 | 12/2002 | LaConti et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,589,405 B2 | 7/2003 | Weres et al. |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,676,744 B2 * | 1/2004 | Merkley et al. ............... 106/674 |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |

(56) References Cited

U.S. PATENT DOCUMENTS

| | | |
|---|---|---|
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,147,692 B2 | 12/2006 | Fornai et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,264,704 B2 | 9/2007 | Nevosi et al. |
| 7,273,540 B2 | 9/2007 | Sonoda et al. |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,597,747 B1 | 10/2009 | Nagel |
| 7,628,847 B2 | 12/2009 | Pope et al. |
| 7,674,443 B1 | 3/2010 | Davis |
| 7,699,909 B2 | 4/2010 | Lackner et al. |
| 7,704,369 B2 | 4/2010 | Olah et al. |
| 7,704,370 B2 | 4/2010 | Coustry et al. |
| 7,727,374 B2 | 6/2010 | Jones |
| 7,735,274 B2 | 6/2010 | Constantz et al. |
| 7,736,430 B2 | 6/2010 | Barron et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,842,264 B2 | 11/2010 | Cooper et al. |
| 7,875,163 B2 | 1/2011 | Gilliam et al. |
| 7,875,674 B2 | 1/2011 | Kirkpatrick et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,919,064 B2 | 4/2011 | Kawatra et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,105,558 B2 | 1/2012 | Comrie |
| 8,114,214 B2 | 2/2012 | Constantz et al. |
| 8,137,455 B1 | 3/2012 | Constantz et al. |
| 8,431,100 B2 * | 4/2013 | Constantz et al. ............ 423/220 |
| 8,470,275 B2 | 6/2013 | Constantz et al. |
| 8,603,424 B2 | 12/2013 | Constantz et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0170159 A1 | 9/2003 | Honjo et al. |
| 2003/0188668 A1 | 10/2003 | Bland |
| 2003/0213937 A1 | 11/2003 | Yaniv |
| 2003/0229572 A1 | 12/2003 | Raines et al. |
| 2004/0007476 A1 | 1/2004 | Tennakoon et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0094279 A1 | 5/2004 | Myatt |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 * | 5/2005 | McNulty, Jr. ............... 106/712 |
| 2005/0106110 A1 | 5/2005 | Liu |
| 2005/0112044 A1 | 5/2005 | Kuma et al. |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0194086 A1 | 8/2006 | Hsu |
| 2006/0195002 A1 | 8/2006 | Grandjean et al. |
| 2006/0196836 A1 | 9/2006 | Arakel et al. |
| 2006/0245993 A1 | 11/2006 | Magumbe et al. |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |

(56) References Cited

U.S. PATENT DOCUMENTS

| | | |
|---|---|---|
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0053104 A1 | 3/2008 | Haase et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245012 A1* | 10/2008 | Boisvert et al. .............. 52/408 |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrstra |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1 | 3/2009 | Yang et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0087890 A1 | 4/2009 | Pyle et al. |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1 | 5/2009 | Comrie |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2009/0308760 A1 | 12/2009 | Wei et al. |
| 2009/0317488 A1 | 12/2009 | Mehta et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0024361 A1 | 2/2011 | Schwartzel et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2011/0290156 A1 | 12/2011 | Constantz et al. |
| 2011/0303551 A1 | 12/2011 | Gilliam et al. |
| 2011/0308964 A1 | 12/2011 | Gilliam et al. |
| 2012/0111236 A1 | 5/2012 | Constantz et al. |
| 2012/0213688 A1 | 8/2012 | Constantz et al. |
| 2012/0312697 A1 | 12/2012 | Gilliam et al. |
| 2013/0036945 A1 | 2/2013 | Constantz et al. |
| 2013/0243674 A1 | 9/2013 | Constantz et al. |
| 2014/0041553 A1 | 2/2014 | Constantz et al. |

FOREIGN PATENT DOCUMENTS

| | | |
|---|---|---|
| AU | 2007201171 A1 | 10/2007 |
| AU | 2007101174 A4 | 1/2008 |
| AU | 2008256636 B2 | 12/2008 |
| AU | 2008101140 A4 | 1/2009 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |

(56) References Cited

FOREIGN PATENT DOCUMENTS

| | | |
|---|---|---|
| CA | 2440325 A1 | 1/2003 |
| CA | 2646462 | 9/2007 |
| CA | 2617325 A1 | 11/2007 |
| CA | 2682952 A1 | 10/2008 |
| CA | 2659447 A1 | 12/2008 |
| CN | 1059173 A | 3/1992 |
| CN | 1185989 | 7/1998 |
| CN | 1369576 A | 9/2002 |
| CN | 1220793 C | 9/2005 |
| CN | 101219330 A | 7/2008 |
| CN | 101240426 A | 8/2008 |
| CN | 101250711 A | 8/2008 |
| CN | 101289200 A | 10/2008 |
| CN | 101990523 A | 3/2011 |
| CN | 102335553 A | 2/2012 |
| DE | 2653649 A1 | 6/1978 |
| DE | 3146326 A1 | 6/1983 |
| DE | 3638317 A1 | 6/1987 |
| DE | 19512163 A1 | 10/1995 |
| DE | 19523324 A1 | 3/1996 |
| DE | 19631794 A1 | 8/1997 |
| EP | 0522382 A1 | 1/1993 |
| EP | 0558275 A1 | 9/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 A | 8/2002 |
| JP | 51102357 A1 | 9/1976 |
| JP | 59100280 | 6/1984 |
| JP | 03-020491 A2 | 1/1991 |
| JP | 03-170363 A | 7/1991 |
| JP | 04-317721 A | 11/1992 |
| JP | 7061842 A | 3/1995 |
| JP | 7265688 A | 10/1995 |
| JP | 10287461 A | 10/1998 |
| JP | 10305212 A | 11/1998 |
| JP | 63-312988 A2 | 12/1998 |
| JP | 2000226402 A | 8/2000 |
| JP | 03184892 B2 | 7/2001 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-075717 A | 3/2006 |
| JP | 2006-076825 | 3/2006 |
| JP | 2006-076825 A | 3/2006 |
| JP | 2009279530 A | 12/2009 |
| NL | 7607470 A | 1/1978 |
| RU | 1819854 A1 | 6/1993 |
| WO | WO 93/16216 A1 | 8/1993 |
| WO | WO 94/18119 | 8/1994 |
| WO | WO 96/34997 A1 | 11/1996 |
| WO | WO 99/08778 A1 | 2/1999 |
| WO | WO 99/13967 A1 | 3/1999 |
| WO | WO 2006/009600 A2 | 1/2000 |
| WO | WO 00/10691 A1 | 3/2000 |
| WO | WO 01/07365 A1 | 2/2001 |
| WO | WO 01/96243 A1 | 12/2001 |
| WO | WO 02/00551 A2 | 1/2002 |
| WO | WO 02/085788 A1 | 10/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/008242 A1 | 1/2006 |
| WO | WO 2006/032797 A1 | 3/2006 |
| WO | WO 2006/034339 A1 | 3/2006 |
| WO | WO 2006/036396 A2 | 4/2006 |
| WO | WO 2006/094968 A1 | 9/2006 |
| WO | WO 2006/099599 A2 | 9/2006 |
| WO | WO 2006/113997 A1 | 11/2006 |
| WO | WO 2006/134080 A2 | 12/2006 |
| WO | WO 2007/003013 A1 | 1/2007 |
| WO | WO 2007/016271 A2 | 2/2007 |
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A1 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/052313 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |

(56) References Cited

FOREIGN PATENT DOCUMENTS

| | | |
|---|---|---|
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Avery, G.B. et al. 2006. Carbon isotopic characterization of dissolved organic carbon in rainwater: Terrestrial and marine influences. *Science Direct* 40(39): 7539-7545. Retrieved from the internet on May 20, 2010.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. *Appl. Phys. B.* 5 pages.

Bagotsky, V.S. 2006. Conductive Polymers: Polymers with Ionic Functions. *Fundamentals of Electrochemistry*. Second Edition. New Jersey: John Wiley & Sons. pp. 454-455.

Bauer, C.F., et al. 1981. Identification and Quantitation of Carbonate Compounds in Coal Fly Ash. *American Chemical Society*. 15(7): 783-788.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters*. 387: 287-294.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bommaraju, T.V. et al. 2001. Brine Electrolysis. <http://electrochem.cwru.edu/encycl/art-b01-brine.htm>. Retrieved on Oct. 6, 2010. pp. 1-25.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Ciccs "Aims and Research"; www.nottingham.ac.uk/carbonmanagement/ccs_aims.php 2pp Aug. 3, 2007.

Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.

Dickens, A. et al. 2004. Reburial of fossil organic carbon in marine sediments. *Nature*. 427: 336-339. Retrieved from the internet on May 20, 2010.

Druckenmiller, M. et al., "Carbon sequestration using brine of adjusted pH to form mineral carbonates"; Elsevier; www.elsevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Eldorado Beaverlodge Operation. 1960. *Canadian Mining Journal*. 81(6): 111-138.

"Electrochemical cell", Wikipedia (2009), http:en.wikipedia.org/wiki/Electrochemical_Cell, Nov. 24, 2009, 5 pp.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Eurodia. Bipolar Membrane Electrodialysis. Available online as of 2001.; visited Oct. 6, 2010 at http://www.eurodia.com/html/eb.html.

Fallick, A.E., et al. 1991. A Stable Isotope Study of the Magnesite Deposits Associated with the Alpine-Type Ultramafic Rocks of Yugoslavia. *Economic Geology*. 86: 847-861.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65—Fuel Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

(56) References Cited

OTHER PUBLICATIONS

Gillery et al. Bipolar membrane electrodialysis: the time has finally come! Presented 16th Intl. Forum on Appl. Electrochem; Cleaner Tech.—Challenges and Solutions. Nov. 10-14, 2002. Amelia Island Plantation, FL. 4 pages. Retrieved form the Internet on Aug. 14, 2009. http://www.ameridia.com/html.ebc.html.
Goldberg et al. Jun. 2009. "CO2 Mineral Sequestration Studies in US"; National Energy Technology Laboratory; goldberg@netl.doe.gov; 10pp.
Golden, D.C., et al. 2001. A Simple Inorganic Process for Formation of Carbonates, Magnetite, and Sulfides in Martian Meteorite ALH84001. *American Mineralogist*. 86: 370-375.
Graff "Just Catch—CO2 Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Gregerson, J. 1999. Conquering Corrosion (in concrete). *Building Design & Construction*. 40(8): 50.
Haywood et al., "Carbon dioxide sequestration as stable carbonate minerals—environmental barriers"; Environmental Geology (2001) 41:11-16; Springer-Verlag 2001.
Hassan, A.M. et al. 1989. Corrosion Resistant Materials for Seawater RO Plants. *Desalination*. 74: 157-170.
Hein, J.R. et al. 2006. Methanogen c calc te, $^{13}$C-depleted b valve shells, and gas hydrate from a mud volcano offshore southern Cal forn a. *Geological Society of America*. 34(2): 109-112.
Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.
Holdgate, G.R., et al. 2009. Eocene-Miocene carbon-isotope and floral record from brown coal seams in the Gippsland Basin of southeast Australia. *Global and Planetary Change*. 65: 89-103.
Holze, S. et al. 1994. Hydrogen Consuming Anodes for Energy Saving in Sodium Sulphate Electrolysis. *Chem. Eng. Technol*. 17: 382-389.
Horii, Y. et al. 2007. Novel evidence for natural formation of dioxins in ball clay. *Chemosphere*. 70: 1280-1289.
Horkel, K., et al. 2009. Stable isotopic composition of cryptocrystalline magnesite from deposits in Turkey and Austria. *Geophysical Research Abstracts*. 11. (abstract only).
Horner, G. et al. 2004. Isotope selective analysis of CO2 with tunable diode laser (TDL) spectroscopy in the NIR. *The Analyst*. 129: 772-778.
Huijgen, W.J.J., et al. 2003. Carbon dioxide sequestration by mineral carbonation. ECN-C-03-016; Energy Research Centre of the Netherlands: Petten; pp. 1-42.
Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.
Huijgen, W.J.J., et al. 2005. Mineral CO2 Sequestration by Steel Slag Carbonation. *Environ. Sci. Technol*. 39: 9676-9682.
Huijgen, W.J.J., et al. 2006. Energy Consumption and Net CO2 Sequestration of Aqueous Mineral Carbonation. *Ind. Eng. Chem. Res*. 45: 9184-9194.
Huntzinger, D.N. et al. 2009. A life-cycle assessment of Portland cement manufacturing: comparing the traditional process with alternative technologies. *Journal of Cleaner Production*. 17: 668-675.
Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.
Huntzinger, D.N. et al.,"Carbon Dioxide Sequestration in Cement Kiln Dust through Mineral Carbonation"; Environmental Science & Technology, vol. 43, No. 6 (2009) pp. 1986-1992.
International Search Report dated Sep. 17, 2008 of PCT/US2008/068564.
International Search Report dated Jan. 20, 2009 of PCT/US2007/010032.
International Search Report dated Feb. 19, 2009 of PCT/US08/88242.
International Search Report dated Apr. 13, 2011 of PCT/US10/57821.
International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Mar. 3, 2010 of EP08867440.3.
International Search Report dated May 6, 2010 of EP09716193.9.
International Search Report dated Jun. 22, 2010 of EP08772151.0.
International Search Report dated Dec. 14, 2010 of EP09812408.4.
International Search Report dated Jul. 29, 2010 of EP08873036.1.
International Search Report dated Jan. 4, 2011 of EP09818485.6.
International Search Report dated Apr. 6, 2011 of EP10192919.8.
International Search Report dated May 18, 2011 of EP09812407.6.
International Search Report dated Mar. 11, 2009 of PCT/US2008/088318.
International Search Report dated Apr. 19, 2011 of PCT/US2010/059835.
International Search Report dated Mar. 11, 2009 of PCT/2008/088246.
International Search Report dated Aug. 5, 2009 of PCT/2009/048511.
International Search Report dated Sep. 8, 2009 of PCT/US2009/045722.
International Search Report dated Sep. 17, 2009 of PCT/US2009/050756.
International Search Report dated Sep. 22, 2009 of PCT/US2009/047711.
International Search Report dated Oct. 19, 2009 of PCT/US2009/050223.
International Search Report dated Oct. 30, 2009 of PCT/US09/056573.
International Search Report dated Dec. 14, 2009 of PCT/US09/061748.
International Search Report dated Jan. 4, 2010 of PCT/US09/062795.
International Search Report dated Jan. 13, 2010 of PCT/US09/059135.
International Search Report dated Jul. 7, 2010 of PCT/US10/026880.
International Search Report dated Jul. 9, 2010 of PCT/US10/025970.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.
International Search Report dated Sep. 13, 2010 of PCT/US10/035041.
"Isotopic Signature", Wikipedia (2010), http://en.wikipedia.org/wiki/Isotopic_signature, Apr. 14, 2009, 3 pp.
Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.
Jones. 1996. Principles and Prevention of Corrosion. Second Edition. Lebanon, Indiana: Prentice Hall. pp. 50-52.
Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

(56) References Cited

OTHER PUBLICATIONS

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Kostowskyj et al. 2008. Silver nanowire catalysts for alkaline fuel cells. *International Journal of Hydrogen Energy*. 33: 5773-5778.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Li, et al., "Using Electrolytic Method to Promote $CO_2$ Sequestration in Serpentine by Mineral Carbonation," Journal of China University of Mining and Technology, 36(6), pp. 817-821 (2007) (In Chinese, with English translation).

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Lopez-Capel, E. et al. 2005. Application of simultaneous thermal analysis mass spectrometry and stable carbon isotope analysis in a carbon sequestration study. *Rapid Communications in Mass Spectrometry*. 19: 3192-3198.

Mazrou, S., et al. 1997. Sodium hydroxide and hydrochloric acid generation from sodium chloride and rock salt by electro-electrodialysis. *Journal of Applied Electrochemistry* 27: 558-567.

McCrea, J.M. 1950. On the Isotopic Chemistry of Carbonates and a Paleotemperature Scale. *The Journal of Chemical Physics*. 18(6): 849-857.

Melezhik, V.A., et al. 2001. Palaeoproterozoic magnesite: lithological and isotopic evidence for playa/sabkha environments. *Sedimentology*. 48: 379-397.

Merritt, R.C. 1971. Carbonate Leaching. The Extractive Metallurgy of Uranium: pp. 82-97. Colorado School of Mines Research Institute. Prepared Under Contract with the United States Atomic Energy Commission.

Metz. 2005. IPCC Special Report on Carbon Dioxide Capture and Storage. Cambridge University. p. 324 <http://books.google.com/books?id=HWgRvPUgyvQC&dq=serpentine+olivine+close+by+cement+plant&source=gbs_navlinks_s> viewed Jul. 15, 2011.

Mihalcea, R.M., et al. 1998. Diode-laser absorption measurements of $CO_2$ near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Montes-Hernandez, G. et al.,"Mineral sequestration of $CO_2$ by aqueous carbonation of coal combustion fly-ash." Journal of Hazardous Materials vol. 161 (2009). pp. 1347-1354.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

Mottana, A. et al. 1979. Der grosse Mineralienfuhrer, BLV Verlagsgesellschaft mbH, Munchen, XP002577921, p. 194. (In German with English Translation).

Nayak, V.S. "Nonelectrolytic Production of Caustic Soda and Hydrochloric Acid from Sodium Chloride"; Ind. Eng. Chem. Res. 1996. 35: 3808-3811.

Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Neil, J.R., et al. 1971. C13 and O18 compositions in some freshwater carbonates associated with ultramafic rocks and serpentines: western United States. *Geochimica et Cosmochimica Acta*. 35: 687-697.

Park, A., et al. 2004. $CO_2$ mineral sequestration: physically activated dissolution of serpentine and pH swing process. *Chemical Engineering Science* 59 (22-23): 5241-5247.

Perkins, S. 2004. Sea Change: Carbon Dioxide Imperils Marine Ecosystems. *Science News*. 166(3): 35.

Philp, R.P. 2007. The emergence of stable isotopes in environmental and forensic geochemistry studies: a review. *Environ Chem Lett*. 5:57-66.

Portier et al. 2005. Modeling $CO_2$ solubility in pure water and NaCl-type waters from 0 to 300° C. and from 1 to 300 bar Application to the Utsira Formation at Sleipner. *Chemical Geology*. 217: 187-199.

Power, I.M., et al. 2007. Biologically induced mineralization of dypingite by cyanobacteria from an alkaline wetland near Atlin, British Columbia, Canada. *Geochemical Transactions*. 8: 16 pages.

Quay, P.D., et al. 1992. Oceanic Uptake of Fossil Fuel $CO_2$: Carbon-13 Evidence. *Science*. 256 (5053): 74-79.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of $Fe/CO_2$ fuel cells for $CO_2$ mitigation plus $H_2$ and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Saad, N. et al. 2009. Measurement of Isotopic $CO_2$ in Dissolved Inorganic Carbons of Water Samples from Various Origins Using Wavelength-Scanned Cavity Ring-Down Spectrophotometer. *Geophysical Research Abstracts*. 11. (abstract only).

Sadhwani et al., 2005. "Case Studies on environmental impact of seawater desalination" Science Direct; http://www.sciencedirect.com/science?_ob=ArticleURL&_udi=B6TFX-4HMX97J-3&_u . . . 3pp.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results*. 146: 137-148.

Sakata, M. 1987. Movement and Neutralization of Alkaline Leachate at Coal Ash Disposal Sites. *Environ. Sci. Technol.* 21(8): 771-777.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2011] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (in German with English Translation).

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

(56) References Cited

OTHER PUBLICATIONS

Shaffer, R. 2008. A Devlish Green Angel. *Fast Company.* N127: 92-97.
Sheppard, S.M.F., et al. 1970. Fractionation of Carbon and Oxygen Isotopes and Magnesium between Coexisting Metamorphic Calcite and Dolomite. *Contr. Mineral. and Petrol.* 26. 161-198.
Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.
Sethi, S. et al. 2006. Existing & Emerging Concentrate Minimization & Disposal Practices for Membrane Systems. *Florida Water Resources Journal.* pp. 38, 40, 42, 44, 46, 48.
Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).
Sial, A.N., et al. 2000. Carbon isotope fluctuations in Precambrian carbonate sequences of several localities in Brazil. *An. Acad. Bras. Ci.* 72(4): 539-558.
Skrzypek, G. et al. 2006. $\delta^{13}C$ analyses of calcium carbonate: comparison between the GasBench and elemental analyzer techniques. *Rapid Communications in Mass Spectrometry.* 20: 2915-2920.
Socolow, R. 1997. Fuels Decarbonization and Carbon Sequestration: Report of a Workshop. Center for Energy and Environmental Studies School of Engineering and Applied Science. Princeton University, Princeton, NJ.
Soong, Y. et al. 2004. Experimental and simulation studies on mineral trapping of CO2 with brine. *Energy Conversion and Management.* 45: 1845-1859.
Stanley, S.M., et al. 2002. Low-magnesium calcite produced by coralline algae in seawater of Late Cretaceous composition. *PNAS.* 99(24): 15323-15326.
Tececo Pty Ltd, "Eco-Cement"; www.tececo.com/simple.eco-cement.php; Dec. 29, 2008; 6pp.
Technology for Commercialization of Slag. 1995. *New Technology Japan.* ISSN: 0385-6542. p. 35.
Turner, J.A. 1999. "A Realizable Renewable Energy Future." *Science.* 285 (5428): 687-689.
Uibu, M. et al. "CO2 mineral sequestration in oil-shale wastes from Estonian power production." Journal of Environmental Management vol. 90 (2009). pp. 1253-1260.
Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.
Uliasz-Bochenczyk, A. et al. "Utilization of Carbon Dioxide in Fly Ash and Water Mixtures." Chemical Engineering Research and Design. 2006. 84(A9): 843-846.
Vagin, S.P., et al. 1979. Measurement of the Temperature of Gas Media Containing Carbon Dioxide by the Laser-Probing Method. *Plenum.*
Various authors. 2001. "Calcium Carbonate: From the Cretaceous Period Into the 21st Century." *Birkhauser Verlag,* pp. 1-54. <http://books.google.com/books?id=pbkKGa19k5QC&lpg=PA15&ots=gjUUiWmGIR&dq=vaterite%20limestone&pg=PA54#v=twopage&q&f=true> viewed Jul. 14, 2011.
Wang, W., et al. 2005. Effects of biodegradation on the carbon isotopic composition of natural gas—A case study in the bamianhe oil field of the Jiyang Depression, Eastern China. *Geochemical Journal.* 39(4): 301-309. (abstract) [online] [retrieved on Dec. 29, 2009] <URL: http://www/jstage.jst.go.jp/article/geochemj/39/4/39_301/_article> ab.
Webber, M.E., et al. 2001. In situ combustion measurements of CO2 by use of a distributed-feedback diode-laser sensor near 2.0 μm. *Applied Optics.* 40(6): 821-828.
Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).
Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. Society of Economic Geologists, Inc. 104: 95-112.
Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONT0_06-88_0114.PDF>.
Wright, L.L., et al. 1993. "U.S. Carbon Offset Potential Using Biomass Energy Systems." Water, Air, and Soil Pollution. 70: 483-497.
Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.
Zhang, C.L. et al. 2001. Temperature-dependent oxygen and carbon isotope fractionations of biogenic siderite. *Geochimica et Cosmochimica Acta.* 65(14): 2257-2271.
Amelingmeier. "Aragonit", Roempp, Fachgebiet: Chemie Unterthema: Mineralogie, Geochimie May 2005, Retrieved from the internet: URL: http://www.roempp.com/prod/ [retrieved on Jun. 19, 2012]—with machine English translation.
Amelingmeier. "Vaterit", Roempp, Fachgebiet: Chemie Unterthema: Mineralogie, Geochimie Nov. 2010, Retrieved from the internet: URL: http://www.roempp.com/prod/ [retrieved on Jun. 19, 2012]—with machine English translation.
Calera. "Investors." Vinod Khosla. Calera.com website, available online at least as of Feb. 16, 2012. http://calera.com/index.php/about_us/our_team/investors/.
Combes, et al Preparation, physical-chemical characterisation and cytocompatibility of calcium carbonate cements Biomaterials. Mar. 2006; 27(9):1945-1954.
Constantz, B. "The Risk of Implementing New Regulations on Game-Changing Technology: Sequestering CO2 in the Built Environment" AGU, Sep. 2009; 90(22), Jt. Assem, Suppl., Abstract.
Donnet, et al. Use of seeds to control precipitation of calcium carbonate and determination of seed nature. Langmuir. Jan. 4, 2005;21(1):100-8.
Eloneva et al., "Fixation of CO2 by carbonating calcium derived from blast furnace slag" Energy May 2008 33, pp. 1461-1467.
European search report and opinion dated Dec. 20, 2011 for EP Application No. 09767687.8.
Groteklaes. "Dolomit", Roempp, Fachgebiet: Chemie Unterthema: Mineralogie, Geochimie Feb. 2005, Retrieved from the internet: URL: http://www.roempp.com/prod/ [retrieved on Jun. 19, 2012]—with machine English translation.
Hong, et al. Treatment of Strongly Oxidized Water by Three-cell Electrodialysis Stack. Modern Food Science and Technology. 2005; 21(2):88-90.
International search report and written opinion dated May 28, 2013 for PCT/US2011/023730.
Miller. "Mixing in Some Carbon." NY Times, Mar. 21, 2010. Viewed on Feb. 16, 2012 at http://www.nytimes.com/201 0/03/22/business/energy-environment/22cement.html.
Monteiro, et al. Incorporating carbon sequestration materials in civil infrastructure: A micro and nano-structural analysis. Cement and Concrete Composites. 2013; 40:14-20.
Mufson. "Khosla, Gates put up $100 million for Kior." Washington Post, p. A 12, Oct. 22, 2013.
Shaffer. "The King of Green Investing." Fast Company, Jul. 1, 2008. Viewed on Feb. 16, 2012 at http://www.fastcompany.com/magazine/127/a-devilish-green-angel.html.
St. John. "Vinod Khosla: Carbon-Capturing Cement Worth as Much as GE's Power Plant Business." Greentechmedia, Sep. 15, 2009. Viewed on Feb. 16, 2012 at http://www.greentechmedia.com/greenlight/post/vinod-khosla-carbon-capturing-cement-worthas-much-as-ges-power-plant-busin/.

(56) References Cited

OTHER PUBLICATIONS

Stepkowska, et al. Calcite, Vaterite and Aragonite forming on cement hydration from liquid and gaseous phase. Journal of Thermal Analysis and Calorimetry. 2003; 73:247-269.

Tari, et al. Colloidal processing of calcium carbonate. Ceramics International. 1998; 24:527-532.

Tsuni, et al. Effects of Trace Lanthanum ion on the Stability of Vaterite and Transformation from Vaterite to Calcite in an Aquatic System. Bulletin of The Chemical Society of Japan. 2001; 74(3):479-486.

Wei, et al. High Surface Area Calcium Carbonate: Pore Structural Properties and Sulfation Characteristics, Industrial & Engineering Chemistry Research. 1997; 36(6):2141-2148.

European search report and opinion dated Aug. 4, 2014 for EP Application No. 09810860.8.

Rau, et al. Capturing and sequestering flue-gas CO2 using a wet limestone scrubber. 2nd National Conference on Carbon Sequestration Washington D.C., May 5-8, 2003. http://www.netl.doe.gov/publications/proceedings/03/carbon-seq/pdfs/167.pdf.

\* cited by examiner

Pavers: Low clinker mix design

Time = 0
Vaterite = 95%
Aragonite = 5%
Strength = 0psi

Time = 14 day
**Vaterite = 19%
Aragonite = 81%**
Strength = 2260psi

Time = 28 day
Vaterite = 0%
Aragonite = 100%
Strength = 3300psi

FORMED BUILDING MATERIALS

CROSS-REFERENCE

This application is a continuation-in-part of U.S. patent application Ser. No. 13/191,209, filed 26 Jul. 2011, which is a divisional of U.S. patent application Ser. No. 12/826,209, filed 29 Jun. 2010, now U.S. Pat. No. 8,006,446, which is a continuation of U.S. patent application Ser. No. 12/571,398, filed 30 Sep. 2009, now U.S. Pat. No. 7,771,684, which claims the benefit of U.S. Provisional Patent Application No. 61/110,489, filed 31 Oct. 2008, titled "$CO_2$-Sequestering Formed Building Materials"; U.S. Provisional Patent Application No. 61/149,610, filed 3 Feb. 2009, titled "$CO_2$-Sequestering Formed Building Materials"; U.S. Provisional Patent Application No. 61/246,042, filed 25 Sep. 2009, titled "$CO_2$-Sequestering Formed Building Materials"; and U.S. Provisional Patent Application No. 61/101,631, filed 30 Sep. 2008, titled "$CO_2$ Sequestration," each of which applications is incorporated herein by reference in its entirety. This application further claims the benefit of U.S. Provisional Patent Application No. 61/475,204, filed 13 Apr. 2011, titled "$CO_2$-Sequestering Formed Building Materials," which application is incorporated herein by reference in its entirety.

BACKGROUND

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. $CO_2$ has also been interacting with the oceans driving down the pH toward 8.0. $CO_2$ monitoring has shown atmospheric $CO_2$ has risen from approximately 280 parts per million (ppm) in the 1950s to approximately 380 ppm today, and is expect to exceed 400 ppm in the next decade. The impact of climate change will likely be economically expensive and environmentally hazardous. Reducing potential risks of climate change will require sequestration of $CO_2$.

SUMMARY

Provided herein is a method for producing a drywall product, comprising: a) processing a waste gas stream comprising carbon dioxide with a process water to produce an original composition comprising carbonates, bicarbonates, or a combination of carbonates and bicarbonates; b) removing at least a portion of the process water from the original composition to produce a concentrated composition, concentrated with respect to the carbonates, bicarbonates, or the combination thereof; d) producing from the concentrated composition a drywall slurry mixture; and e) depositing the drywall slurry mixture between two sheets of backing material to form the drywall product. In some embodiments, the method further comprises evaporating residual water from the drywall product. In some embodiments, the method further comprises cutting the drywall product for commercial use. In some embodiments, removing process water from the original composition comprises removing no more process water than is needed for the drywall slurry mixture. In some embodiments, removing process water from the original composition produces a concentrated composition comprising at least 25% solids. In some embodiments, removing process water from the original composition produces a concentrated composition comprising at least 50% solids. In some embodiments, removing process water from the original composition comprises concentrating the original composition to dryness to produce a dry composition. In some embodiments, concentrating the original composition to dryness comprises drying the composition at room temperature. In some embodiments, concentrating the original composition to dryness comprises drying the composition at elevated temperature. In some embodiments, the dry composition is slurried with slurry water to produce the drywall slurry mixture. In some embodiments, the slurry water comprises recovered process water. In some embodiments, the slurry water comprises fresh water. In some embodiments, solids of the drywall slurry mixture comprises at least 50% by weight carbonates, bicarbonates, or a combination of carbonates and bicarbonates. In some embodiments, the drywall slurry mixture comprises at least 75% by weight carbonates, bicarbonates, or a combination of carbonates and bicarbonates. In some embodiments, the drywall slurry mixture comprises at least 95% by weight carbonates, bicarbonates, or a combination of carbonates and bicarbonates. In some embodiments, solids of the drywall slurry mixture comprise calcium carbonate. In some embodiments, the calcium carbonate comprise metastable calcium carbonate. In some embodiments, the metastable calcium carbonate is selected from the group consisting of amorphous calcium carbonate, vaterite, aragonite, and combinations thereof. In some embodiments, the drywall slurry mixture further comprises calcite. In some embodiments, the drywall slurry mixture further comprises calcined gypsum. In some embodiments, the method further comprises adding additives to the drywall slurry mixture, the additives selected from the group consisting of anti-desiccants, fibrous materials, accelerators, set retarders, plasticizers, foaming agents, fire resistance agents, mildew resistance agents, and combinations thereof. In some embodiments, anti-desiccants are selected from the group consisting of natural starches, acid-modified starches, or a combination thereof. In some embodiments, acid-modified starches are selected from the group consisting of corn starches, potato starches, wheat stock starches, and combinations thereof. In some embodiments, fibrous materials are selected from the group consisting of wood fibers, dry paper fibers, cellulose fibers, perlite, fiberglass fibers, and combinations thereof. In some embodiments, fibrous materials are added to the drywall slurry mixture to lower drywall product density and to increase physical properties of the drywall product. In some embodiments, accelerators are selected from the group consisting of calcium sulfate dihydrate, potassium sulfate, and a combination thereof. In some embodiments, set retarders comprise diethylene triamine pentaacetic acid ("DTPA"). In some embodiments, foaming agents are selected from the group consisting of alkyl ether sulfates, ammonium alkyl ethoxy sulfates, and a combination thereof. In some embodiments, foaming agents are added to the drywall slurry mixture to lower density in the drywall product. In some embodiments, fire resistance agents are selected from the group consisting of perlite, vermiculite, boric acid, and combinations thereof. In some embodiments, the method further comprises adding recycled materials to the drywall slurry mixture, the recycled materials selected from the group consisting of fly ash, slag, cement kiln dust, and combinations thereof. In some embodiments, the two sheets of backing material comprise sheets of paper or fiberglass. In some embodiments, the sheets of backing material comprise sheets of paper. In some embodiments, at least one sheet of the two sheets of paper comprise an oil-based additive, imparting moisture resistance to the drywall product. In some embodiments, at least one sheet of the two sheets of backing material comprise a skim coat or a built-up plaster finish, imparting moisture resistance and mold resistance to the drywall product. In some embodiments, the drywall product is foil lined, imparting moisture resistance to the drywall product. In some embodiments, the drywall product is lead lined, imparting radiation resistance to the drywall product.

Provided herein is a drywall product produced in accordance with any one of the foregoing methods for producing a drywall product.

Provided herein is a drywall product comprising: a) a drywall exterior comprising two sheets of paper or fiberglass and b) a drywall interior comprising carbonates, bicarbonates, or a combination of carbonates and bicarbonates, wherein the carbonates, bicarbonates, or the combination of carbonates and bicarbonates comprise at least 50% by weight of the drywall interior, the remainder of the drywall interior comprising calcined gypsum, anti-desiccants, fibrous materials, accelerators, set retarders, plasticizers, foaming agents, fire resistance agents, mildew resistance agents, and combinations of the foregoing, and wherein the drywall interior is disposed between the two sheets of drywall exterior. In some embodiments, the drywall interior comprises at least 75% by weight carbonates, bicarbonates, or the combination of carbonates and bicarbonates comprise. In some embodiments, the drywall interior comprises at least 95% by weight carbonates, bicarbonates, or the combination of carbonates and bicarbonates comprise. In some embodiments, the drywall interior comprises at least 50% by weight carbonates. In some embodiments, the drywall interior comprises at least 75% by weight carbonates. In some embodiments, the drywall interior comprises at least 95% by weight carbonates. In some embodiments, the carbonates comprise metastable calcium carbonates. In some embodiments, the metastable calcium carbonates are selected from the group consisting of amorphous calcium carbonate, vaterite, aragonite, and combinations thereof. In some embodiments, the drywall interior further comprises calcite. In some embodiments, anti-desiccants are selected from the group consisting of natural starches, acid-modified starches, or a combination thereof. In some embodiments, acid-modified starches are selected from the group consisting of corn starches, potato starches, wheat stock starches, and combinations thereof. In some embodiments, fibrous materials are selected from the group consisting of wood fibers, dry paper fibers, cellulose fibers, perlite, fiberglass fibers, and combinations thereof. In some embodiments, fibrous materials lower drywall product density and to increase physical properties of the drywall product. In some embodiments, accelerators are selected from the group consisting of calcium sulfate dihydrate, potassium sulfate, and a combination thereof. In some embodiments, set retarders comprise diethylene triamine pentaacetic acid ("DTPA"). In some embodiments, foaming agents are selected from the group consisting of alkyl ether sulfates, ammonium alkyl ethoxy sulfates, and a combination thereof. In some embodiments, foaming agents lower density in the drywall product. In some embodiments, fire resistance agents are selected from the group consisting of perlite, vermiculite, boric acid, and combinations thereof. In some embodiments, the drywall interior further comprises recycled materials, the recycled materials selected from the group consisting of fly ash, slag, cement kiln dust, and combinations thereof. In some embodiments, the drywall exterior comprises two sheets of paper. In some embodiments, at least one sheet of the two sheets of paper comprise an oil-based additive, imparting moisture resistance to the drywall product. In some embodiments, at least one sheet of the two sheets of drywall exterior comprises a skim coat or a built-up plaster finish, imparting moisture resistance and mold resistance to the drywall product. In some embodiments, the drywall product is foil lined, imparting moisture resistance to the drywall product. In some embodiments, the drywall product is lead lined, imparting radiation resistance to the drywall product.

Provided herein is a formed building material comprising a sequestered-$CO_2$ component, wherein the sequestered-$CO_2$ component comprises 25% (w/w) or less gypsum and 75% (w/w) or more calcium carbonate comprising a metastable carbonate selected from the group consisting of amorphous calcium carbonate, vaterite, aragonite, and combinations thereof, wherein the sequestered-$CO_2$ has a $\delta^{13}C$ less than −15‰, and wherein the formed building material is drywall having a compressive strength ranging from 1 to 20 MPa.

Provided is a method for producing a paver comprising a) producing a metastable sequestered-$CO_2$ component from a solution of divalent cations and a gaseous waste stream comprising $CO_2$, wherein the metastable sequestered-$CO_2$ component, upon contact with freshwater, re-precipitates into a freshwater stable compound; and b) forming the paver from the metastable sequestered-$CO_2$ component in a process comprising contacting the sequestered-$CO_2$ component with freshwater. In some embodiments, the paver comprises 5% to 50% (w/w) sequestered-$CO_2$ component. In some embodiments, the sequestered-$CO_2$ component comprises carbonates. In some embodiments, the sequestered-$CO_2$ component further comprises co-products of NOx, SOx, VOCs, particulates, mercury, or a combination thereof resulting from conditions used to convert carbon dioxide to carbonates. In some embodiments, the gaseous waste stream further comprises NOx, SOx, VOCs, particulates, mercury, or a combination thereof. In some embodiments, the paver has a carbon footprint that is neutral or negative. In some embodiments, water for forming the paver is provided by the sequestered-$CO_2$ component. In some embodiments, the sequestered-$CO_2$ component provides at least 50% of the water for forming the paver. In some embodiments, the paver continuously reduces carbon emission via reduced lighting demands due to the high albedo of the paver.

Also provided is a paver produced by any of the foregoing methods for producing a paver.

Also provided is a paver comprising a sequestered-$CO_2$ component, wherein the sequestered-$CO_2$ component comprises 75% (w/w) or more calcium carbonate comprising a metastable carbonate selected from the group consisting of amorphous calcium carbonate, vaterite, aragonite, and combinations thereof, and wherein the paver has one or more properties selected from the group consisting of one or more paver properties described herein. In some embodiments, the sequestered-$CO_2$ component further comprises bicarbonates. In some embodiments, the carbonates, the bicarbonates, or the combination thereof has a $\delta^{13}C$ less than −5‰. In some embodiments, the sequestered-$CO_2$ component further comprises calcite, ikaite, magnesite, barringtonite, nesquehonite, lansfordite, amorphous magnesium carbonate, or a combination thereof. In some embodiments, the sequestered-$CO_2$ component further comprises calcium, magnesium, or a combination thereof. In some embodiments, the sequestered-$CO_2$ component further comprises strontium. In some embodiments, the sequestered-$CO_2$ component further comprises co-products from NOx, SOx, VOCs, particulates, mercury, or a combination thereof. In some embodiments, the sequestered-$CO_2$ component further comprises sulfates. In some embodiments, the paver, when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the some of the paver such that particles of ground paver are less than 1 cm in the narrowest dimension if the particles are not already less than 1 cm in the narrowest dimension; placing 100 g of the ground paver into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 0.2 mg/L of mercury. In some embodiments, the leaching process produces a leachate comprising less than 5.0 mg/L arsenic. In some embodiments, the leaching process produces a leachate comprising less than 100 mg/L barium. In some embodiments, the leaching process produces a leachate comprising less then 1.0 mg/L cadmium. In some embodiments, the leaching process produces a leachate comprising less than 5.0 mg/L chromium. In some embodiments, the leaching process produces a leachate comprising less than 5.0 mg/L lead. In some embodiments, the leaching process produces a leachate comprising less than 1.0 mg/L selenium. In some embodiments, the leaching process produces a leachate comprising less than 5.0 mg/L silver. In some embodiments, the paver, when subjected to a carbon dioxide release protocol consisting essentially of grinding a portion of the paver such that particles of ground paver are less than 1 cm in the narrowest dimension if the particles are not already less than 1 cm in the narrowest dimension and immersing the solid in a solution having a pH between pH 4.8 and pH 5.2 and a temperature between 60 and 80° C. for 48 hours, produces less than 5 grams carbon dioxide per 100 grams solid.

DRAWINGS

A better understanding of different features and advantages will be obtained by reference to the following detailed description that sets forth illustrative embodiments, and the accompanying drawings of which:

FIG. 1 provides a schematic of a production process for a sequestered-$CO_2$ component.

Figure 2:
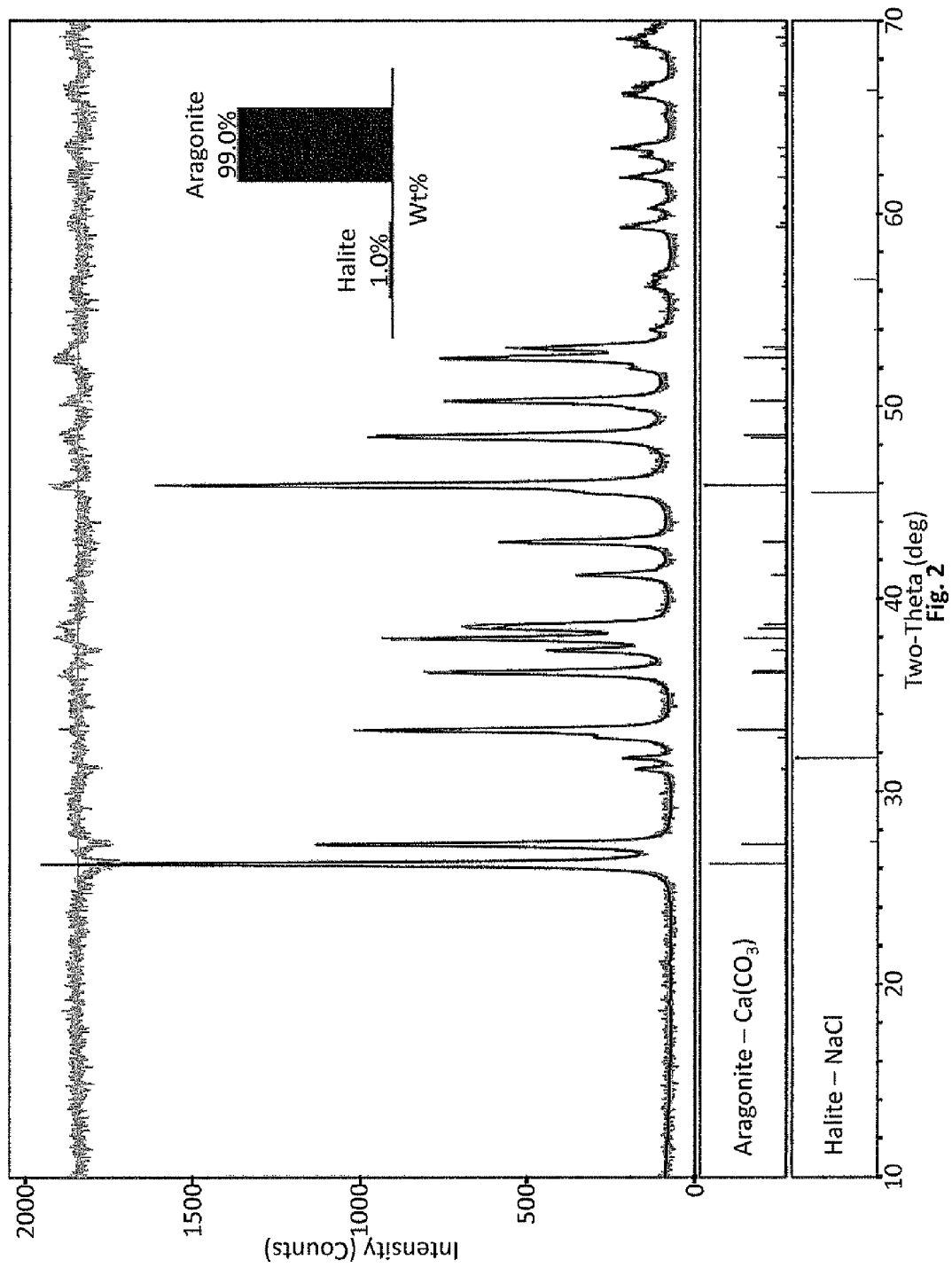

FIG. 2 provides an X-ray diffraction ("XRD") diffractogram for precipitation material produced in Example 1.

Figure 3:
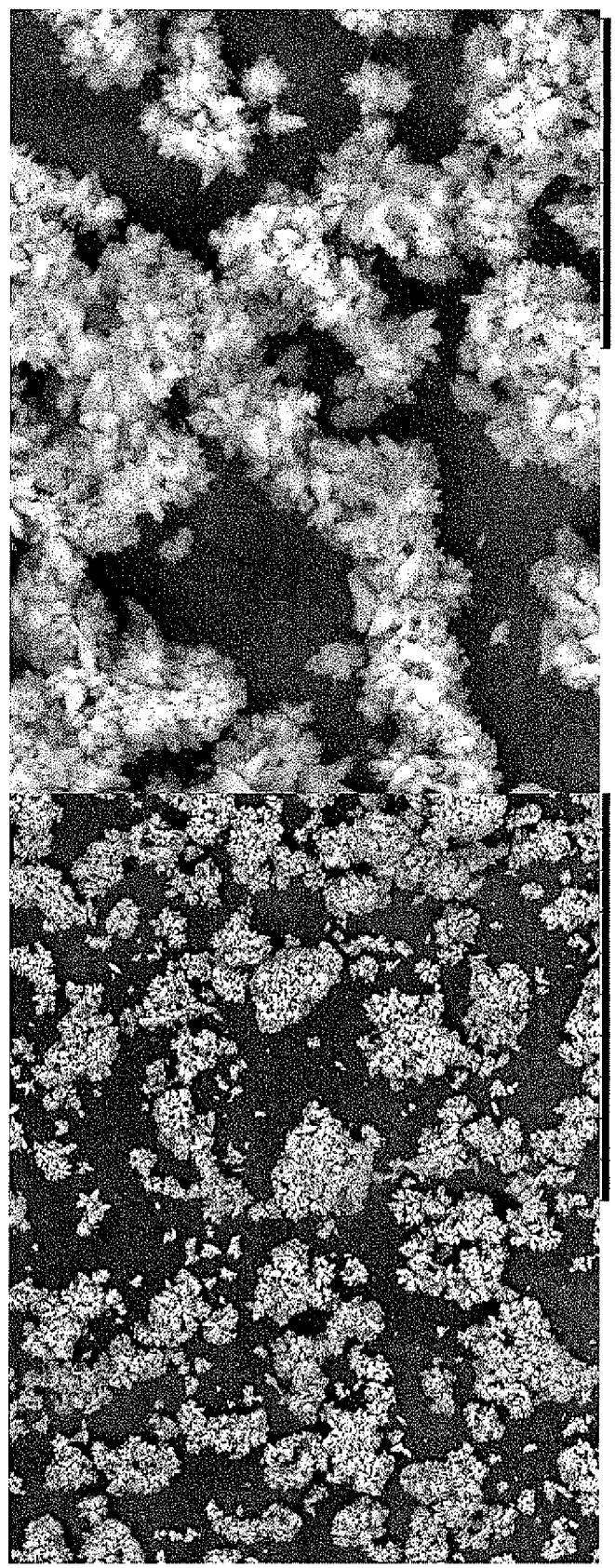

FIG. 3 provides scanning electron microscope ("SEM") images of the precipitation material produced in Example 1.

Figure 4:
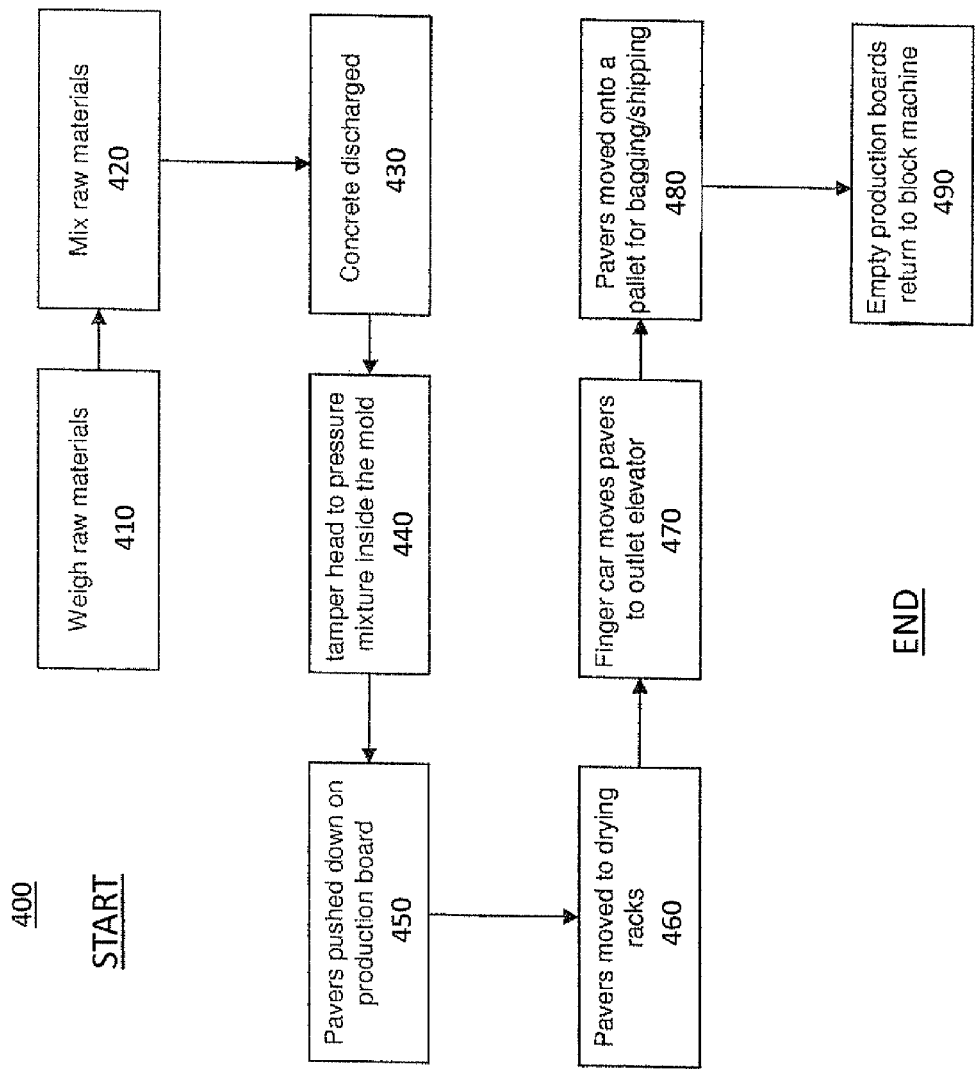

FIG. 4 provides an exemplary method for making pavers.

Figure 5:
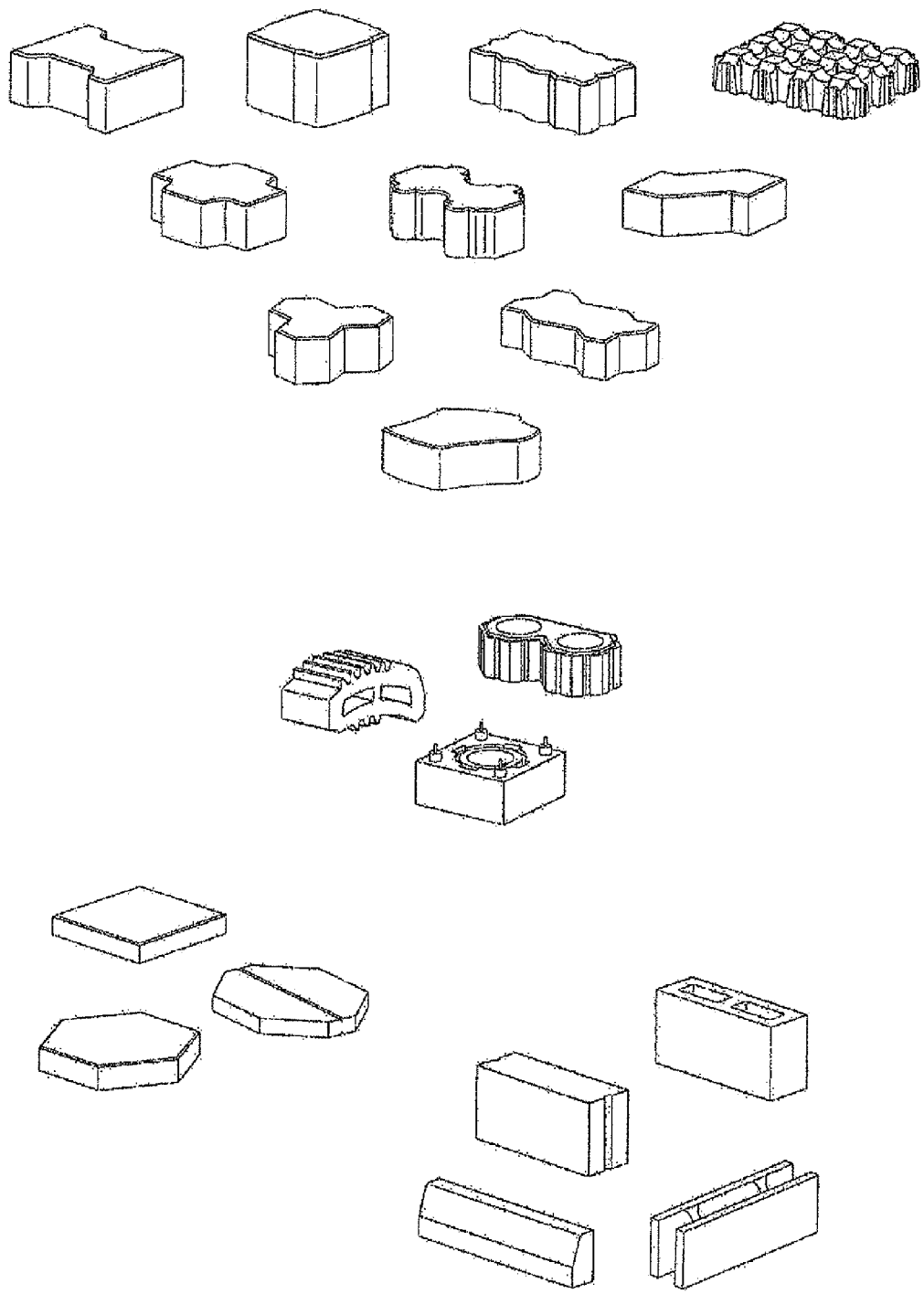

FIG. 5 provides an assortment of pavers that may be manufactured.

Figure 6:
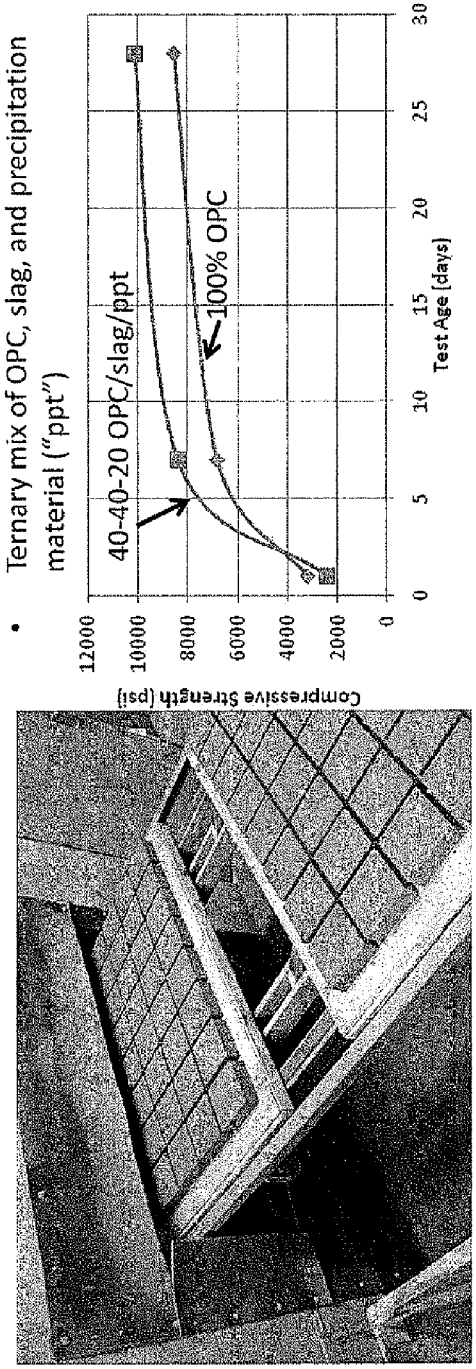
Figure 6:
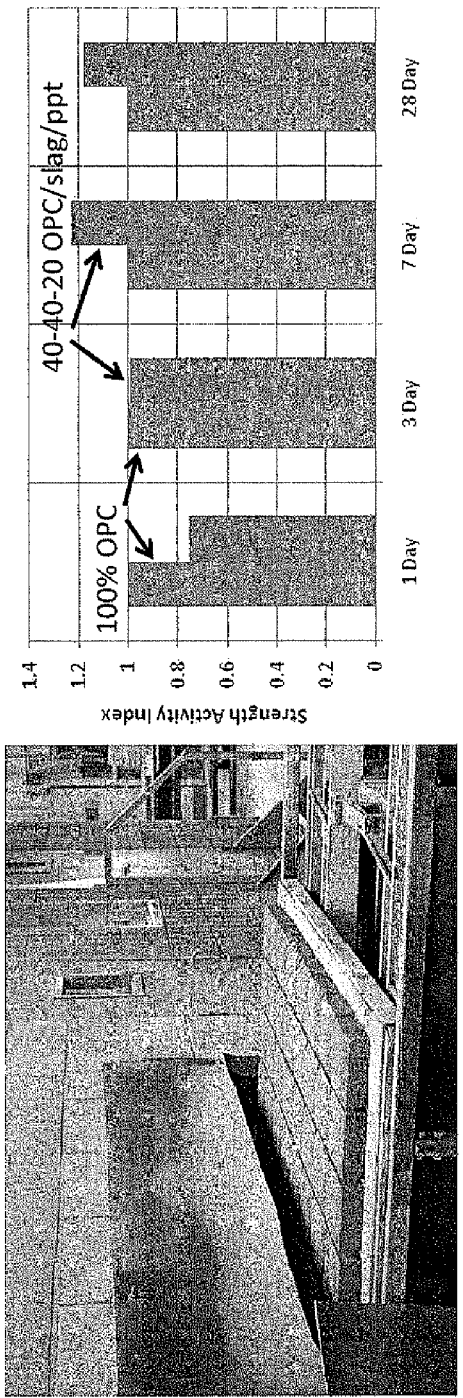

FIG. 6 provides pavers and some properties of the pavers.

Figure 7:
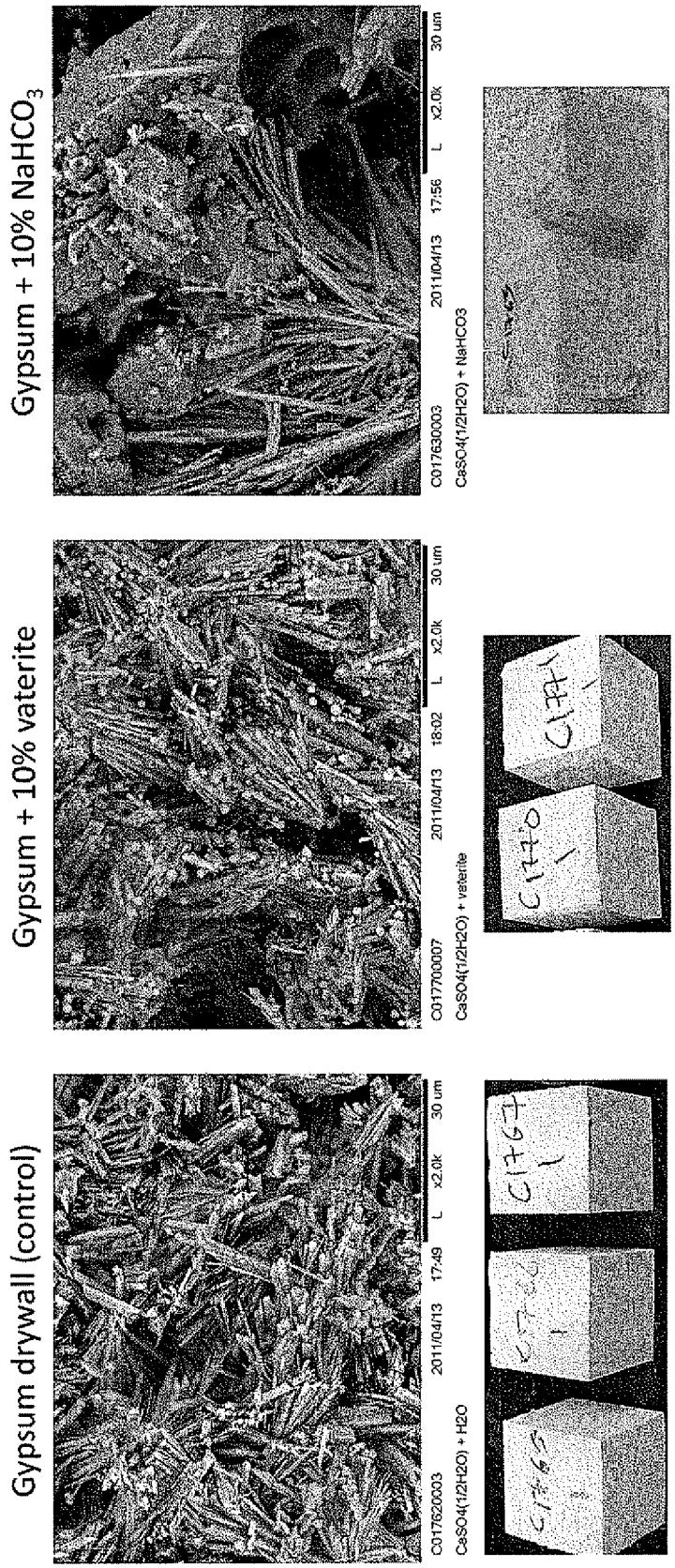

FIG. 7 provides SEM images of drywall of different compositions.

Figure 8:
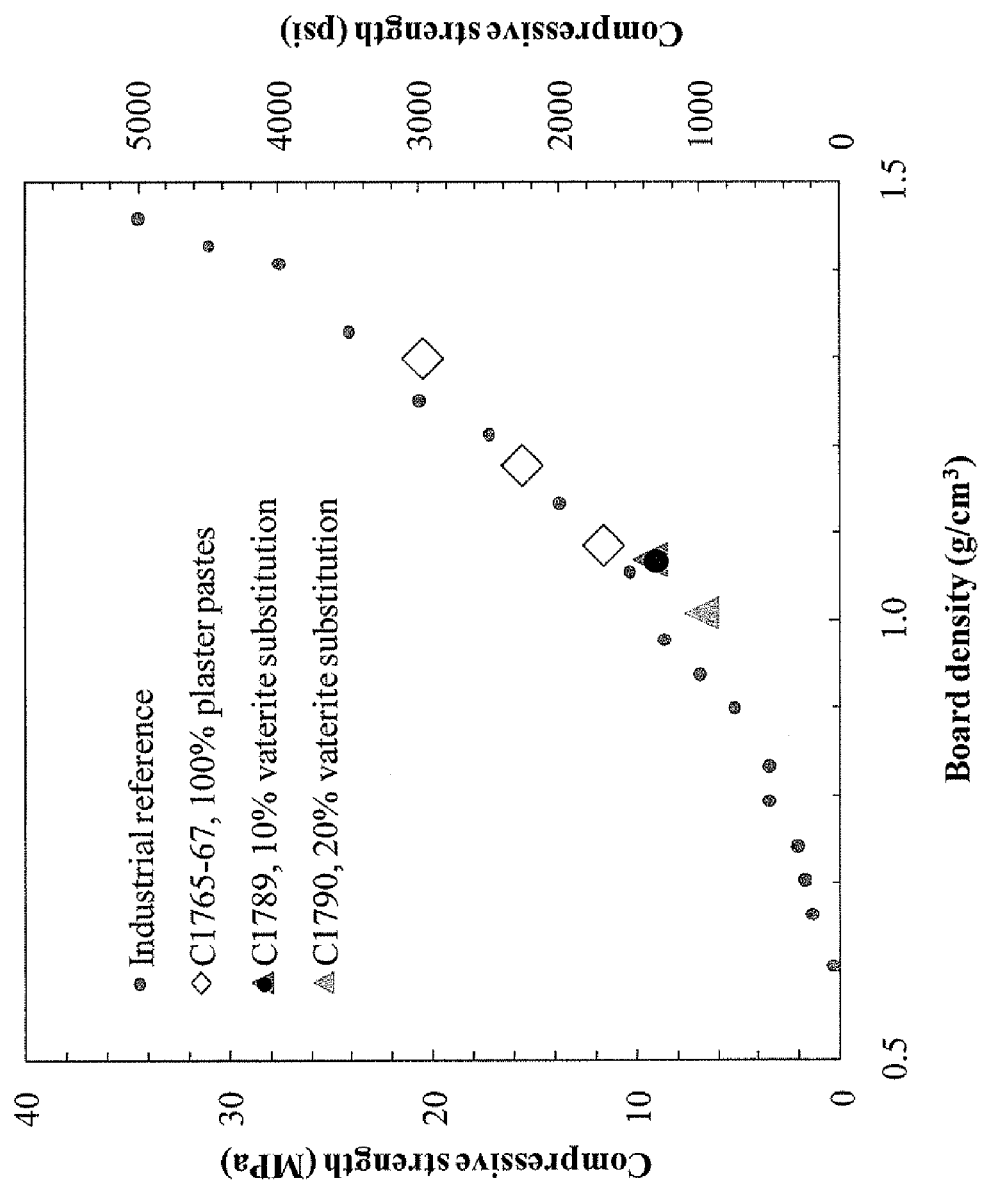

FIG. 8 provides properties of drywall of different compositions.

Figure 9A:
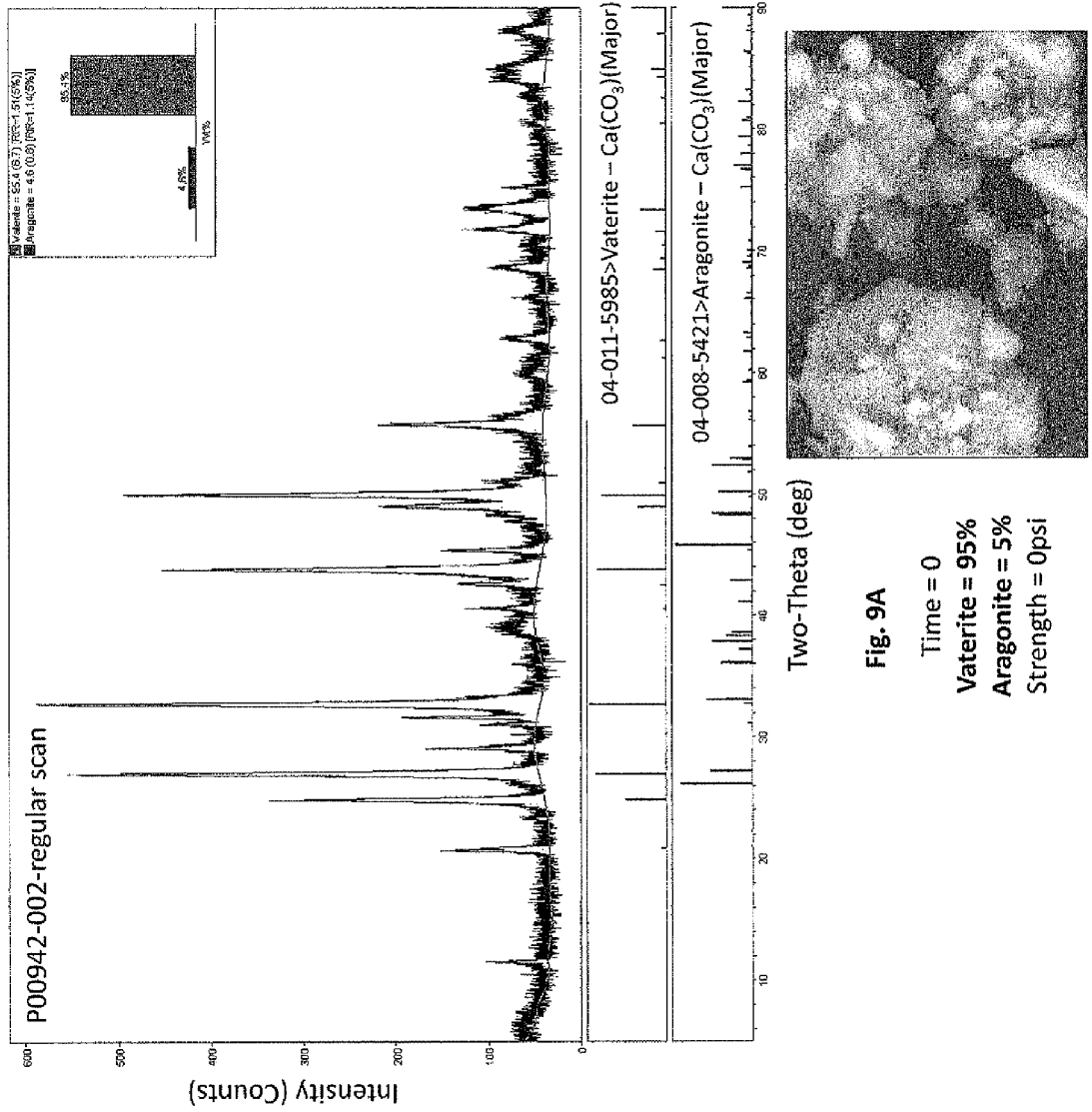
Figure 9B:
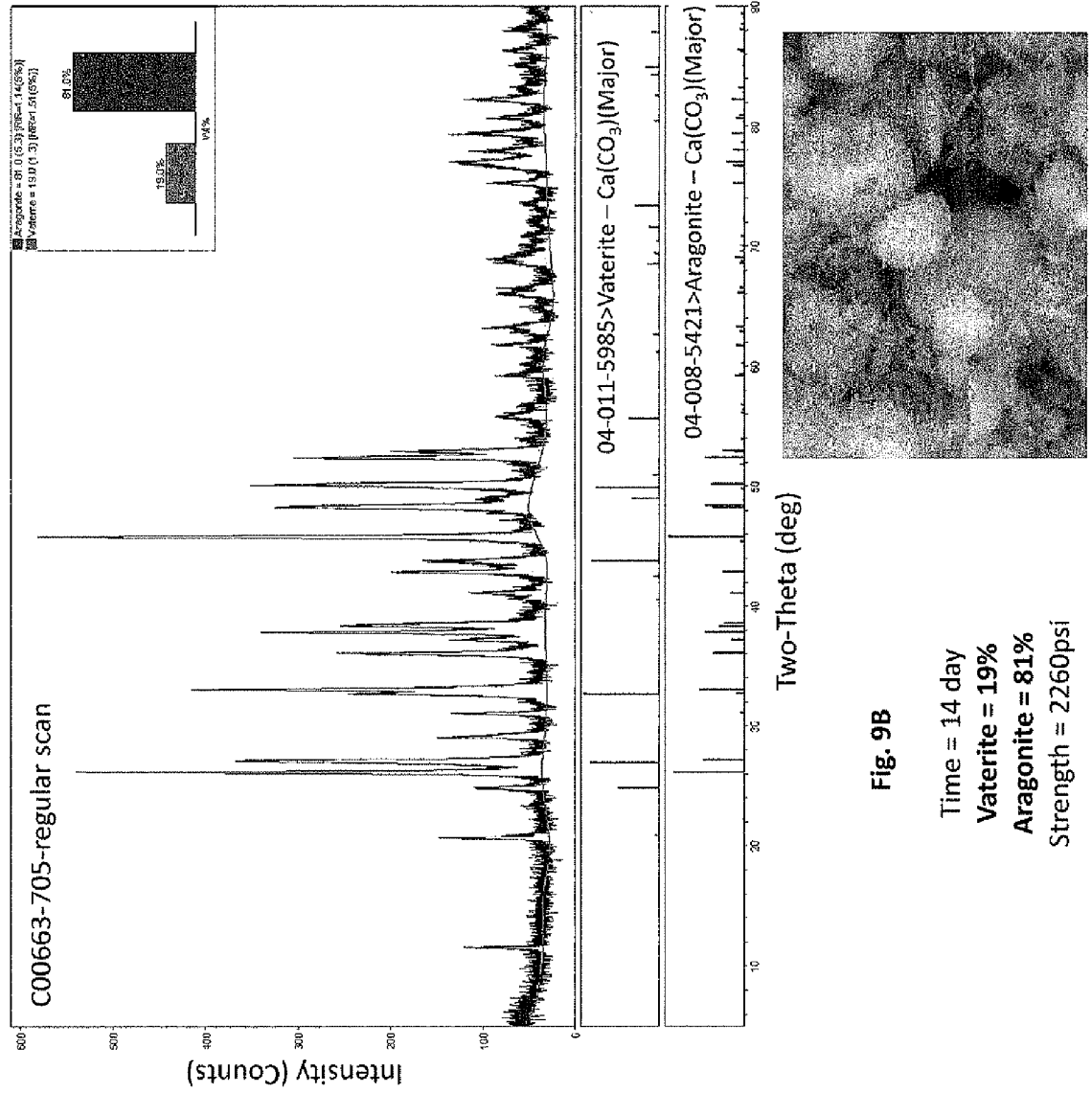
Figure 9C:
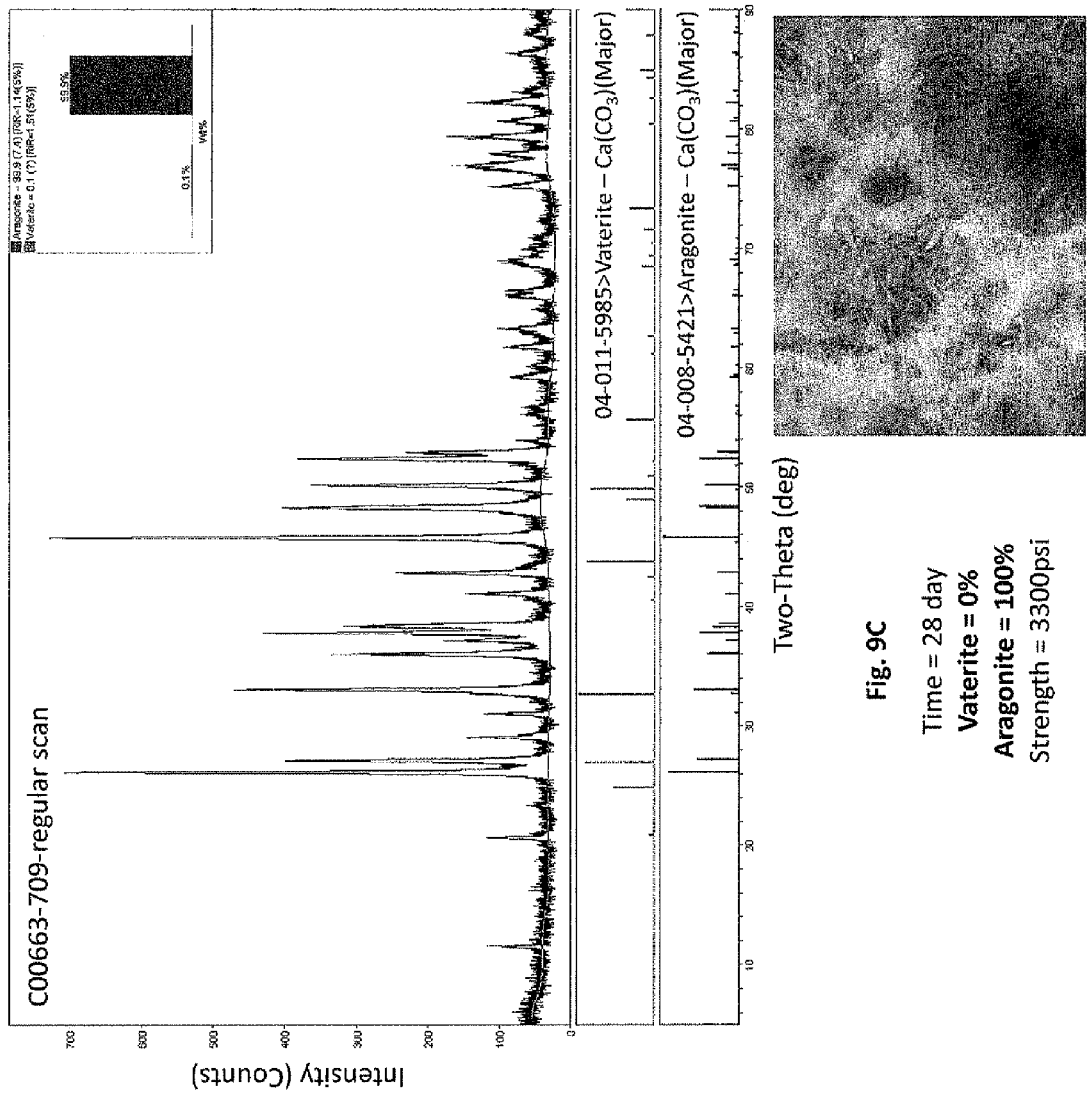

FIG. 9A-C provides SEM images and XRD diffractograms for cement substitute from 0 to 28 days.

Figure 10:
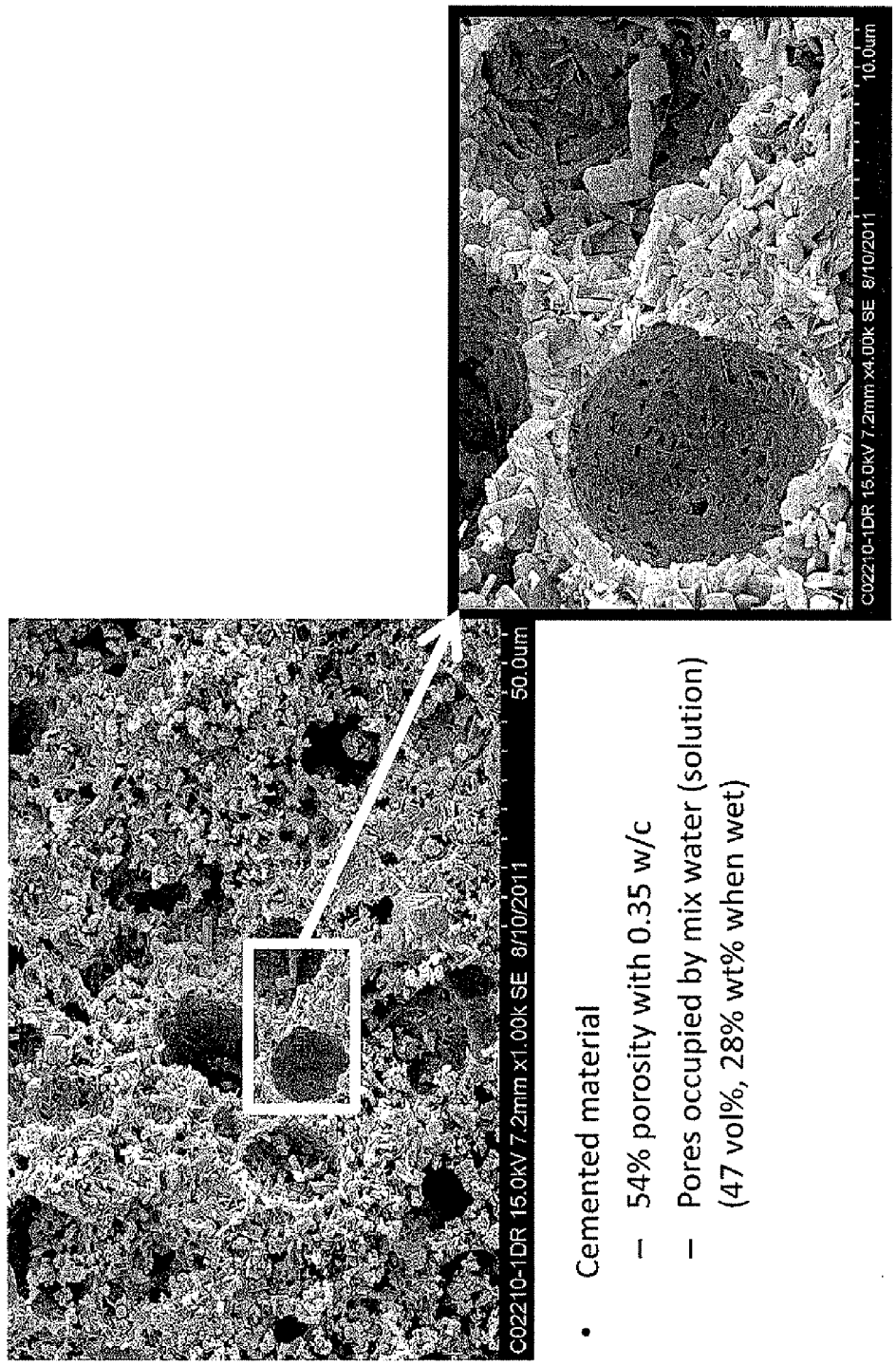

FIG. 10 provides SEM images for cement substitute.

Figure 11:
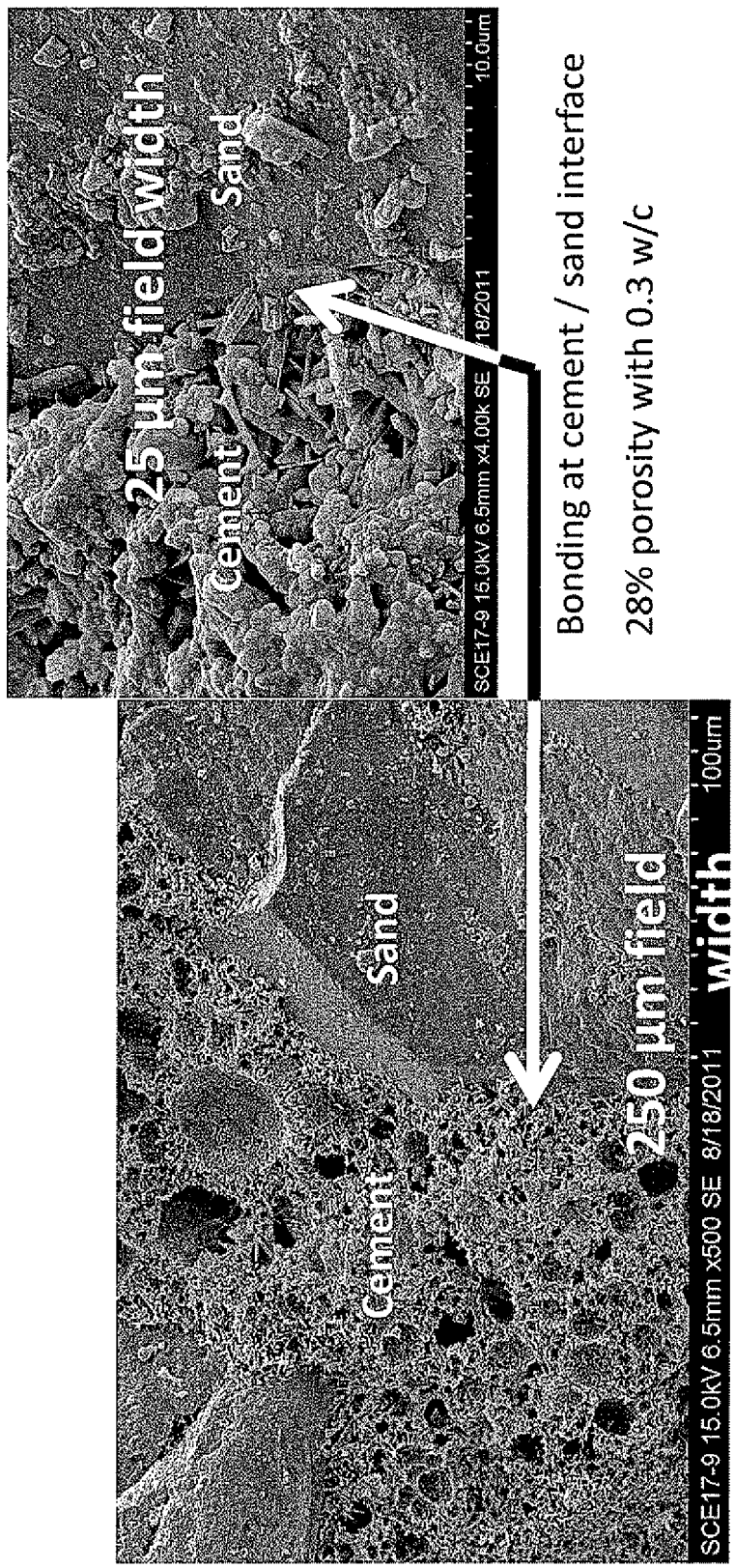

FIG. 11 provides SEM images for cement substitute binding with fine aggregate.

Figure 12:
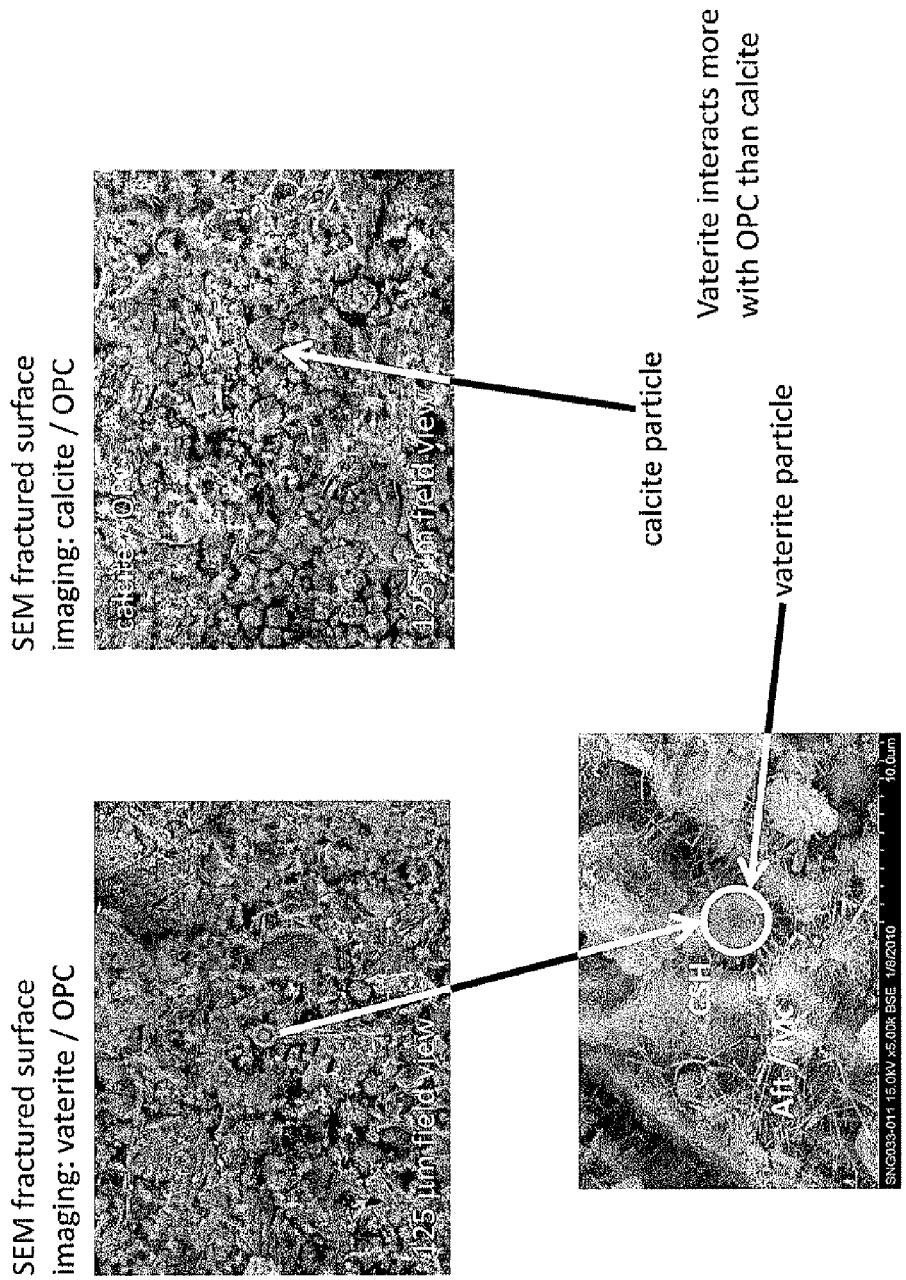

FIG. 12 provides SEM images for cement substitute interacting with conventional cement.

DESCRIPTION

Formed building materials comprising a sequestered-$CO_2$ component are provided. The building materials described herein include a sequestered-$CO_2$ component from precipitation material comprising carbonates, bicarbonates, or a combination thereof. Provided are also methods of making and using the formed building materials comprising a sequestered-$CO_2$ component.

It is to be understood that the particular embodiments described herein may vary. It is also to be understood that the terminology used herein is for the purpose of describing particular embodiments only, and the terminology is not intended to be limiting, since the scope of the invention will be limited only by the appended claims. Unless defined otherwise, all technical and scientific terms used herein have the same meaning as commonly understood by one of ordinary skill in the art to which the claimed invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed. The upper and lower limits of these smaller ranges may independently be included in the smaller ranges and are also encompassed, subject to any specifically excluded limit in the stated range. Where the stated range includes one or both of the limits, ranges excluding either or both of those included limits are also included.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission of prior invention. Further, the dates of publication provided might be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features that may be readily separated from or combined with the features of any of the other several embodiments. Any recited method can be carried out in the order of events recited or in any other order, which is logically possible. Although any methods and materials similar or equivalent to those described herein may also be used in practice or testing, representative illustrative methods and materials are now described.

Formed Building Materials

In some embodiments, formed building materials comprising a sequestered-$CO_2$ component are provided, which formed building materials comprise carbon derived from a fuel used by humans, e.g., carbon having a fossil fuel origin. For example, formed building materials comprising a sequestered-$CO_2$ component contain carbon that was released in the form of $CO_2$ from the combustion of fuel. In certain embodiments, the carbon sequestered in a composition (e.g., composition comprising sequestered-$CO_2$) is in the form of carbonates, bicarbonates, or a combination thereof. Therefore, in certain embodiments, formed building materials provided herein may contain, for example, carbonates, wherein at least part of the carbon in the carbonates may be derived from a fuel used by humans (e.g., a fossil fuel). As such, production of formed building materials results in the placement of $CO_2$ into a storage stable form (e.g., a component of the built environment, such as a man-made structure, such as a building, wall, road, etc.). As such, production of the formed building materials comprising sequestered-$CO_2$ results in the prevention of $CO_2$ gas from entering the atmosphere.

Building materials include a sequestered-$CO_2$ component comprising carbonates, bicarbonates, or a combination thereof. The carbonates, bicarbonates, or the combination thereof are derived from, for example, precipitated from, an aqueous solution as described in greater detail herein, and, as such, may be described herein as precipitation material. Sequestered-$CO_2$ components store a significant amount of $CO_2$ in a storage-stable format, such that $CO_2$ gas is not readily produced from the product and released into the atmosphere. In certain embodiments, the sequestered-$CO_2$ components may store 50 tons or more of $CO_2$, such as 100 tons or more of $CO_2$, including 250 tons or more of $CO_2$, for instance 500 tons or more of $CO_2$, such as 750 tons or more of $CO_2$, including 900 tons or more of $CO_2$ for every 1000 tons of building material. In certain embodiments, the sequestered-$CO_2$ component of the building materials comprise about 5% or more of $CO_2$, such as about 10% or more of $CO_2$, including about 25% or more of $CO_2$, for instance about 50% or more of $CO_2$, such as about 75% or more of $CO_2$, including about 90% or more of $CO_2$, e.g., present as one or more carbonate compounds.

The sequestered-$CO_2$ component (e.g., component comprising carbonates, bicarbonates, or a combination thereof) may include one or more carbonate compounds. The amount of carbonate (or bicarbonate, or combination of carbonate and bicarbonate) in the sequestered-$CO_2$ component, as determined by, for example, coulometry using the protocol described in coulometric titration, is 40% or higher, such as 70% or higher, including 80% or higher. In some embodiments, where the Mg source is a mafic mineral (described in U.S. patent application Ser. No. 12/501,217, filed 10 Jul. 2009, and U.S. Provisional Patent Application No. 61/079,790, filed 10 Jul. 2008, each of which is incorporated herein by reference) or an ash (described in U.S. application Ser. No. 12/486,692, filed 17 Jun. 2009, and U.S. Provisional Application Ser. No. 61/073,319, filed 17 Jun. 2008, each of which is incorporated herein by reference), the resultant product may be a composition containing silica as well as carbonate. In these embodiments, the carbonate content of the product may be as low as 10%.

The building materials provide for long-term storage of $CO_2$ in a manner such that $CO_2$ is sequestered (i.e., fixed) in the building material, where the sequestered $CO_2$ does not become part of the atmosphere. When the building material is maintained under conditions conventional for its intended use, the building material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the building material. With respect to the building materials described herein, when they are employed in their intended use and over their lifetime, the amount of degradation, if any, as measured in terms of $CO_2$ gas release from the product will not exceed 5% per year, and in certain embodiments will not exceed 1% per year. Indeed, building materials described herein do not release more than 1%, 5%, or 10% of its total $CO_2$ when exposed to normal conditions of temperature and moisture, including rainfall of normal pH, for its intended use, for at least 1, 2, 5, 10, or 20 years, or for more than 20 years, for example, for more than 100 years. In some embodiments the composition does not release more than 1% of its total $CO_2$ when exposed to normal conditions of temperature and moisture, including rainfall of normal pH, for its intended use, for at least 1 year. In some embodiments the composition does not release more than 5% of its total $CO_2$ when exposed to normal conditions of temperature and moisture, including rainfall of normal pH, for its intended use, for at least 1 year. In some embodiments the composition does not release more than 10% of its total $CO_2$ when exposed to normal conditions of temperature and moisture, including rainfall of normal pH, for its intended use, for at least 1 year. In some embodiments the composition does not release more than 1% of its total $CO_2$ when exposed to normal conditions of temperature and moisture, including rainfall of normal pH, for its intended use, for at least 10 years. In some embodiments the composition does not release more than 1% of its total $CO_2$ when exposed to normal conditions of temperature and moisture, including rainfall of normal pH, for its intended use, for at least 100 years. In some embodiments the composition does not release more than 1% of its total $CO_2$ when exposed to normal conditions of temperature and moisture, including rainfall of normal pH, for its intended use, for at least 1000 years.

Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials for a given period (e.g., 1, 10, 100, 1000, or more than 1000 years).

$CO_2$ content of the material may be monitored by any suitable method (e.g., coulometry). Other conditions may be adjusted as appropriate, including pH, pressure, UV radiation, and the like, again depending on the intended or likely environment. It will be appreciated that any suitable conditions may be used that one of skill in the art would reasonably conclude indicate the requisite stability over the indicated time period. In addition, if accepted chemical knowledge indicates that the composition would have the requisite stability for the indicated period this may be used as well, in addition to or in place of actual measurements. For example, some carbonate compounds that may be part of a composition (e.g., in a given polymorphic form) may be well-known geologically and known to have withstood normal weather for decades, centuries, or even millennia, without appreciable breakdown, and so have the requisite stability.

Depending upon the particular formed building material the amount of sequestered-$CO_2$ component (e.g., component comprising carbonates, bicarbonates, or a combination thereof) present in the building material may vary. The sequestered-$CO_2$ component, which may be unrefined, refined, or otherwise treated precipitation material (e.g., carbonates, bicarbonates, or carbonates and bicarbonates) as described herein, may be used as a partial cement substitute or a complete cement substitute. The sequestered-$CO_2$ component, though it may or may not be cementitious in and of itself, may react to a some degree, or not, with a cement composition such as ordinary Portland cement (or with concrete-forming materials such as fine aggregate, coarse aggregate, etc.) to ultimately produce a hardened composition. As such, a sequestered-$CO_2$ component may be combined with a cement composition (e.g., ordinary Portland cement) to produce a hardened cement composition (or concrete if further combined with concrete-forming materials such as fine aggregate, coarse aggregate, etc.) with properties (e.g., compressive strength; porosity; etc) described herein, but without a reaction between the sequestered-$CO_2$ component and the cement composition (or concrete-forming materials if present). In some embodiments, a sequestered-$CO_2$ component may be combined with a cement composition (e.g., ordinary Portland cement) to produce a hardened cement composition (or concrete if combined with concrete-forming materials such as fine aggregate, coarse aggregate, etc.) with properties (e.g., compressive strength) described herein, but resulting, at least in part, from reaction between the sequestered-$CO_2$ component and the cement composition (or concrete-forming materials if present).

A substantial reduction in carbon footprint may result from using formed building materials in which sequestered-$CO_2$ component is used to the exclusion of any additional cementitious components (e.g., OPC) in the formed building materials. As provided herein, sequestered-$CO_2$ component (optionally "cement substitute" when used to the exclusion of any other cementitious components) may comprise calcium carbonate polymorphs such as amorphous calcium carbonate, vaterite, aragonite, and/or calcite in the proportions further described herein, and the sequestered-$CO_2$ component may optionally be used in conjunction with fine and/or coarse aggregate, and further optionally in conjunction with supplementary cementitious materials such fly ash, slag, and/or metakaolin. As such, formed building materials may be reduced-carbon footprint building materials. Reduced-carbon footprint building materials have a reduced carbon footprint compared to conventional formed building materials (e.g., corresponding building materials that lack the sequestered-$CO_2$ component [e.g., component comprising carbonates, bicarbonates, or a combination thereof]). Using any convenient carbon footprint calculator, the magnitude of carbon footprint reduction of the building materials as compared to corresponding conventional building materials that lack the sequestered-$CO_2$ component may be 5% or more, such as 10% or more, including 25%, 50%, 75% or even 100% or more. In certain embodiments, the reduced-carbon footprint building materials are carbon neutral, in that they have substantially no, if any, calculated carbon footprint (e.g., as determined using any convenient carbon footprint calculator that is relevant for a particular building material of interest). Carbon neutral building materials include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral materials have 0 or negative lbs $CO_2$/cu yd material, such as negative 1 or more, e.g., negative 3 or more lbs $CO_2$/cu yd material. In come instances, the low carbon footprint materials have a significantly negative carbon footprint, e.g., −100 or more lbs $CO_2$/cu yd or less.

The formed building materials may vary greatly, which formed building materials comprise materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that an amount of sequestered-$CO_2$ component (e.g., component comprising carbonates, bicarbonates, or a combination thereof) is employed. As described in more detail below, the portion of components replaced with the sequestered-$CO_2$ component may vary, and in certain instances is 5% by weight or more, including 10% by weight or more, 25% by weight or more, 50% by weight or more, 75% by weight or more, 90% by weight or more, or even 100% by weight. In producing the formed building materials, an amount of the sequestered-$CO_2$ component may be combined with water and other additional components, which may include, but are not limited to clay, shale, soft slate, calcium silicate, quarried stone, Portland cement, fly ash, slag, metakaolin, cement, aggregate (e.g., blast furnace slag, bottom ash, gravel, limestone, granite, sand, etc.), silica fume and pozzolans.

Illustrative formed building materials according to certain embodiments are reviewed in greater detail below. However, the below review of formed building materials is not limiting, and is provided solely to further describe various exemplary embodiments of formed building materials comprising sequestered-$CO_2$ components.

Masonry units are formed building materials used in the construction of load-bearing and non-load-bearing structures that are generally assembled using mortar, grout, and the like; however, masonry units need not necessarily be assembled using mortar, grout, and the like. Exemplary masonry units include bricks, blocks, and tiles. Pavers are exemplary masonry units that may or may not use mortar, grout, and the like. Bricks and blocks are polygonal structures possessing linear dimensions. Bricks are masonry units with dimensions (mm) not exceeding 337.5×225×112.5 (length×width× height). Any unit with dimensions (mm) between 337.5× 225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles). Pavers are described in more detail below.

One type of masonry unit provided is a brick, which refers to a structural unit of material used in masonry construction, generally laid using mortar. Bricks are masonry units with dimensions (mm) not exceeding 337.5×225×112.5 (length× width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm Bricks may vary in grade, class, color, texture, size, weight and can be solid, cellular, perforated, frogged, or hollow. Bricks may include but are not limited to building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks may vary considerably in physical and mechanical properties. The compressive strength of bricks may range, in certain instances, from 5 to 100 megapascals (MPa), including 20-40 MPa. The flexural strength of bricks may vary, ranging from 0.5 to 10 MPa, including 2 to 7 MPa, such as 2 to 5 MPa. The maximum water absorption of bricks may vary, ranging from 5 to 25%, including 10 to 15%. Bricks may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks may have a volume abrasion loss ranging from 1.0 to 4.0 $cm^3/cm^2$, including 1.5 to 2.5 $cm^3/cm^2$, such as 2.0 $cm^3/cm^2$. The building material composition comprising the sequestered-$CO_2$ component (e.g., component comprising carbonates, bicarbonates, or a combination thereof) may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided is blocks, (e.g., concrete, cement, foundation, etc.). Blocks are distinct from bricks based on their structural dimensions. Specifically, blocks exceed the dimensions (mm) of 337.5×225×112.5 (length×width×height). Blocks may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm The blocks may also vary in faceshell thickness. In some instances, the blocks may have faceshell thicknesses ranging from 15 to 40 mm, including 20 to 30 mm, such as 25 mm The blocks may also vary in web thickness. In some embodiments, the blocks may have web thicknesses ranging from 15 to 30 mm, including 15 to 25 mm, such as 20 mm The blocks may vary considerably in physical and mechanical properties. The compressive strength of blocks may vary, in certain instances ranging from 5 to 100 MPa, including 15 to 75 MPa, such as 20 to 40 MPa. The flexural strength of blocks may also vary, ranging from 0.5 to 15 MPa, including 2 to 10 MPa, such as 4 to 6 MPa. The maximum water absorption of the blocks may vary, ranging from 7 to 20% by weight including 8 to 15%, such as 9 to 11%. Blocks may also undergo moisture movement (expansion or contraction) due to the absorption or loss of water to its environment. Blocks may be Type I moisture-controlled units or Type II non-moisture-controlled units. The dimensional stability (i.e., linear shrinkage) of the blocks may vary depending on their intended use and/or geographical location of use, in certain instances ranging from 0.02 to 0.15%, such as 0.03 to 0.05%. The building material composition comprising the sequestered-$CO_2$ component (e.g., component comprising carbonates, bicarbonates, or a combination thereof) may be molded, extruded, or sculpted into the desired shape and size to form a block. Such a building material composition may further comprise fly ash and/or bottom and may be used to produce cinder blocks. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided is a tile. Tiles refer to non-load-bearing building materials that are commonly employed on roofs and to pave exterior and interior floors of commercial and residential structures. Some examples where tiles may be employed include, but are not limited to, the roofs of commercial and residential buildings, ceilings (e.g., ceiling tile), decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles may also vary, in certain instances ranging from 5 to 75 MPa, including 15 to 40 MPa, such as 25 MPa. The flexural strength of tiles may vary, ranging from 0.5 to 7.5 MPa, including 2 to 5 MPa, such as 2.5 MPa. The maximum water absorption of tiles may also vary, in certain instances ranging from 5 to 15%, including 7 to 12%. Tiles may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 cm³/cm², including 1.5 to 3.0 cm³/cm², such as 2.7 cm³/cm². Tiles may be polygonal, circular or take on any other desired shape. As such, the building material composition comprising the sequestered-$CO_2$ component (e.g., component comprising carbonates, bicarbonates, or a combination thereof), may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Another type of formed building material and masonry unit is pavers. Pavers are often used in paving applications such as patios, driveways, sidewalks, walkways, terraces, balconies, courtyards, pools (e.g., surrounding pools, pool coping, etc.), gardens (e.g., pathways, walkways, stepping stones, retaining walls), and edging (e.g., for patios, gardens, driveways, walkways, etc.). Pavers may or may not be used with mortar, grout, and the like. Use of mortar, grout, and the like ultimately depends upon the application of pavers or individual preference. Non-interlocking (e.g., non-dentated pavers, usually basic brick-, block-, or cube-shaped pavers) pavers, for example, may use mortar, grout, and the like; interlocking pavers, for example, are generally used without mortar, grout, and the like. It should be understood that interlocking pavers may be fully interlocking pavers in which pavers may interlock on both axes, or partial interlocking pavers in which pavers may interlock on one axis. Any of the pavers described herein may also be permeable (or non-permeable) as described in more detail below.

Pavers described herein may be manufactured according to standard manufacturing procedures for concrete pavers to have a wide variety of different properties (e.g., compressive strength), colors, shapes, patterns, and sizes. An exemplary method for manufacturing concrete pavers is illustrated in FIG. 4.

Referring to the exemplary paver manufacturing method in FIG. 4, the manufacturing method may begin with weighing raw materials (e.g., ground granulated blast-furnace slag or equivalent, ¼ gravel, sand, cement and/or sequestered-$CO_2$ component in step 410. When all raw materials are weighed and ready, the slag, sand, and gravel may be poured into a mixer, followed by cement, an optional color agent, and water. Any other additives (e.g., admixtures such as water-reducing admixtures, including, but no limited to GLENIUM® 7500; accelerators such as $CaCl_2$; etc.) may be added at this time, or, alternatively, added at a later time (i.e., "delayed addition") depending upon the additive and accepted methods of use. The mixing time may vary depending upon the particular materials being mixed. In some embodiments, mixing time may be at least 2, 3, 4, 5, 6, 7, 8, 9, 10, 15, 20, 30, 40, 50, 60, 120, 180, 240, 300 minutes, or possibly more. In some embodiments, mixing time may be less than 300, 240, 180, 120, 60, 50, 40, 30, 20, 15, 10, 9, 8, 7, 6, 5, 4, 3, 2 minutes, or possibly less. Water may be added to attain a desirable mixture consistency. The amount of water used to attain the desirable mixture consistency may depend upon the amount of moisture already in the raw materials, ambient humidity, and other factors during the mixing process. The optional color agent may be added as desired.

In step 430, the mixture (e.g., ground granulated blast-furnace slag or equivalent, ¼ gravel, sand, cement and/or sequestered-$CO_2$ component) in the mixer may be discharged onto a conveyor to convey the mixture to a block machine hopper. The block machine hopper may subsequently open into a loading filling box. The loading filling box, having been charged with the mixture, may then travel over a paver mold, filling the entire internal chamber of the mold with the mixture (with or without vibration/shaking).

In step 440, a tamper head may come down to apply pressure to the mixture inside the mold using approximately 3 MPa of pressure. In some embodiments, at least 0.3, 0.5, 1, 2, 3, 4, 5, 6, 7, 8, 9, 10, 20, or 30 MPa of pressure may be applied to the mixture inside the mold. In some embodiments, the pressure applied to the mixture inside the mold may be less than 30, 20, 10, 9, 8, 7, 6, 5, 4, 3, 2, 1, 0.5, or 0.3 MPa. While pressure is being applied, the mold may be vibrated for approximately 2 seconds. In some embodiments, the mold may vibrated for at least 1, 2, 3, 4, 5, 6, 7, 8 9, 10, 20, 30, 40, 50, or 60 seconds, or possibly more, such as at least 1, 2, 3, 4, 5, 6, 7, 8, 9, 10 minutes or more. In some embodiments, the mold may be vibrated for less than 10, 9, 8, 7, 6, 5, 4, 3, 2, or 1 minute, or possibly less, such as less than 60, 50, 40, 30, 20, 10, 9, 8, 7, 6, 5, 4, 3, 2, or 1 second.

In step 450, the mold may be raised and the tamper head pushed down to place one or more pavers onto a production board. The production board may then be pushed onto a conveyor and to an inlet elevator. In step 460, the inlet elevator may subsequently fill, and a finger car may pick up a batch of pavers and move them to drying racks. In step 470, the finger car may then transfer the batch of pavers (now cured) to an outlet elevator. In step 480, the production boards may be conveyed to a cuber. Therein, the production boards may pick up a batch of cured pavers and move the pavers onto a pallet for bagging and shipping. In step 490, empty production boards may return to the block machine ending one round of the exemplary paver manufacturing process. Equipment useful for manufacturing pavers of any type described herein is known and existing.

Pavers described herein, through different mixture designs and manufacturing methods, may be designed to have any of a number of different properties. For example, the material and methods described above for manufacturing pavers may be used to prepare a paver having a minimum compressive strength of 8000 psi, which compressive strength is the minimum American Society for Testing and Materials ("ASTM") requirement for pavers. In some embodiments, pavers described herein may have a compressive strength of at least 250, 500, 750, 1,000, 2,000, 3,000, 4,000, 5,000, 6,000, 7,000, 8,000, 9,000, 10,000, 11,000, 12,000, 13,000, 14,000, 15,000, or 16,000 psi. In some embodiments, pavers described herein may have a compressive strength of less than 16,000, 15,000, 14,000, 13,000, 12,000, 11,000, 10,000, 9,000, 8,000, 7,000, 6,000, 5,000, 4,000, 3,000, 2,000, 1,000, 750, 500, or 250 psi. Other properties that may be varied by mixture designs and/or manufacturing methods includes water absorption, flexural strength, skid resistance, coefficient of friction, freeze-thaw cycle resistance, and the like. With respect to different mixture designs, some exemplary paver mixture designs are included in Tables 1-7 below, wherein, for example, "15% cement" indicates a mixture comprising about 15% of a cement (e.g., ordinary Portland cement (OPC) and the like), sequestered-$CO_2$ component or precipitation material as described herein, or a combination thereof. Such a cement-sequestered-$CO_2$ component combination includes, in some embodiments, at least 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, or 99% sequestered-$CO_2$ component. In some embodiments, less than 99, 98, 97, 96, 95, 90, 85, 80, 75, 70, 65, 60, 55, 50, 45, 40, 35, 30, 25, 20, 15, 10, 9, 8, 7, 6, 5 4, 3, 2, or 1% sequestered-$CO_2$ component is included in the cement-sequestered-$CO_2$ component combination. While Tables 1-7 do not include any additional additives, a person having ordinary skill in the art will recognize that any of a number of additives may be added to adjust the properties of the mixture (e.g., flow) and/or the resulting pavers. Coloring agents, for example, may be added to any of the mixture designs below. In addition, or in the alternative, GLENIUM® 7500 may be used as a water-reducing admixture in any of the mixture designs below. In addition, or in the alternative, $CaCl_2$ may be used as an accelerator in any of the mixture designs below.

TABLE 1

Mix design for pavers comprising about 15% cement.

| Mix Design 15% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 144 | 150 | 156 | 162 | 168 | 174 | 180 |

TABLE 2

Mix design for pavers comprising about 16% cement.

| Mix Design 16% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 153.6 | 160 | 166.4 | 172.8 | 179.2 | 185.6 | 192 |

TABLE 3

Mix design for pavers comprising about 17% cement.

| Mix Design 17% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 163.2 | 170 | 176.8 | 183.6 | 190.4 | 197.2 | 204 |

TABLE 4

Mix design for pavers comprising about 18% cement.

| Mix Design 18% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 172.8 | 180 | 187.7 | 194.4 | 201.6 | 208.8 | 216 |

TABLE 5

Mix design for pavers comprising about 19% cement.

| Mix Design 19% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 182.4 | 190 | 197.6 | 205.2 | 212.8 | 220.4 | 228 |

TABLE 6

Mix design for pavers comprising about 20% cement.

| Mix Design 20% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 192 | 200 | 208 | 216 | 224 | 323 | 240 |

TABLE 7

Mix design for pavers comprising about 21% cement.

| Mix Design 21% Cement | 20% (¼ Gravel) | 25% | 30% | 35% | 40% | 45% | 50% |
|---|---|---|---|---|---|---|---|
| Slag | 600 | 600 | 600 | 600 | 600 | 600 | 600 |
| ¼ Gravel | 160 | 200 | 240 | 280 | 320 | 360 | 400 |
| Sand | 200 | 200 | 200 | 200 | 200 | 200 | 200 |
| Cement | 201.6 | 210 | 218.4 | 226.8 | 235.2 | 243.65 | 252 |

As described above, Table 1-7 are exemplary mixture designs. As such, the 15-21% cement designs may be modified to include more or less of the cement component, and, optionally, less or more of the slag component, respectively. In such mixture designs, the cement component may be at least 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 96, 97, 98, or 99% by weight. In some embodiments, the cement component may be less than 99, 98, 97, 96, 95, 90, 85, 80, 75, 70, 65, 60, 55, 50, 45, 40, 35, 30, 20, 25, 24, 23, 22, 21, 20, 19, 18, 17, 16, 15, 14, 13, 12, 11, 10, 9, 8, 7, 6, 5, 4, 3, 2, or 1% by weight.

Pavers may be of any desirable color, whether monotone or multicolor, and methods for introducing color into concrete pavers during their manufacture is well known. Pavers may be a natural light grey to white, which color may be possible without the addition of any additional color additives. For example, the larger the proportion of sequestered-$CO_2$ component in a concrete paver, the whiter the paver will be (absent other color additives [except whitening agents such as $TiO_2$ {e.g., titanium white, Pigment White 6, CI-77891, etc.}]). Such a paver may have a high albedo, which, in turn, may continually reduce carbon emissions via reduced lighting demands (e.g., due to consuming less electricity from $CO_2$-producing power plants). Because pavers described herein may be manufactured in many different colors, they too may be manufactured to register a particular reflectance. In some embodiments, for example, a paver may be prepared having a reflectance of at least 0.3 (e.g., as measured by a albedometer). In other embodiments, pavers may be prepared having a reflectance of greater than or less than 0.3 as the application or personal preference demands. Pavers having different reflectance values (e.g., some less than 0.3, some more than 0.3) may be combined to effect a paver surface having a combined reflectance, which, as above, may continually reduce carbon emissions via reduced lighting demands.

A paver, when viewed from above (despite the presence of beveled edges over square edges, each of which is possible for a paver described herein) may have a two-dimensional shape selected from the group consisting of a triangle, an octagon, a hexagon, a pentagon, a circle, a half circle, an oval, a zigzag, a keyhole, a diamond, a fan, a parallelogram, a rectangle, a square, an X-shape, and a W-shape. Other shapes, too, are possible, including combinations of the foregoing. It should be understood that pavers are three-dimensional objects and that the foregoing description applies when viewing a paver from directly above (or directly below). For example, a paver might appear as a rectangle when viewed from directly above, but such a paver will appear to be in the shape of a brick when viewed from an angle other than from directly above. Likewise, a paver might appear as a square when viewed from directly above, but such a paver will appear to be in the shape of a brick or block or cube when viewed from an angle other than from directly above. FIG. 5 provides an illustration of some of the foregoing pavers, and includes some additional pavers that may be manufactured as described herein. The thickness of the foregoing pavers may vary. Concrete pavers may range in thickness depending upon the desired application. Commonly, pavers range from about 1 cm thick to about 12 cm thick. As such, a paver may be at least 1 cm, 2 cm, 3 cm, 4 cm, 5 cm, 6 cm, 7 cm, 8 cm, 9 cm, 10 cm, 11 cm, 12 cm thick. A paver may also be less than 1 cm, 2 cm, 3 cm, 4 cm, 5 cm, 6 cm, 7 cm, 8 cm, 9 cm, 10 cm, 11 cm, 12 cm thick. It should be noted that pavers described herein are not limited to the foregoing thicknesses as a paver, depending upon the application may exceed 12 cm thick. Commonly, pavers have a thickness between 6 cm to 8 cm, wherein 6 cm-thick pavers are generally accepted for pedestrian use (and light vehicle applications), and wherein 8 cm-pavers are generally accepted for heavy vehicular and industrial applications.

Pavers, such as those described herein, may have shapes that are further defined by one or more aspect ratios, including the length-to-width ratio and the length-to-thickness ratio. Aspect ratios are generally used to evaluate the paving units flexural capacity to sustain load without cracking. Regarding the length-to-width ratio, it is generally between 2:1 and 3:1, and it can be determined by dividing the longer surface dimension of a paver by the shorter surface dimension. Regarding the length-to-thickness ratio of a paver, it can be determined by dividing the longest surface dimension of a paver by the thickness. Pavers having length-to-thickness ratios between 3:1 and 4:1 are acceptable for light to medium vehicular applications. Pavers having a length-to-thickness ratio that exceeds 4:1 should not be used in vehicular applications, and optionally, might be used for any other application (e.g., walkways) described herein requiring less robust pavers. For example, a paver measuring 4"×8"×2⅜" yields an aspect ratio of 3.4:1, which is suitable light to medium vehicular traffic. A paver measuring 12"×12"×2⅜" yields an aspect ratio of 5:1, which is not suitable for vehicular applications. Given the description of paver aspect ratios for certain applications and the above range of paver thicknesses, a person having ordinary skill in the art will recognize preferred paver dimensions for certain applications. For example, a paver prepared in accordance with the methods described herein for light to medium vehicular applications (e.g., length-to-thickness aspect ratio of 3:1 to 4:1) may have a length-to-thickness ratio of 3.4:1 and a thickness of 2⅜". Such a paver would, in one embodiment, have a surface length and width of 12".

As described in U.S. patent application Ser. No. 12/716,236, filed 2 Mar. 2010, titled "Gas Stream Multipollutants Control Systems and Methods," compositions manufactured using sequestered-$CO_2$ component described herein, including pavers, might contain, in one form or another, metals such as As, Ag, Ba, Be, Cd, Co, Cr, Cu, Hg, Mo, Ni, Pb, Se, Sb, Tl, V, or Zn, or combinations thereof, as well as other chemical species that might be considered contaminants if released into the environment. Such metals and contaminants may directly result from use of $CO_2$-containing flue gas (e.g., from a coal-fired power plant), which flue gas may contain said metals as well as SOx, NOx, acid gases, etc. Potential for release of contaminants into the environment may be tested by mixing the composition (e.g., a paver) with an extraction solution, agitating the resultant mixture, and filtering the agitated mixture to produce a testable leachate. Compositions (e.g., pavers) may be tested using any of a variety of tests as different tests have been developed to simulate different environmental conditions. Such tests include, but are not limited to, Toxicity Characteristic Leaching Procedure (TCLP; US EPA Method 1311), Extraction Procedure Toxicity Test (EP-Tox; US EPA Method 1310), Synthetic Precipitation Leaching Procedure (SPLP; US EPA Method 1312), California Waste Extraction Test (WET; California Code of Regulations), Soluble Threshold Limit Concentration (STLC; California Code of Regulations), American Society for Testing and Materials Extraction Test (ASTM D 3987-85), and Multiple Extraction Procedure (MEP; US EPA Method 1320), as such tests and limits defined is such tests exist on the filing date of this patent application. Regulatory water extraction test conditions as defined by waste control regulations in, for example, the United Kingdom, Thailand, Japan, Switzerland, Germany, Sweden, the Netherlands may also be used. Such tests may differ in, for example, extraction solutions, liquid to solid (L/S) ratios, and/or number and duration of extractions. Regarding extract solutions, such tests commonly use aqueous acetic acid, aqueous citric acid, distilled water, synthetic rainwater, or carbonated water.

Pavers may also be engraved (e.g., for a commemorative occasion) such that each has a unique pattern, or such that when used to pave a surface, the surface comprises a unique pattern. In some embodiments, the foregoing pavers may comprise lights (e.g., pavers having lights built in) for decorative or safety purposes.

Construction panels are formed building materials employed in a broad sense to refer to any non-load-bearing structural element that are characterized such that their length and width are substantially greater than their thickness. Exemplary construction panels include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel provided is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas). The maximum water absorption of the cement boards may vary, ranging from 5 to 15% by weight, including 8 to 10%, such as 9%. Cement boards may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The building composition comprising the sequestered-$CO_2$ component (e.g., component comprising carbonates, bicarbonates, or a combination thereof) may be used to produce the desired shape and size to form a cement board. In addition, a variety of further components may be added to the cement boards which include but are not limited to: plasticizers, foaming agents, accelerators, retarders and air entrainment additives. The building material composition comprising the sequestered-$CO_2$ component may then be poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards then may be covered in a fiberglass mat on both faces of the board. Where desired, the cement boards may also be prepared using chemical admixtures such that they possess increased fire, water, and frost resistance as well as resistance to damage by bio-degradation and corrosion. The cement board may also be combined with components such as dispersed glass fibers, which may impart improved durability, increased flexural strength, and a smoother surface.

Another type of construction panel provided is fiber-cement siding. Fiber-cement sidings are formed building materials used to cover the exterior or roofs of buildings and include, but are not limited to building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm Fiber-cement sidings may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments, fiber-cement sidings may be employed on buildings that are subject to varying weather conditions, in some embodiments ranging from extremely arid to wet (i.e., low to high levels of humidity). Accordingly, the maximum water absorption of the fiber-cement sidings may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The building composition comprising the sequestered-$CO_2$ component (e.g., component comprising carbonates, bicarbonates, or a combination thereof) may be used to produce the desired shape and size to form a fiber-cement siding. In addition, a variety of further components may be added to the fiber-cement sidings which include but are not limited to: cellulose fibers, plasticizers, foaming agents, accelerators, retarders and air entrainment additives. The building material composition comprising the sequestered-$CO_2$ component may then be poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding The shaped composition is then allowed to set and further cured in an environment with a controlled temperature and humidity. The fiber-cement sidings may then be covered with a polymeric film, enamel or paint. Where desired, the fiber-cement sidings may also be prepared using chemical admixtures such that they possess increased fire, water, and frost resistance as well as resistance to damage by bio-degradation and corrosion.

Another type of construction panel provided herein is drywall, which, conventionally, refers to a manufactured building material comprising gypsum used to finish construction of interior walls and ceilings. Such drywall comprises an inner core of gypsum, which inner core is sandwiched between a lining material (e.g., paper or fiberglass). Drywall provided herein comprises an inner core comprising at least some amount of a sequestered-$CO_2$ component (e.g., component comprising carbonates, bicarbonates, or a combination thereof), if the inner core is not entirely sequestered-$CO_2$ component, as it is in some embodiments. Utilizing an amount of sequestered-$CO_2$ component helps reduce the carbon footprint of otherwise conventional drywall by substituting $CaSO_4.0.5H_2O$ used in the preparation of drywall with a component (e.g., sequestered-$CO_2$ component) derived from CO$_2$ emissions. The carbon footprint of otherwise conventional drywall is thus lowered due to the replacement of CaSO$_4$.2H$_2$O ("gypsum") in drywall, which gypsum is rehydrated and recrystallized from a CaSO$_4$.0.5H$_2$O feedstock, and which feedstock is commonly known as "calcined gypsum" due to the energy-intensive calcination (e.g., 150-160° C. until ~75% of the water in gypsum is evaporated) used in its production. As such, a drywall slurry used in production of the inner core of drywall may comprise at least 1%, 5%, 10%, 15%, 20%, 25%, 30%, 35%, 40%, 45%, 50%, 55%, 60%, 65%, 70%, 75%, 80%, 85%, 90%, 95%, 99%, 99.9%, or 100% (w/w) sequestered-CO$_2$ component (e.g. carbonates, bicarbonates, or a combination of carbonates and bicarbonates), the remainder of the drywall slurry being conventional material such as CaSO$_4$.0.5H$_2$O. Drywall slurry used in production of the inner core of drywall may comprise less than 100%, 99.9%, 99%, 95%, 90%, 85%, 80%, 75%, 70%, 65%, 60%, 55%, 50%, 45%, 40%, 35%, 30%, 25%, 20%, 15%, 10%, 5%, or 1% (w/w) sequestered-CO$_2$ component (e.g. carbonates, bicarbonates, or a combination of carbonates and bicarbonates), the remainder of the drywall slurry being conventional material such as CaSO$_4$.0.5H$_2$O. Combinations of the foregoing are also possible. For example, in some embodiments, a drywall slurry used in production of the inner core of drywall may comprise at least 1% and less than 100% (w/w) sequestered-CO$_2$ component, at least 50% and less than 100% sequestered-CO$_2$ component, at least 75% and less than 100% sequestered-CO$_2$ component, and the like, the remainder of the drywall slurry being conventional material such as CaSO$_4$.0.5H$_2$O. The sequestered-CO$_2$ component in such drywall slurries may be, as indicated, carbonates, bicarbonates, or a combination of carbonates and bicarbonates. In some embodiments, the sequestered-CO$_2$ component comprises metastable carbonates such as amorphous calcium carbonate, vaterite, and aragonite. As described herein, metastable carbonates, upon addition of fresh water or washing with fresh water (e.g., to remove stabilizing components) facilitates the thermodynamic transformation of metastable carbonate compounds to more stable carbonate compounds (e.g., calcite). Using this thermodynamic driving force, drywall slurry comprising metastable carbonates such as amorphous calcium carbonate, vaterite, and aragonite, optionally with an amount of CaSO$_4$.0.5H$_2$O, may form stable carbonates (or more stable [e.g., less metastable] carbonates), optionally with an amount of gypsum, in the final drywall product. As such, the inner core of drywall product may comprise at least 1%, 5%, 10%, 15%, 20%, 25%, 30%, 35%, 40%, 45%, 50%, 55%, 60%, 65%, 70%, 75%, 80%, 85%, 90%, 95%, 99%, 99.9%, or 100% (w/w) sequestered-CO$_2$ component (e.g. carbonates, bicarbonates, or a combination of carbonates and bicarbonates) such as calcite, the remainder of the inner core being conventional material such as gypsum. The inner core of drywall product may comprise less than 100%, 99.9%, 99%, 95%, 90%, 85%, 80%, 75%, 70%, 65%, 60%, 55%, 50%, 45%, 40%, 35%, 30%, 25%, 20%, 15%, 10%, 5%, or 1% (w/w) sequestered-CO$_2$ component (e.g. carbonates, bicarbonates, or a combination of carbonates and bicarbonates) such as calcite, the remainder of the inner core being conventional material such as gypsum. Combinations of the foregoing are also possible. For example, in some embodiments, the inner core of drywall product may comprise at least 1% and less than 100% (w/w) sequestered-CO$_2$ component (e.g., calcite), at least 50% and less than 100% sequestered-CO$_2$ component (e.g., calcite), at least 75% and less than 100% sequestered-CO$_2$ component (e.g., calcite), and the like, the remainder of the inner core being conventional material such as gypsum. Material prepared from CaSO$_4$ and Na$_2$CO$_3$ as described in U.S. Provisional Patent Application 61/514,879, filed 3 Aug. 2011, which application is incorporated herein by reference, may also be used as sequestered-CO$_2$ component in place of conventional drywall material. FIG. 7 provides SEM images of different drywall products described herein, one of which comprises 10% sequestered-CO$_2$ component, specifically, 10% NaHCO$_3$ in combination with gypsum. Vaterite may also be used at the sequestered-CO$_2$ component, and depending upon whether transformation to less stable polymorphs has occurred or not, may be present in the drywall product. FIG. 7 also provides an SEM image a drywall product comprising 10% sequestered-CO$_2$ component, specifically, 10% vaterite in combination with gypsum. Drywall comprising sequestered-CO$_2$ component meets or exceeds ASTM drywall specifications (e.g., flexural strength, hardness, nail pull resistance), while adding value, including higher strength, lower density, improved thermal properties (e.g., decomposition of sequestered-CO$_2$ component [e.g., bicarbonate] in fire, which CO$_2$ has fire extinguishing capabilities), foam textures, decreased solubility (especially with carbonate substitution), sound proofing, odor removal, increased fire protection, and antimicrobial properties (e.g., owing to higher alkalinity of drywall comprising sequestered-CO$_2$ component). FIG. 8 provides a plot of compressive strength (MPa or psi) versus drywall ("board") density for an industrial reference and drywall product described herein. As shown, the drywall products (e.g., 10% vaterite/90% gypsum; 20% vaterite/80% gypsum) closely conform to the industrial reference.

In producing drywall comprising a sequestered-CO$_2$ component, an amount of CaSO$_4$.0.5H$_2$O (if gypsum is to be present in the drywall product) and sequestered-CO$_2$ component (e.g., dried sequestered-CO$_2$ component), each of which may be pre-ground to a particular fineness, may be mixed with water, optionally comprising additives, and optionally comprising paper pulp, to produce a drywall slurry. If the CO$_2$-sequestration process is integrated with the manufacturing of drywall product, it may not be necessary to dewater the slurry comprising the precipitation material in process water; instead, the slurry comprising the precipitation material in process water may be used as the drywall slurry, optionally, with an amount of process water removed to provide the appropriate slurry concentration. Additives to the drywall slurry may include, but are not limited to, anti-desiccants (e.g. starch, either acid-modified starch or natural starch made from corn, potato, and/or wheat stock), plasticizers, fibrous materials (e.g. wood fibers, dry paper fibers, cellulose fibers, perlite, fiberglass and/or glass fibers) to lower drywall product density and to increase physical properties, accelerators (e.g., fine gypsum powder; ground land plaster; potassium sulfate; potash; etc.), set retarders (e.g. diethylene triamine pentaacetic acid ["DTPA"]; EDTA; etc), foaming agents (e.g., alkyl ether sulfate or ammonium alkyl ethoxy sulfate) to decrease density in the drywall product, and agents for mildew resistance and fire resistance (e.g., fiberglass; vermiculite; boric acid; etc.). Additional additives (e.g., polyvinyl alcohol) may be used for reinforcing drywall (or any formed building materials described herein), some of which may be found in U.S. Provisional Patent Application No. 61/541,735, filed 30 Sep. 2011, titled "Cement and Concrete with Reinforced Material," which application is incorporated herein by reference in its entirety. It should be noted here that bicarbonate, if present in the sequestered-CO$_2$ component, may be decomposed (e.g., with acid such as HCl or H$_2$SO$_4$, optionally electrochemically produced as described herein) under controlled conditions to generate carbon dioxide, avoiding the use of additional chemical foaming agents. In addition, recycled materials may be added to the drywall slurry mixture, the recycled materials selected from the group consisting of fly ash, slag, cement kiln dust, and combinations thereof. The drywall slurry, obtained after blending an amount of $CaSO_4.0.5H_2O$ (if gypsum to be present in drywall product) and sequestered-$CO_2$ component with water, may be deposited between two sheets of backing material (e.g., paper; fiberglass, etc.) and cured to evaporate any residual water. Surprisingly, due to the unique properties of sequestered-$CO_2$ component, especially when the sequestered-$CO_2$ component comprise metastable carbonates (e.g., vaterite), it has been found that drywall slurry comprising sequestered-$CO_2$ component may be molded to produce a drywall product without a backing material. For example, a drywall slurry mixture comprising vaterite, optionally with added $CaSO_4.0.5H_2O$, may be molded to ultimately form a drywall product without a backing material. Any $CaSO_4.0.5H_2O$ present in the foregoing drywall slurry mixtures may be rehydrated and converted to $CaSO_4.2H_2O$ ("gypsum"). And, as above, any metastable carbonates (e.g., vaterite) present in the sequestered-$CO_2$ component may re-precipitate to more stable carbonates (e.g., calcite). After removal of residual water, drywall may then be cut for commercial use as a building material.

The dimensions of the drywall building materials may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided may possess physical and mechanical properties that vary considerably, and may depend upon the amount of the conventional constituents of drywall preparation that are replaced with the composition comprising the sequestered-$CO_2$ component (e.g., component comprising carbonates, bicarbonates, or a combination thereof). The flexural and compressive strengths of drywall comprising sequestered-$CO_2$ component are generally larger than conventional drywall, which is known to be a soft construction material. In some embodiments, the flexural strength may range between 0.1 to 3 MPa, including 0.5 to 2 MPa, such as 1.5 MPa. The compressive strengths may also vary, as described herein for formed building materials comprising sequestered-$CO_2$. In some instances, the compressive strength of drywall comprising sequestered-$CO_2$ component may range from 1 to 40 MPa, 1 to 30 MPa, 1 to 20 MPa, 5 to 15 MPa, or 8 to 10 MPa. The maximum water absorption of drywall may vary, ranging from 2 to 10% by mass, including 4 to 8%, such as 5%. It has also been found that drywall described herein that comprises sequestered-$CO_2$ component has better insulation properties than conventional drywall, better acoustic properties than conventional drywall, and better fire resistance properties than conventional drywall. In addition, with respect to strength and porosity, drywall described herein that comprises sequestered-$CO_2$ component has been found to have a higher strength than conventional drywall at a given porosity. As such, the drywall provided herein can be more porous (e.g., have a porosity given herein) than conventional drywall, yet be as strong or stronger (e.g., compressive strength; flexural strength; etc., as provided herein) than conventional drywall. Decomposition or combustion of conventional drywall releases sulfuric dioxide ($SO_2$) and hydrogen sulfide ($H_2S$), two toxic gases and notable precursors of acid deposition associated with soils and water acidification. Sulfate leaching of conventional drywall may also contaminate groundwater. Replacement of some or all of the $CaSO_4$ in conventional drywall with sequestered-$CO2$ component lessens the amount of sulfuric dioxide ($SO_2$) and hydrogen sulfide ($H_2S$) that can be released up decomposition of combustion of the drywall provided herein. An additional advantage of using less $CaSO4$ in drywall is that less sulfate may contaminate groundwater.

Another building material provided is a conduit. Conduits are tubes or analogous structures configured to convey a gas or liquid, from one location to another. Conduits may include any of a number of different structures used in the conveyance of a liquid or gas that include, but are not limited to pipes, culverts, box culverts, drainage channels and portals, inlet structures, intake towers, gate wells, outlet structures, and the like. Conduits may vary considerably in shape, which is generally determined by hydraulic design and installation conditions. Shapes of conduits may include, but are not limited to circular, rectangular, oblong, horseshoe, square, etc. Multiple cell configurations of conduits are also possible. Conduit design may vary depending on its intended use. As such, conduits may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits may be designed in order to support high internal pressure from water flow within the conduit. In yet other embodiments, conduits may be designed to support high external loadings (e.g., earth loads, surface surcharge loads, vehicle loads, external hydrostatic pressures, etc.). Accordingly, the compressive strength of the walls of conduits may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits. In producing conduits, the building material composition comprising the sequestered-$CO_2$ component (e.g., component comprising carbonates, bicarbonates, or a combination thereof) may be poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits may include a variety of further components, such as but not limited to: plasticizers, foaming agents, accelerators, retarders and air entrainment additives. Where desired, the further components may include chemical admixtures such that the conduits possess increased resistance to damage by bio-degradation, frost, water, fire and corrosion. In some embodiments, the conduits may employ structural support components such as, but not limited to, cables, wires and mesh composed of steel, polymeric materials, ductile iron, aluminum or plastic.

Another building material provided is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the building material composition comprising the sequestered-$CO_2$ component (e.g., component comprising carbonates, bicarbonates, or a combination thereof) may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins may include a variety of further components, such as but not limited to: plasticizers, foaming agents, accelerators, retarders and air entrainment additives. Where desired, the further components may include chemical admixtures such that the basins possess increased resistance to damage by bio-degradation, frost, water, fire and corrosion. In some embodiments, the basins may employ structural support components such as, but not limited to cables, wires and mesh composed of steel, polymeric materials, ductile iron, aluminum or plastic.

Another building material provided by is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams, the building material composition comprising sequestered-$CO_2$ component (e.g., component comprising carbonates, bicarbonates, or a combination thereof) may be poured into a beam mold or cast around a correlated steel reinforcing beam structure (e.g., steel rebar). In some embodiments, the steel reinforcement is pretensioned prior to casting the composition around the steel framework. In other embodiments, beams may be cast with a steel reinforcing cage that is mechanically anchored to the concrete beam. The beams may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams may include a variety of further components, such as but not limited to: plasticizers, foaming agents, accelerators, retarders and air entrainment additives. Where desired, the further components may include chemical admixtures such that the beams possess increased resistance to damage by bio-degradation, frost, water, fire and corrosion.

Another building material is a column, which, in a broad sense, refers to a vertical load-bearing structure that carries loads chiefly through axial compression and includes structural elements such as compression members. Other vertical compression members may include, but are not limited to pillars, piers, pedestals, or posts. Columns may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns possess a width that is not more than four times its thickness. Columns may be constructed such that they are solid, hollow (e.g., decorative columns), reinforcement filled, or any combination thereof. Columns may be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties. Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns, the building material composition comprising sequestered-$CO_2$ component (e.g., component comprising carbonates, bicarbonates, or a combination thereof) may be poured into a column form or cast around a correlated steel reinforcing column structure (e.g., steel rebar). In some embodiments, the steel reinforcement is pretensioned prior to casting the composition around the steel framework. In other embodiments, columns may be cast with a steel reinforcing cage that is mechanically anchored to the concrete column. The columns may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns may include a variety of additional components, such as but not limited to: plasticizers, foaming agents, accelerators, retarders and air entrainment additives. Where desired, these additional components may include chemical admixtures such that the columns possess increased resistance to damage by bio-degradation, frost, water, fire and corrosion.

Another building material provided is a concrete slab. Concrete slabs are those building materials used in the construction of prefabricated foundations, floors and wall panels (e.g., landscape wall). In some instances, a concrete slab may be employed as a floor unit. (e.g., hollow plank unit or double tee design) In other instances, a precast concrete slab may be a shallow precast plank used as a foundation for in-situ concrete formwork. Wall panels are, in a broad sense, vertical load-bearing members of a building that are polygonal and possess a width that is more that four times its thickness. Precast concrete foundation, floors and wall panels may vary considerably in dimension depending on the intended use of the precast concrete slab (e.g., one or two storey building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack sequestered-$CO_2$ components (e.g., components comprising carbonates, bicarbonates, or a combination thereof). In addition, structures made from amorphous building materials comprising sequestered-$CO_2$ components may be thicker than corresponding structures that lack the sequestered-$CO_2$ components. Such increased thickness directly relates to increased sequestered-$CO_2$ component content. In some embodiments, thickness of formed building materials or related structures is increased by 1.5 fold or more, 2-fold or more, or 5-fold or more. Concrete slabs may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the building material composition comprising the sequestered-$CO_2$ component may be poured into a slab mold or cast around a correlated steel reinforcing structure (e.g., steel rebar). In some embodiments, the steel reinforcement is pretensioned prior to casting the composition around the steel framework. In other embodiments, slabs may be cast with a steel reinforcing cage that is mechanically anchored to the concrete slab. In some embodiments, the concrete slabs may improve its structural capacity by casting a second, supportive concrete layer that is mechanically anchored to the previously precast concrete slab. The slabs may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs may include a variety of further components, such as but not limited to: plasticizers, foaming agents, accelerators, retarders and air entrainment additives. Where desired, the further components may include chemical admixtures such that the slabs possess increased resistance to damage by bio-degradation, frost, water, fire and corrosion.

Another building material provided is an acoustic barrier, which refers to a structure used as a barrier for the attenuation or absorption of sound. As such, an acoustic barrier may include, but is not limited to structures such as acoustical panels, reflective barriers, absorptive barriers, reactive barriers, etc. Acoustic barriers may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers. In some embodiments, acoustic barriers may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers, the building material composition comprising sequestered-$CO_2$ component (e.g., component comprising carbonates, bicarbonates, or a combination thereof) may be poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers may include a variety of further components, such as but not limited to: plasticizers, foaming agents, accelerators, retarders and air entrainment additives. Where desired, the further components may include chemical admixtures such that they possess increased resistance to damage by biodegradation, frost, water, fire and corrosion. In some embodiments, the acoustic barriers may employ structural support components such as, but not limited to cables, wires and mesh composed of steel, ductile iron, polymeric fibers, aluminum or plastic.

Another building material provided is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments, an amount of cementitious forming material may be replaced by the sequestered-$CO_2$ component (e.g., component comprising carbonates, bicarbonates, or a combination thereof) where it may be 1% by weight or more, such as 3% by weight or more, including 5% by weight or more, such as 25% by weight or more, 50% by weight or more, etc. Binding compositions for the insulation material include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments, an amount of the binding composition may be replaced by the sequestered-$CO_2$ component and may be 1% by weight or more, such as 3% by weight or more, including 5% by weight or more, such as 25% by weight or more, 50% by weight or more, etc. Where desired, insulation material may also be prepared using a chemical admixture or any other convenient protocol such that they are resistant to damage by termites, insects, bacteria, fungus. etc. Insulation materials may be prepared using any convenient protocol such that they are freeze/thaw, rain and fire resistant. Insulation material may be prepared in accordance with traditional manufacturing protocols for such materials, with the exception that an amount of sequestered-$CO_2$ component (e.g., component comprising carbonates, bicarbonates, or a combination thereof) is employed. In producing the insulation materials, an amount of sequestered-$CO_2$ component) may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In addition to the foregoing formed building materials, parking blocks and related parking structures (e.g., lamp post base) for parking lots are also possible. In addition, cladding-type materials may be produced, such materials including, but not limited to, window cladding, crown molding, base board, and door trim.

Preparation of Formed Building Materials

Provided herein are methods for preparing formed building materials comprising sequestered $CO_2$ (e.g., sequestered-$CO_2$ component comprising carbonates, bicarbonates, or a combination thereof). Such building materials may be prepared by first producing a sequestered-$CO_2$ component, and then preparing the building material from the sequestered-$CO_2$ component. The sequestered-$CO_2$ component of formed building materials described herein may be produced from a source of $CO_2$, a source of proton-removing agents (and/or methods of effecting proton removal), and a source of divalent cations, each of which materials are described in further detail immediately below.

Carbon Dioxide

Methods include contacting a volume of an aqueous solution of divalent cations with a source of $CO_2$, then subjecting the resultant solution to conditions that facilitate precipitation. Methods further include contacting a volume of an aqueous solution of divalent cations with a source of $CO_2$ while subjecting the aqueous solution to conditions that facilitate precipitation. There may be sufficient carbon dioxide in the divalent cation-containing solution to precipitate significant amounts of carbonate-containing precipitation material (e.g., from seawater); however, additional carbon dioxide is generally used. The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste gas stream (i.e., a by-product of an active process of the industrial plant) such as exhaust from an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems described herein. In some embodiments, combustion gases in post-combustion effluent stacks of industrial plants such as power plants, cement plants, and coal processing plants is used.

Thus, the waste streams may be produced from a variety of different types of industrial plants. Suitable waste streams include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, a waste stream suitable for systems and methods described herein is sourced from a coal-fired power plant, such as a pulverized coal power plant, a supercritical coal power plant, a mass burn coal power plant, a fluidized bed coal power plant; in some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used in accordance with systems and methods described herein.

Waste streams produced by cement plants are also suitable for systems and methods described herein. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas comprising $CO_2$ is from 0° C. to 2000° C., such as from 60° C. to 700° C., and including 100° C. to 400° C.

In some embodiments, one or more additional components or co-products (i.e., products produced from other starting materials [e.g., SOx, NOx, etc.] under the same conditions employed to convert $CO_2$ into carbonates) are precipitated or trapped in precipitation material formed by contacting the waste gas stream comprising these additional components with an aqueous solution comprising divalent cations (e.g., alkaline earth metal ions such as $Ca^{2+}$ and $Mg^{2+}$). Sulfates, sulfites, and the like of calcium and/or magnesium may be precipitated or trapped in precipitation material (further comprising calcium and/or magnesium carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In addition, $CaCO_3$, $MgCO_3$, and related compounds may be formed without additional release of $CO_2$. In instances where the aqueous solution of divalent cations contains high levels of sulfur compounds (e.g., sulfate), the aqueous solution may be enriched with calcium and magnesium so that calcium and magnesium are available to form carbonate compounds after, or in addition to, formation of $CaSO_4$, $MgSO_4$, and related compounds. In some embodiments, a desulfurization step may be staged to coincide with precipitation of carbonate-containing precipitation material, or the desulfurization step may be staged to occur before precipitation. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, sulfates, etc.) is collected. In step with these embodiments, other components, such as heavy metals (e.g., mercury, mercury salts, mercury-containing compounds), may be trapped in the carbonate-containing precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems provided herein are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Divalent Cations

Methods include contacting a volume of an aqueous solution of divalent cations with a source of $CO_2$ and subjecting the resultant solution to conditions that facilitate precipitation. In some embodiments, a volume of an aqueous solution of divalent cations is contacted with a source of $CO_2$ while subjecting the aqueous solution to conditions that facilitate precipitation. Divalent cations may come from any of a number of different divalent cation sources depending upon availability at a particular location. Such sources include industrial wastes, seawater, brines, hard waters, rocks and minerals (e.g., lime, periclase, material comprising metal silicates such as serpentine and olivine), and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety. Any of the divalent cation sources described herein may be mixed and matched. For example, material comprising metal silicates (e.g. serpentine, olivine), which are further described in U.S. patent application Ser. No. 12/501,217, filed 10 Jul. 2009, which application is herein incorporated by reference, may be combined with any of the sources of divalent cations described herein.

In some locations, a convenient source of divalent cations for preparation of a precipitation material (e.g., carbonates, bicarbonates, or a combination thereof) is water (e.g., an aqueous solution comprising divalent cations such as seawater or surface brine), which may vary depending upon the particular location from which the water is sourced. Suitable aqueous solutions of divalent cations that may be used include solutions comprising one or more divalent cations, e.g., alkaline earth metal cations such as $Ca^{2+}$ and $Mg^{2+}$. In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cation are derived is an anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from Na+ and K+ are added to freshwater. In some embodiments, freshwater comprising $Ca^{2+}$ is combined with combustion ash (e.g., fly ash, bottom ash, boiler slag), or products or processed forms thereof, yielding a solution comprising calcium and magnesium cations.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material. If desired, the water may be cooled prior to entering a precipitation system. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

Proton-Removing Agents and Methods for Effecting Proton Removal

Methods include contacting a volume of an aqueous solution of divalent cations with a source of $CO_2$ (to dissolve $CO_2$) and subjecting the resultant solution to conditions that facilitate precipitation. In some embodiments, a volume of an aqueous solution of divalent cations is contacted with a source of $CO_2$ (to dissolve $CO_2$) while subjecting the aqueous solution to conditions that facilitate precipitation. The dissolution of $CO_2$ into the aqueous solution of divalent cations produces carbonic acid, a species in equilibrium with both bicarbonate and carbonate. In order to produce carbonate-containing precipitation material, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates include, but are not limited to, sodium carbonate and potassium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety, may be used alone or in combination with other proton-removing agents to provide proton-removing agents. Agricultural waste, either through animal waste or excessive fertilizer use, may contain potassium hydroxide (KOH) or ammonia ($NH_3$) or both. As such, agricultural waste may be used in some embodiments as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods described herein. Low-voltage electrochemical methods to remove protons that do not generate oxygen gas are also convenient for use in systems and methods described herein. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088,242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods described herein include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

Preparation of Sequestered-$CO_2$ Components and Building Materials Therefrom

A variety of different methods may be employed to prepare the $CO_2$-sequestrating component from the source of $CO_2$, the source of divalent cations, and the source of proton-removing agents. $CO_2$ sequestration protocols of interest include, but are not limited to, those disclosed in U.S. patent application Ser. Nos. 12/126,776, filed 23 May 2008; 12/163,205, filed 27 Jun. 2008; 12/344,019, filed 24 Dec. 2008; and 12/475,378, filed 29 May 2009, as well as U.S. Provisional Patent Application Ser. Nos. 61/017,405, filed 28 Dec. 2007; 61/017,419, filed 28 Dec. 2007; 61/057,173, filed 29 May 2008; 61/056,972, filed 29 May 2008; 61/073,319, filed 17 Jun. 2008; 61/079,790, 10 Jul. 2008; 61/081,299, filed 16 Jul. 2008; 61/082,766, filed 22 Jul. 2008; 61/088,347, filed 13 Aug. 2008; 61/088,340, filed 12 Aug. 2008; 61/101,629, filed 30 Sep. 2008; and 61/101,631, filed 30 Sep. 2008; the disclosures of which are incorporated herein by reference.

Sequestered-$CO_2$ components include compositions comprising carbonates, bicarbonates, and combinations thereof that may be produced by precipitation from a solution of divalent cations such as calcium and/or magnesium. The carbonate compound compositions include precipitated crystalline and/or amorphous carbonate compounds. The carbonates, bicarbonates, and combinations thereof that make up the sequestered-$CO_2$ components include metastable carbonate compounds that may be precipitated from a solution of divalent cations, such as a saltwater, as described in greater detail below. For convenience, the description provided herein is sometimes given in terms of saltwater; however, it is to be understood that any source of water comprising divalent cations may be used.

Saltwater-derived carbonate compound compositions (i.e., compositions derived from saltwater and made up of one or more different carbonate crystalline and/or amorphous compounds with or without one or more hydroxide crystalline or amorphous compounds) are ones that are derived from a saltwater. As such, they are compositions that are obtained from a saltwater in some manner, e.g., by treating a volume of a saltwater in a manner sufficient to produce the desired carbonate compound composition from the initial volume of saltwater. The carbonate compound compositions of certain embodiments are produced by precipitation from a solution of divalent cations (e.g., a saltwater) that includes alkaline earth metal cations, such as calcium and magnesium, etc., where such solutions of divalent cations may be collectively referred to as alkaline earth metal-containing waters.

The saltwater employed in methods may vary. As reviewed above, saltwater of interest include brackish water, seawater and brine, as well as other salines having a salinity that is greater than that of freshwater (which has a salinity of less than 5 ppt dissolved salts). In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds as mentioned above.

In methods of producing the carbonate compound compositions, a volume of water is subjected to carbonate compound precipitation conditions sufficient to produce a carbonate-containing precipitation material and a mother liquor (i.e., the part of the water that is left over after precipitation of the carbonate compound(s) from the saltwater). The resultant precipitation material and mother liquor collectively make up the carbonate compound compositions. Any convenient precipitation conditions may be employed, which conditions result in the production of a carbonate compound composition sequestration product.

Conditions that facilitate precipitation (i.e., precipitation conditions) may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitation material.

In normal seawater, 93% of the dissolved $CO_2$ is in the form of bicarbonate ions ($HCO_3^-$) and 6% is in the form of carbonate ions ($CO_3^{2-}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level that minimizes if not eliminates $CO_2$ production during precipitation, causing dissolved $CO_2$, e.g., in the form of carbonate and bicarbonate, to be trapped in the precipitation material. In these embodiments, the pH may be raised to 10 or higher, such as 11 or higher.

The pH of the water may be raised using any convenient approach. In certain embodiments, a proton-removing agent is employed, where examples of such agents include oxides, hydroxides (e.g., calcium oxide in fly ash, potassium hydroxide, sodium hydroxide, brucite ($Mg(OH)_2$), etc.), carbonates (e.g., sodium carbonate), and the like, many of which are described above. One such approach for raising the pH of the precipitation reaction mixture or precursor thereof (e.g., divalent cation-containing solution) is to use the coal ash from a coal-fired power plant, which contains many oxides. Other coal processes, like the gasification of coal, to produce syngas, also produce hydrogen gas and carbon monoxide, and may serve as a source of hydroxide as well. Some naturally occurring minerals, such as serpentine, contain hydroxide and may be dissolved to yield a source of hydroxide. The addition of serpentine also releases silica and magnesium into the solution, leading to the formation of silica-containing precipitation material. The amount of proton-removing agent that is added to the precipitation reaction mixture or precursor thereof will depend on the particular nature of the proton-removing agent and the volume of the precipitation reaction mixture or precursor thereof being modified, and will be sufficient to raise the pH of the precipitation reaction mixture or precursor thereof to the desired pH. Alternatively, the pH of the precipitation reaction mixture or precursor thereof may be raised to the desired level by electrochemical means as described above. Additional electrochemical methods may be used under certain conditions. For example, electrolysis may be employed, wherein the mercury cell process (also called the Castner-Kellner process); the diaphragm cell process, the membrane cell process, or some combination thereof is used. Where desired, byproducts of the hydrolysis product, e.g., $H_2$, sodium metal, etc. may be harvested and employed for other purposes, as desired. In yet other embodiments, the pH-elevating approach described in U.S. Provisional Patent Application Nos. 61/081,299, filed 16 Jul. 2008, and 61/091,729, filed 25 Aug. 2008, may be employed, the disclosures of which are incorporated herein by reference.

Additives other than pH-elevating agents may also be introduced into the water in order to influence the nature of the precipitation material that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$, which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitation material can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph. As such, a wide range of magnesium:calcium ratios can be employed, including, for example, 100:1, 50:1, 20:1, 10:1, 5:1, 2:1, 1:1, 1:2, 1:5, 1:10, 1:20, 1:50, 1:100, or any of the ratios mentioned above. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation also has a large effect on compound phase formation. The most rapid precipitation can be achieved by seeding the solution with a desired phase. Without seeding, rapid precipitation can be achieved by rapidly increasing the pH of the seawater, which results in more amorphous constituents. When silica is present, the more rapid the reaction rate, the more silica is incorporated in the carbonate-containing precipitation material. The higher the pH is, the more rapid the precipitation is and the more amorphous the precipitation material.

Accordingly, a set of precipitation conditions to produce a desired precipitation material from a solution of divalent cations includes, in certain embodiments, the water's temperature and pH, and in some instances, the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate-containing precipitation material may be batch or continuous protocols. It will be appreciated that precipitation conditions may be different to produce a given precipitation material in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subjected to $CO_2$ precipitation conditions. Accordingly, embodiments include methods in which the volume of water is contacted with a source of $CO_2$ prior to subjecting the volume of saltwater to mineral precipitation conditions. Embodiments include methods in which the volume of saltwater is contacted with a source of $CO_2$ while the volume of saltwater is being subjected to carbonate compound precipitation conditions. Embodiments include methods in which the volume of water is contacted with a source of a $CO_2$ both prior to subjecting the volume of saltwater to carbonate compound precipitation conditions and while the volume of saltwater is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that is contacted with the volume of saltwater in these embodiments may be any convenient $CO_2$ source, and the contact protocol may be any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. For exemplary system and methods for contacting the solution of divalent cations with the source of CO2, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference.

The above protocol results in the production of a slurry composition comprising precipitation material comprising carbonates, bicarbonates, or a combination thereof, and a mother liquor. Where desired, the compositions made up of the precipitation material and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components are then separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feed water (e.g., an ocean, a sea, etc.). Alternatively, the mother liquor may be further processed, e.g., subjected to desalination protocols, as described further in U.S. application Ser. No. 12/163,205; the disclosure of which is herein incorporated by reference.

In certain embodiments, following production of the precipitation material (e.g., composition comprising carbonates, bicarbonates, or combinations thereof), the precipitation material may be separated from the mother liquor to produce separated precipitation material. Separation of the precipitation material from the mother liquor may be achieved using any convenient approach, including draining mother liquor (or supernatant) from the precipitation material, either by gravity alone or with the addition of a vacuum; mechanical pressing; filtering the precipitation material from the mother liquor to produce a filtrate; etc. Separation of bulk water produces, in certain embodiments, a wet, dewatered precipitation material. Dewatered precipitation material may comprise at least 1%, 5%, 10%, 15%, 20%, 22%, 24%, 26%, 28%, 30%, 32%, 34%, 36%, 38%, 40%, 42%, 44%, 46%, 48%, 50%, 52%, 54%, 56%, 58%, 60%, 62%, 64%, 66%, 68%, 70%, 72%, 74%, 76%, 78%, 80%, 82%, 84%, 86%, 88%, or 90% (w/w) or (w/v) solids (e.g. carbonates, bicarbonates, or a combination of carbonates and bicarbonates). Dewatered precipitation material may comprise less than 90%, 88%, 86%, 84%, 82%, 80%, 78%, 76%, 74%, 72%, 70%, 68%, 66%, 64%, 62%, 60%, 58%, 56%, 54%, 52%, 50%, 48%, 46%, 44%, 42%, 40%, 38%, 36%, 34%, 32%, 30%, 28%, 26%, 24%, 22%, 20%, 15%, 10%, 5%, or 1% (w/w) or (w/v) solids (e.g., carbonates, bicarbonates, or a combination of carbonates and bicarbonates). Combinations of the foregoing may also be used to dewatered precipitation material. For example, in some embodiments, dewatered precipitation material, which is a concentrated composition of precipitation material, concentrated with respect to carbonates, bicarbonates, or carbonates and bicarbonates, may comprise at least 20% solids and less than 90% solids, at least 25% solids and less than 90% solids, or at least 30% solids and less than 90% solids. Process water (i.e., water used for processing $CO_2$ to produce precipitation material comprising carbonates, bicarbonates, or a mixture of carbonates and bicarbonates) may be partially removed such that the remainder of water in a slurry comprising precipitation material may be used as mix water (e.g., admixture solution) for preparing compositions (e.g., compositions having components such as those described in Table A1 and A2) for producing formed building materials. As such, a slurry comprising precipitation material may be dewatered such that the water:precipitation material is less than 0.7, 0.6, 0.5, 0.4, 0.3, 0.2, or 0.1 (measured as one would measure water:cement in preparing a cement or concrete mixture). A slurry comprising precipitation material may be dewatered such that the water:precipitation material is more than 0.1, 0.2, 0.3, 0.4, 0.5, 0.6, or 0.7 (measured as one would measure water:cement in preparing a cement or concrete mixture). Combinations of the foregoing are also useful.

For example, in some embodiments, a slurry comprising precipitation material may be dewatered such that the water:precipitation material is less than 0.6 and more than 0.1, less than 0.5 and more than 0.2, or less than 0.4 and more than 0.2.

The resultant dewatered precipitation material (e.g., composition comprising carbonates, bicarbonates, or combinations thereof), which may still carry residual water, may then be dried, as desired, to produce a dry precipitation material. Optionally, the dewatered precipitation material may be washed before drying. For example, the precipitation material may be washed with freshwater to remove salts (such as NaCl) from the dewatered precipitation material before drying. Drying may be achieved by air drying the dewatered precipitation material. Where the dewatered precipitation material is air dried, air drying may be at room or elevated temperature. Elevated temperatures, in some embodiments, are greater than room temperature, such as greater than 20° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., or 250° C. Elevated temperatures, in some embodiments, are less than 250° C., 240° C., 230° C., 220° C., 210° C., 200° C., 190° C., 180° C., 170° C., 160° C., 150° C., 140° C., 130° C., 120° C., 110° C., 100° C., 90° C., 80° C., 70° C., 60° C., 50° C., 40° C., 30° C., or 20° C., but greater than room temperature. Combinations of the foregoing may be useful in describing the elevated temperatures that may be used to dry precipitation material. For example, in some embodiments, precipitation material may be dried at greater than 25° C. and less than 100° C., greater than 35° C. and less than 90° C., greater than 35° C. and less than 90° C., greater than 50° C. and less than 90° C., and greater than 60° C. and less than 85° C. Elevated temperatures may be attained in any conventional manner or apparatus commonly used for drying. In some embodiments, for example, a conventional apparatus that may be used for drying precipitation material is an oven. In some embodiments, dewatered precipitation material may be spray dried to dry the precipitation material, wherein a slurry comprising the precipitation material (optionally in process water or fresh water, for example, after washing to remove soluble salts) may be dried by feeding it through a hot gas (such as the gaseous waste stream from the power plant) (e.g., the slurry feed may be pumped through an atomizer into a main drying chamber and a hot gas may be passed as a co-current or counter-current to the atomizer direction. In some embodiments, dewatered precipitation material is dried using a swirl fluidizer. Depending on the particular drying protocol, the system may comprise a drying station that includes a filtration element, freeze drying structure, spray drying structure, etc. Precipitation material that has been dried (e.g., spray dried; dried by swirl fluidizer) may be more than 80%, 85%, 90%, 91%, 92%, 93%, 94%, 95%, 96%, 97%, 98%, 99%, or 99.9% solids. Precipitation material that has been dried (e.g., spray dried; dried by swirl fluidizer) may be less than 99.9%, 99%, 98%, 97%, 96%, 95%, 94%, 93%, 92%, 91%, 90%, 85%, or 80% (w/w) or (w/v) solids. Combinations of the foregoing may also be useful for describing precipitation material that has been dried. For example, in some embodiments, precipitation material that has been dried may be more than 80% and less than 99.9% solids, more than 85% and less than 99.9% solids, or more than 95% and less than 99.9% solids.

In certain embodiments, the precipitation material may be refined (i.e., processed), though it need not necessarily be refined, in some manner prior to subsequent use as a sequestered-$CO_2$ component. Refinement may include a variety of different protocols and may be performed on precipitation material comprising residual water, or precipitation material that has been further dried. In certain embodiments, the product may be subjected to mechanical refinement in order to obtain a product with desired physical properties (e.g., particle size, etc.). Grinding the precipitation material may be effected by any conventional grinder, including, but not limited to a ball mill, a rod mill, an autogenous mill, a semi-autogenous grinding ("SAG") mill, a pebble mill, a high pressure grinding roll, a buhrstone mill, a vertical shaft impactor mill (VSI mill), a tower mill, and a vibratory mill. The mean particle size of particles in precipitation material described herein may be at least 0.1, 0.05, 1, 5, 10, 15, 20, 25, 30, 35, 40, 45, 50, 75, 100, 150, 200, 250, 300, 350, 400, 450, 500, 600, 700, 800, 900, or 1000 microns, before or after refinement. In some embodiments, the mean particle size of particles in precipitation material described herein may be less than 1000, 900, 800, 700, 600, 500, 450, 400, 350, 300, 250, 200, 150, 100, 75, 50, 45, 40, 35, 30, 25, 20, 15, 10, 5, 1, 0.5, or 0.1 microns, before or after refinement. Combinations of the foregoing ranges (e.g., at 20 least 0.1 microns and less than 100 microns; at least 1 micron and less than 100 microns; at least 1 micron and less than 50 microns; at least 10 microns and less than 40 microns; etc.) may also be used to describe the mean particle size of precipitation material.

FIG. 1 provides a schematic flow diagram of a process for producing precipitation material comprising carbonates, bicarbonates, or a combination thereof. In FIG. 1, saltwater from saltwater source 110 is subjected to precipitation conditions (e.g., carbonate compound precipitation conditions) at precipitation step 120. As reviewed above, saltwater refers to any of a number of different types of aqueous fluids other than freshwater, including brackish water, seawater and brine (including man-made brines, e.g., geothermal plant wastewaters, desalination waste waters, etc), as well as other salines having a salinity that is greater than that of freshwater. The saltwater source from which the carbonate compound composition of the cements is derived may be a naturally occurring source, such as a sea, ocean, lake, swamp, estuary, lagoon, etc., or a man-made source.

In certain embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

In the embodiment depicted in FIG. 1, the water from saltwater source 110 is first charged with $CO_2$ to produce $CO_2$ charged water, which $CO_2$ is then subjected to carbonate compound precipitation conditions. As depicted in FIG. 1, a $CO_2$ gaseous stream 130 is contacted with the water at precipitation step 120. The provided gaseous stream 130 is contacted with a suitable water at precipitation step 120 to produce a $CO_2$ charged water. By $CO_2$ charged water is meant water that has had $CO_2$ gas contacted with it, where $CO_2$ molecules have combined with water molecules to produce, e.g., carbonic acid, bicarbonate and carbonate ion. Charging water in this step results in an increase in the $CO_2$ content of the water, e.g., in the form of carbonic acid, bicarbonate and carbonate ion, and a concomitant decrease in the $pCO_2$ of the waste stream that is contacted with the water. The $CO_2$ charged water is acidic, having a pH of 6 or less, such as 5 or less and including 4 or less. In certain embodiments, the concentration of $CO_2$ of the gas that is used to charge the water is 10% or higher, 25% or higher, including 50% or higher, such as 75% or even higher. Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

At precipitation step 120, carbonate compounds, which may be amorphous or crystalline, are precipitated. Precipitation conditions of interest include those that change the physical environment of the water to produce the desired precipitation material. For example, the temperature of the water may be raised to an amount suitable for precipitation of the desired carbonate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitation material. In certain embodiments, the temperature is raised using energy generated from low or zero carbon dioxide emission sources, e.g., solar energy source, wind energy source, hydroelectric energy source, etc. While the pH of the water may range from 7 to 14 during a given precipitation process, in certain embodiments the pH is raised to alkaline levels in order to drive the precipitation of carbonate compound as desired. In certain of these embodiments, the pH is raised to a level that minimizes if not eliminates $CO_2$ gas generation production during precipitation. In these embodiments, the pH may be raised to 10 or higher, such as 11 or higher. Where desired, the pH of the water is raised using any convenient approach. In certain embodiments, a pH-raising agent may be employed, where examples of such agents include oxides, hydroxides (e.g., sodium hydroxide, potassium hydroxide, brucite), carbonates (e.g. sodium carbonate) and the like. The amount of pH-elevating agent that is added to the saltwater source will depend on the particular nature of the agent and the volume of saltwater being modified, and will be sufficient to raise the pH of the saltwater source to the desired value. Alternatively, the pH of the saltwater source can be raised to the desired level by electrolysis of the water.

$CO_2$ charging and carbonate compound precipitation may occur in a continuous process or at separate steps. As such, in some embodiments, charging and precipitation may occur in the same reactor of a system (e.g., as illustrated in FIG. 1 at step 120). In yet other embodiments, these two steps may occur in separate reactors, such that the water is first charged with $CO_2$ in a charging reactor and the resultant $CO_2$ charged water is then subjected to precipitation conditions in a separate reactor.

Following production of precipitation material (e.g., material comprising carbonates, bicarbonates, or a combination thereof) from the water, the precipitation material may be separated from some or all the mother liquor to produce separated precipitation material, as illustrated at step 140 of FIG. 1. Separation of the precipitation material may be achieved using any convenient approach, including a mechanical approach, e.g., where bulk excess water is drained from the precipitation material, e.g., either by gravity alone or with the addition of vacuum, mechanical pressing, by filtering the precipitation material from the mother liquor to produce a filtrate, etc. For exemplary system and methods for bulk water removal that may be used, see U.S. Provisional Patent Application Nos. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference. Separation of bulk water produces a wet or dewatered precipitation material.

Dewatered precipitation material may be used directly in formed building materials described herein, or the dewatered precipitation material may be further dried. In some embodiments, the dewatered precipitation material may be used directly. Directly using the resultant dewatered precipitation material is convenient in applications that require some amount of water. In a non-limiting example, dewatered precipitation material may be mixed with ordinary Portland cement, wherein the dewatered precipitation material provides at least a portion of the water needed for hydration and placement of the cement mixture. In some embodiments, the dewatered precipitation material is more than 5% water, more than 10% water, more than 20% water, more than 30% water, more than 50% water, more than 60% water, more than 70% water, more than 80% water, more than 90% water, or more than 95% water. In some embodiments, the dewatered precipitation material provides at least 5% of the water, at least 10% of the water, at least 20% of the water, at least 30% of the water, at least 40% of the water, at least 50% of the water, at least 60% of the water, at least 70% of the water, at least 80% of the water, at least 90% of the water, or at least 95% of the water needed for the application that the dewatered precipitation material is being used. In some embodiments, the dewatered precipitation material provides all of the water needed for the application that the dewatered precipitation material is being used. For example, the dewatered precipitation material may provide all of the water needed for hydration and placement of a cement mixture of dewatered precipitation material and ordinary Portland cement. For instance, precipitation material may be dewatered such that the dewatered precipitation material comprises nearly 70% water, such as 66.5% water. The slurry of precipitation material may then be mixed with ordinary Portland cement such that the resultant cement mixture comprises 80% ordinary Portland cement and 20% precipitation material, wherein the water to cement (i.e., ordinary Portland cement and precipitation material) ratio is about 40%. By controlling the amount of water that is removed from the precipitation material, the carbon footprint of the material (e.g., concrete, formed building materials, etc.) being made from the precipitation material is being controlled as well, especially if the material requires water. With this in mind, the low, neutral, or negative carbon footprint of any of the product materials described herein may be further reduced by removing only as much water as needed from the precipitation material.

As described above, the resultant dewatered precipitation material may also be dried to produce a product, as illustrated at step 160 of FIG. 1. Drying may be achieved by air-drying the filtrate. Where the filtrate is air dried, air-drying may be at room or elevated temperature. Dewatered precipitation material may be air dried to produce a precipitation material that is less than 50% water, less than 40% water, less than 30% water, less than 20% water, less than 10% water, or less than 5% water. For example, dewatered precipitation material may be air dried to produce a precipitin material that is 30% or less water. Such precipitation material may be crushed with or without additional processing (e.g., high sheer mixing) and combined with other materials such as ordinary Portland cement to produce a cement mixture comprising a portion of the water needed for hydration and placement of the cement mixture. Drying may also be achieved by spray drying the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitation material from the separation reactor 140 may be washed before drying, as illustrated at optional step 150 of FIG. 1. The precipitation material may be washed with freshwater, e.g., to remove salts (such as NaCl) from the dewatered precipitation material. Used wash water may be disposed of as convenient, e.g., by disposing of it in a tailings pond, etc.

At step 170, the dried precipitation material is optionally refined, for example, to provide for desired physical characteristics, such as particle size, surface area, etc., or to add one or more components to the precipitation material, such as admixtures, aggregate, supplementary cementitious materials, etc., to produce a final product 180. With respect to particle size, and optionally after refining, the mean particle size of particles in the precipitation material, which may comprise vaterite, calcite, aragonite, amorphous calcium carbonate, or any combination thereof, may be at least 0.1, 0.5, 1, 2, 3, 4, 5, 6, 7, 8, 9, 10, 15, 20, 25, 30, 35, 40, 45, 50, 75, 100, 150, 200, 250, 300, 350, 400, 450, 500, 600, 700, 800, 900, or 1000 microns. In some embodiments, optionally after refining, the mean particle size of particles in the precipitation material, which may comprise vaterite, calcite, aragonite, amorphous calcium carbonate, or any combination thereof, is less than 1000, 900, 800, 700, 600, 500, 450, 400, 350, 300, 250, 200, 150, 100, 75, 50, 45, 40, 35, 30, 25, 20, 15, 10, 9, 8, 7, 6, 5, 4, 3, 2, 1, 0.5, or 0.1 microns. Combinations of the foregoing ranges (e.g., at 20 least 0.1 microns and less than 100 microns; at least 1 micron and less than 100 microns; at least 1 micron and less than 50 microns; at least 10 microns and less than 40 microns; etc.) may also be used to describe the mean particle size of precipitation material. In certain embodiments, precipitation material may be made up of particles having an average particle size ranging from 0.1 to 100 microns, such as 10 to 40 microns as determined using any convenient particle size determination protocol, such as multi-detector laser scattering or sieving (i.e. <38 microns). In certain embodiments, multimodal, (e.g., bimodal or other,) distributions are present. Bimodal distributions allow the surface area to be minimized, thus allowing a lower liquids/solids mass ratio for the cement yet providing smaller reactive particles for early reaction. In these instances, the average particle size of the larger size class can be upwards of 1000 microns (1 mm) The surface area of the components making up the precipitation material may vary. A given cement may have an average surface area sufficient to provide for a liquids to solids ratio upon combination with a liquid to produce a formed building material ranging from 0.5 $m^2$/gm to 50 $m^2$/gm, such as 0.75 to 20 $m^2$/gm and including 0.80 to 10 $m^2$/gm. In certain embodiments, the surface area of the cement ranges from 0.9 to 5 $m^2$/gm, such as 0.95 to 2 $m^2$/gm and including 1 to 2 $m^2$/gm, as determined using the surface area determination protocol described in Breunner, Emmit, and Teller (1953).

The precipitation material, and, hence, the sequestered-$CO_2$ component, may comprise metastable carbonate compounds precipitated from a solution of divalent cations, such as a saltwater, as described herein; however, the carbonate compounds are not limited to metastable carbonate compounds. Carbonate compounds may include precipitated crystalline and/or amorphous carbonate compounds. Specific carbonate minerals of interest include, but in no way are limited to, calcium carbonate minerals, magnesium carbonate minerals, and calcium magnesium carbonate minerals. Calcium carbonate minerals of interest include, but are not limited to, calcite ($CaCO_3$), aragonite ($CaCO_3$), vaterite ($CaCO_3$), ikaite ($CaCO_3.6H_2O$), and amorphous calcium carbonate($CaCO_3.nH_2O$). In some embodiments, the precipitation material, and, hence, the sequestered-$CO_2$ component, may comprise at least 1, 2, 3, 4, 5, 10, 15, 20, 25, 30, 35, 40, 45, 50, 55, 60, 65, 70, 75, 80, 85, 90, 95, 96, 97, 98, 99, 99.9% amorphous calcium carbonate, with the remaining precipitation material comprising calcite, aragonite, vaterite, or some combination thereof. In some embodiments, the precipitation material, and, hence, the sequestered-$CO_2$ component, may comprise less than 99.9, 99, 98, 97, 96, 95, 90, 85, 80, 75, 70, 65, 60, 55, 50, 45, 40, 35, 30, 25, 20, 15, 10, 5, 4, 3, 2, or 1% amorphous calcium carbonate, with the remaining precipitation material comprising calcite, aragonite, vaterite, or some combination thereof. For example, in some embodiments the precipitation material comprises at least 1% and less than 25% amorphous calcium carbonate, at least 1% and less than 20% amorphous calcium carbonate, at least 1% and less than 15% amorphous calcium carbonate, or at least 1% and less than 10% amorphous calcium carbonate. In some embodiments, the sequestered-$CO_2$ component of the building materials may comprise at least 1, 2, 3, 4, 5, 10, 15, 20, 25, 30, 35, 40, 45, 50, 55, 60, 65, 70, 75, 80, 85, 90, 95, 96, 97, 98, 99, 99.9% vaterite, with the remaining precipitation material comprising calcite, aragonite, amorphous calcium carbonate, or some combination thereof. In some embodiments, the precipitation material, and, hence, the sequestered-$CO_2$ component, may comprise less than 99.9, 99, 98, 97, 96, 95, 90, 85, 80, 75, 70, 65, 60, 55, 50, 45, 40, 35, 30, 25, 20, 15, 10, 5, 4, 3, 2, or 1% vaterite, with the remaining precipitation material comprising calcite, aragonite, amorphous calcium carbonate, or some combination thereof. In some embodiments, the precipitation material, and, hence, the sequestered-$CO_2$ component, may comprise at least 1, 2, 3, 4, 5, 10, 15, 20, 25, 30, 35, 40, 45, 50, 55, 60, 65, 70, 75, 80, 85, 90, 95, 96, 97, 98, 99, 99.9% aragonite, with the remaining precipitation material comprising calcite, vaterite, amorphous calcium carbonate, or some combination thereof. In some embodiments, the precipitation material, and, hence, the sequestered-$CO_2$ component, may comprise less than 99.9, 99, 98, 97, 96, 95, 90, 85, 80, 75, 70, 65, 60, 55, 50, 45, 40, 35, 30, 25, 20, 15, 10, 5, 4, 3, 2, or 1% aragonite, with the remaining precipitation material comprising calcite, vaterite, amorphous calcium carbonate, or some combination thereof. In some embodiments, the precipitation material, and, hence, the sequestered-$CO_2$ component, may comprise at least 1, 2, 3, 4, 5, 10, 15, 20, 25, 30, 35, 40, 45, 50, 55, 60, 65, 70, 75, 80, 85, 90, 95, 96, 97, 98, 99, 99.9% calcite, with the remaining precipitation material comprising vaterite, aragonite, amorphous calcium carbonate, or some combination thereof. In some embodiments, the precipitation material, and, hence, the sequestered-$CO_2$ component, may comprise less than 99.9, 99, 98, 97, 96, 95, 90, 85, 80, 75, 70, 65, 60, 55, 50, 45, 40, 35, 30, 25, 20, 15, 10, 5, 4, 3, 2, or 1% calcite, with the remaining precipitation material comprising vaterite, aragonite, amorphous calcium carbonate, or some combination thereof. In some embodiments, the vaterite to calcite ratio (v/c ratio) is greater than 1, 2, 3, 4, 5, 6, 7, 8, 9, 10, 20, 30, 40, 50, 60, 70, 80, 90, or 99.9 in the precipitation material, and, hence, the sequestered-$CO_2$ component. In some embodiments, the vaterite to calcite ratio (v/c ratio) is less than 99.9, 90, 80, 70, 60, 50, 40, 30, 20, 10, 9, 8, 7, 6, 5, 4, 3, 2, or 1 in the precipitation material, and, hence, the sequestered-$CO_2$ component. Some precipitation material may be better described in terms of the calcite to vaterite ratio (c/v ratio), especially when there is a greater amount of calcite in the precipitation material than vaterite. In some embodiments, for example, the calcite to vaterite ratio (c/v ratio) is greater than 1, 2, 3, 4, 5, 6, 7, 8, 9, 10, 20, 30, 40, 50, 60, 70, 80, 90, or 99.9 in the precipitation material, and, hence, the sequestered-$CO_2$ component. In some embodiments, the calcite to vaterite ratio (c/v ratio) is less than 99.1, 90, 80, 70, 60, 50, 20 40, 30, 20, 10, 9, 8, 7, 6, 5, 4, 3, 2, or 1 in the precipitation material, and, hence, the sequestered-$CO_2$ component. As indicated herein, the carbonate compounds of precipitation material may be metastable carbonate compounds (and may include one or more metastable hydroxide compounds) that are more stable in saltwater than in freshwater, such that upon contact with fresh water of any pH they (e.g., metastable carbonates such as amorphous calcium carbonate; vaterite; etc.) dissolve and re-precipitate into other fresh water stable compounds (e.g., minerals such as low-Mg calcite). Such a thermodynamic driving force may be exploited in the manufacture of derived materials (e.g., formed building materials). For example, in some embodiments, metastable carbonate compounds may be stored in a stabilizing amount of the saltwater (optionally containing additional metastable carbonate compound stabilizers) from which the metastable carbonate compounds were precipitated, and washed with fresh water prior to or during use to facilitate the transformation of metastable carbonate compounds to more stable carbonate compounds (e.g., amorphous calcium carbonate to vaterite; vaterite to aragonite; vaterite to calcite; etc.). Such a transformation may be exploited for its self-cementing properties. For example, a sample of precipitation material comprising 95% vaterite and 5% aragonite with an initial compressive strength of 0 psi may comprise 19% vaterite and 81% aragonite with a compressive strength of 2260 psi at 14 days, and may comprise 0% vaterite and 100% aragonite with a compressive strength of 3300 psi at 28 days. SEM images and XRD diffractograms of the foregoing sample of precipitation material may be found in FIG. 10. This self-cementing property of metastable compounds may be used to make formed building materials as described herein. With respect to magnesium carbonate minerals, precipitation material, and, hence, the $CO_2$-sequestering component, may include, but is not limited to magnesite ($MgCO_3$), barringtonite ($MgCO_3.2H_2O$), nesquehonite ($MgCO_3.3H_2O$), lanfordite ($MgCO_3.5H_2O$), and amorphous magnesium calcium carbonate ($MgCO_3.nH_2O$). Calcium magnesium carbonate minerals of interest include, but are not limited to dolomite ($CaMgCO_3$), huntite ($CaMg_3(CO_3)_4$), and sergeevite ($Ca_2Mg_{11}(CO_3)_{13}.H_2O$). In certain embodiments, non-carbonate compounds like brucite ($Mg(OH)_2$) may also form in combination with the compounds listed above. As indicated above, the compounds of the carbonate compound compositions may be metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite. Such a phenomenon may be exploited in the manufacture of formed building materials. For example, in some embodiments, metastable carbonate compounds may be stored in a stabilizing amount of the saltwater (optionally containing additional metastable carbonate compound stabilizers) from which the metastable carbonate compounds were precipitated, and washed with fresh water prior to or during use to facilitate the transformation of metastable carbonate compounds to more stable carbonate compounds.

As the precipitation material (e.g., carbonates, bicarbonates, or the combination thereof) may be derived from (e.g., precipitated from) water, the precipitation material, and, hence, the sequestered-$CO_2$ component, may include one or more components that are present in the water from which they are derived. For example, where the solution of divalent cations is saltwater, the precipitation material may include one or more constituents ("markers") found in the saltwater source. For example, if the saltwater source is seawater, seawater constituents that may be present in precipitation material include, but are not limited to chloride, sodium, sulfur, potassium, bromide, silicon, strontium, and the like. Any such markers are generally present in small amounts, such as 20,000 ppm or less or 2000 ppm or less. In some embodiments, and without being limited to seawater, the marker in the precipitation material may be strontium, ranging from 10,000 ppm or less, 3 to 10,000 ppm or less, 5 to 5000 ppm or less, 5 to 1000 ppm or less, 5 to 500 ppm or less, or 5 to 100 ppm or less. In embodiments in which the precipitation material comprises aragonite, the strontium may be incorporated in the aragonite lattice. Markers present in the compositions may vary depending upon the particular water source employed to produce the precipitation material. Also of interest are isotopic markers that identify the water source.

Sequestered-$CO_2$ components (e.g., components comprising precipitation material comprising carbonates, bicarbonates, or a combination thereof) comprise $CO_2$ that otherwise would have been released into the atmosphere, most of which results from burning fossil fuels, which fuels are originally of plant origin. As such, sequestered-$CO_2$ components, which components comprise one or more synthetic carbonates derived from industrial $CO_2$, reflect the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per milk) is a measure of the ratio of the concentration of two stable isotopes of carbon, namely $^{12}C$ and $^{13}C$, relative to a standard of fossilized belemnite (the PDB standard).

$$\delta^{13}C‰=[(^{13}C/^{12}C_{sample}-^{13}C/^{12}C_{PDB\ standard})/(^{13}C/^{12}C_{PDB\ standard})]\times 1000$$

As such, the $\delta^{13}C$ value of the carbon in precipitation material (e.g., synthetic carbonates, bicarbonates, or a combination thereof) described herein serves as a fingerprint for a $CO_2$ gas source, especially $CO_2$ released from burning fossil fuel. The $\delta^{13}C$ value may vary from source to source (i.e., fossil fuel source), but the $\delta^{13}C$ value for sequestered-$CO_2$ components generally, but not necessarily, ranges between −9‰ to −35‰. In some embodiments, the $\delta^{13}C$ value of the carbon in the precipitation material is between −1‰ and −50‰, between −5‰ and −40‰, between −5‰ and −35‰, between −7‰ and −40‰, between −7‰ and −35‰, between −9‰ and −40%0, or between −9‰ and −35%0. In some embodiments, the $\delta^{13}C$ value of the carbon in the precipitation material is less than (i.e., more negative than) 0, −1‰, −2‰, −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, −45‰, −46‰, −47‰, −48‰, −49‰, or −50, wherein the more negative the $\delta^{13}C$ value, the more rich the synthetic carbonates, bicarbonates, or a combination thereof is in $^{12}C$.

In some embodiments, the $\delta^{13}C$ value for carbon-containing compounds or compositions is more than (i.e., less negative than) −50‰, −49‰, −48‰, −47‰, −46‰, −45‰, −44‰, −43‰, −42‰, −41‰, −40‰, −39‰, −38‰, −37‰, −36‰, −35‰, −34‰, −33‰, −32‰, −31‰, −30‰, −29‰, −28‰, −27‰, −26‰, −25‰, −24‰, −23‰, −22‰, −21‰, −20‰, −19‰, −18‰, −17‰, −16‰, −15‰, −14‰, −13‰, −12‰, −11‰, −10‰, −9‰, −8‰, −7‰, −6‰, −5‰, −4‰, −3‰, −2‰, −1‰, or 0. Combinations of the foregoing ranges are also possible. For example, in some embodiments, the $\delta^{13}C$ value of the carbon in the precipitation material is less than −1‰ and more than −50‰, less than −5‰ and more than −50‰, less than −10‰ and more than −50‰, less than −15‰ and more than −50‰, or less than −20‰ and more than −50‰. Any suitable method may be used for measuring the $\delta^{13}C$ value, methods including, but not limited to, mass spectrometry or off-axis integrated-cavity output spectroscopy (off-axis ICOS).

With respect to formed building materials provided herein, such as roadway materials, bricks, blocks, boards (e.g., cement boards), conduits, beams, basins, columns, tiles, fiber-siding products (e.g., fiber-cement siding), slabs, acoustic barriers, drywall, insulation, or combinations thereof containing a sequestered-$CO_2$ component (e.g., component comprising carbonates, bicarbonates, or combinations thereof), carbon in the sequestered-$CO_2$ component, and the formed building material itself, particularly if the formed building material comprises a substantial amount of sequestered-$CO_2$ component (e.g., >50% up to 100% [w/w]), may have a $\delta^{13}C$ value less than −5‰. In some embodiments, the $\delta^{13}C$ value for the formed building material is between −1‰ and −50‰, between −5‰ and −40‰, between −5‰ and −35‰, between −7‰ and −40‰, between −7‰ and −35‰, between −9‰ and −40‰, or between −9‰ and −35‰. In some embodiments, the $\delta^{13}C$ value for the formed building material is less than (i.e., more negative than) 0, −1‰, −2‰, −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, −45‰, −46‰, −47‰, −48‰, −49‰, or −50, wherein the more negative the $\delta^{13}C$ value, the more rich the carbonate-containing material is in $^{12}C$. In some embodiments, the $\delta^{13}C$ value for the formed building material is more than (i.e., less negative than) −50‰, −49‰, −48‰, −47‰, −46‰, −45‰, −44‰, −43‰, −42‰, −41‰, −40‰, −39‰, −38‰, −37‰, −36‰, −35‰, −34‰, −33‰, −32‰, −31‰, −30‰, −29‰, −28‰, −27‰, −26‰, −25‰, −24‰, −23‰, −22‰, −21‰, −20‰, −19‰, −18‰, −17‰, −16‰, −15‰, −14‰, −13‰, −12‰, −11‰, −10‰, −9‰, −8‰, −7‰, −6‰, −5‰, −4‰, −3‰, −2‰, −1‰, or 0, wherein the less negative the $\delta^{13}C$ value, the less rich the carbonate-containing material is in $^{12}C$. Combinations of the foregoing ranges are also possible. In some embodiments, the $\delta^{13}C$ value for the formed building material is less than −1‰ and more than −50‰, less than −5‰ and more than −50‰, less than −10‰ and more than −50‰, less than −15‰ and more than −50‰, or less than −20‰ and more than −50‰.

In certain embodiments, a system is employed to perform the foregoing methods and compositions.

Following production of the sequestered-$CO_2$ component, for example, as described above, the sequestered-$CO_2$ component (e.g., precipitation material; component comprising carbonates, bicarbonates, or a combination thereof) may then be employed to produce a formed building material. Formed building materials may be prepared in accordance with traditional manufacturing protocols for such structures, with the exception that an amount of sequestered-$CO_2$ component is employed. The portion of conventional components replaced with the sequestered-$CO_2$ component may vary depending upon the formed building material or application, and in certain instances is 5% by weight or more, including 10% by weight or more, 15% by weight or more, 20% by weight or more, 25% by weight or more, 30% by weight or more, 50% by weight or more, 70% by weight or more, 75% by weight or more, 80% by weight or more, 85% by weight or more, 90% by weight or more, 95% by weight or more, 99% by weight or more, or even 100% by weight. For example, in some embodiments, 20% by weight of more of the conventional cement component (e.g., OPC) may be replaced with sequestered-$CO_2$ component for producing formed building materials described herein. In some embodiments, 100% by weight of the conventional cement component (e.g., OPC) may be replaced with sequestered-$CO_2$ component for producing formed building materials described herein.

Table A1 below gives various combinations of components (e.g., cement component, aggregate, supplementary cementitious material ("SCM")) that may be used in mixtures for production of formed building materials, wherein the sequestered-$CO_2$ component is used to the exclusion of any additional cement component such as ordinary Portland cement (OPC).

TABLE A1

Compositions for formed building materials

| Composition | Cement component Sequestered-$CO_2$ Component (Cement Substitute) | Aggregate Fine Aggregate | Aggregate Coarse Aggregate | SCM Fly Ash | SCM Slag | SCM Metakaolin |
|---|---|---|---|---|---|---|
| 1 | X | | | | | |
| 2 | X | X | | | | |
| 3 | X | X | X | | | |
| 4 | X | X | X | X | | |
| 5 | X | X | X | X | X | |
| 6 | X | X | X | X | X | X |
| 7 | X | X | X | X | | X |
| 8 | X | X | X | | X | X |
| 9 | X | X | X | | | X |
| 10 | X | | X | | | |
| 11 | X | | X | X | | |
| 12 | X | | X | X | X | |
| 13 | X | | X | X | X | X |
| 14 | X | X | | X | | |
| 15 | X | X | | X | X | |
| 16 | X | X | | X | X | X |
| 17 | X | X | | X | | X |
| 18 | X | X | | | X | X |
| 19 | X | X | | | | X |
| 20 | X | | X | X | | |
| 21 | X | | X | X | X | |
| 22 | X | | X | X | X | X |
| 23 | X | | X | X | | X |
| 24 | X | | X | | X | X |
| 25 | X | | X | | | X |
| 26 | X | | | X | | |
| 27 | X | | | X | X | |
| 28 | X | | | X | X | X |
| 29 | X | | | X | | X |
| 30 | X | | | | X | X |
| 31 | X | | | | | X |

The fine aggregate described in the Table A1 may be conventional fine aggregate such as sand or fine aggregate comprising sequestered-$CO_2$ component as described in U.S. patent application Ser. No. 12/475,378, filed 29 May 2009, which application is incorporated herein by reference in its entirety. The coarse aggregate described in the Table A1 may be conventional coarse aggregate such as gravel, crushed stone, slag, recycled concrete, geosynthentic aggregate, glass, or coarse $CO_2$-sequestering aggregate as described in U.S. patent application Ser. No. 12/475,378. Fly ash, slag, and/or metakaolin are considered supplementary cementitious materials to a skilled person the art.

Surprisingly, it was discovered that the sequestered-$CO_2$ component, to the exclusion of any additional cement component(s), acts much like a conventional cement (e.g., OPC). The sequestered-$CO_2$ component, when prepared (e.g., mix water added, cast as a formed building material, etc.) and allowed to harden, achieved high compressive strengths as described below in reference to the compressive strengths of formed building materials comprised of the compositions of Table A1. Compositions comprising fine aggregate such as sand, which may be prepared (e.g., mixed, mix water added, cast as a formed building material, etc.) and allowed to harden, achieved high compressive strengths as described below in reference to the compressive strengths of formed building materials comprised of the compositions of Table A1. Such compositions comprising sequestered-$CO_2$ component behave much like conventional cement, binding the fine aggregate (e.g., sand) as shown in FIG. 11. Binary mixtures of sequestered-$CO_2$ component and fine aggregate (e.g., sand), may comprise at least 1%, 2%, 3%, 4%, 5%, 6%, 7%, 8%, 9%, 10%, 15%, 20%, 25%, 30%, 35%, 40%, 45%, 50%, 55%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, or 95% by weight fine aggregate (e.g., sand), the remainder being sequestered-$CO_2$ component as described herein. Binary mixtures of sequestered-$CO_2$ component and fine aggregate (e.g., sand), may comprise less than 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 55%, 50%, 45%, 40%, 35%, 30%, 25%, 20%, 15%, 10%, 9%, 8%, 7%, 6%, 5%, 4%, 3%, 2%, or 1% by weight fine aggregate (e.g., sand), the remainder being sequestered-$CO_2$ component as described herein. Combinations of the foregoing are also useful for describing binary mixtures comprising sequestered-$CO_2$ component and fine aggregate (e.g., sand). For example, in some embodiments, such binary mixtures of sequestered-$CO_2$ component and fine aggregate (e.g., sand), may comprise at least 1% and less than 95% fine aggregate by weight, at least 25% and less than 95% fine aggregate by weight, at least 50% and less than 95% fine aggregate by weight, at least 50% and less than 90% fine aggregate by weight, at least 50% and less than 85% fine aggregate by weight, at least 55% and less than 85% fine aggregate by weight. In some embodiments, such binary mixtures of sequestered-$CO_2$ component and fine aggregate (e.g., sand) comprise at least 65% and less than 95% fine aggregate (e.g., sand) by weight, with a compressive strength of at least 3000 psi and less than 8000 psi, and optionally with a porosity of at least 25% and less than 60%. In some embodiments, such binary mixtures of sequestered-$CO_2$ component and fine aggregate (e.g., sand) comprise at least 85% and less than 95% fine aggregate (e.g., sand) by weight, with a compressive strength of at least 3000 psi and less than 8000 psi, and optionally with a porosity of at least 25% and less than 60%. In some embodiments, such binary mixtures of sequestered-$CO_2$ component and fine aggregate (e.g., sand) comprise at least 75% and less than 85% fine aggregate (e.g., sand) by weight, with a compressive strength of at least 3000 psi and less than 8000 psi, and optionally with a porosity of at least 25% and less than 60%. In some embodiments, such binary mixtures of sequestered-$CO_2$ component and fine aggregate (e.g., sand) comprise at least 70% and less than 80% fine aggregate (e.g., sand) by weight, with a compressive strength of at least 3000 psi and less than 8000 psi, and optionally with a porosity of at least 25% and less than 60%. In some embodiments, such binary mixtures of sequestered-$CO_2$ component and fine aggregate (e.g., sand) comprise at least 65% and less than 75% fine aggregate (e.g., sand) by weight, with a compressive strength of at least 3000 psi and less than 8000 psi, and optionally with a porosity of at least 25% and less than 60%. The foregoing compositions may further comprise one more admixtures or additives (e.g., GLENIUM® 7500). It should also be noted that drying formed building materials comprising cement substitute (e.g., sequestered-$CO_2$ component to the exclusion of any additional cementitious components) has been found to have a surprising effect on compressive strength and porosity of such compositions.

Coarse aggregate may be used in place of some or all of the fine aggregate in the foregoing binary compositions of sequestered-$CO_2$ and fine aggregate to produce formed building materials. As such, the foregoing binary compositions of sequestered-$CO_2$ and fine aggregate may comprise at least 1%, 2%, 3%, 4%, 5%, 6%, 7%, 8%, 9%, 10%, 15%, 20%, 25%, 30%, 35%, 40%, 45%, 50%, 55%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.9%, or 100% by weight coarse aggregate (e.g., rock), wherein the amount of coarse aggregate by weight replaces an equivalent amount by weight of fine aggregate (e.g., sand), and wherein the remainder of the composition comprises sequestered-$CO_2$ as described herein. The foregoing binary compositions of sequestered-$CO_2$ and fine aggregate may comprise less than 100%, 99.9%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 55%, 50%, 45%, 40%, 35%, 30%, 25%, 20%, 15%, 10%, 9%, 8%, 7%, 6%, 5%, 4%, 3%, 2%, or 1% by weight coarse aggregate (e.g., rock), wherein the amount of coarse aggregate by weight replaces an equivalent amount by weight of fine aggregate (e.g., sand), and wherein the remainder of the composition comprises sequestered-$CO_2$ component as described herein. Combinations of the foregoing are also useful for describing compositions comprising sequestered-$CO_2$ component, fine aggregate, and/or coarse aggregate. For example, in some embodiments, the compositions, which may be considered ternary mixtures of sequestered-$CO_2$ component, fine aggregate (e.g., sand), and coarse aggregate (e.g., rock) may comprise at least 1% and less than 95% coarse aggregate by weight, at least 25% and less than 95% coarse aggregate by weight, at least 50% and less than 95% coarse aggregate by weight, at least 50% and less than 90% coarse aggregate by weight, at least 50% and less than 85% coarse aggregate by weight, at least 55% and less than 85% coarse aggregate by weight, wherein the amount of coarse aggregate by weight replaces an equivalent amount by weight of fine aggregate (e.g., sand), and wherein the remainder of the composition comprises sequestered-$CO_2$ component as described herein. In some embodiments, a composition comprises at least 65% and less than 95% aggregate (e.g., mixture of fine aggregate such as sand and coarse aggregate such as rock) by weight, with a compressive strength of at least 3000 psi and less than 8000 psi, and optionally with a porosity of at least 25% and less than 60%. In some embodiments, a composition comprises at least 85% and less than 95% aggregate (e.g., mixture of fine aggregate such as sand and coarse aggregate such as rock) by weight, with a compressive strength of at least 3000 psi and less than 8000 psi, and optionally with a porosity of at least 25% and less than 60%. In some embodiments, a composition comprises at least 75% and less than 85% aggregate (e.g., mixture of fine aggregate such as sand and coarse aggregate such as rock) by weight, with a compressive strength of at least 3000 psi and less than 8000 psi, and optionally with a porosity of at least 25% and less than 60%. In some embodiments, a composition comprises at least 70% and less than 80% aggregate (e.g., mixture of fine aggregate such as sand and coarse aggregate such as rock) by weight, with a compressive strength of at least 3000 psi and less than 8000 psi, and optionally with a porosity of at least 25% and less than 60%. In some embodiments, a composition comprises at least 65% and less than 75% aggregate (e.g., mixture of fine aggregate such as sand and coarse aggregate such as rock) by weight, with a compressive strength of at least 3000 psi and less than 8000 psi, and optionally with a porosity of at least 25% and less than 60%. The foregoing compositions may further comprise one more admixtures or additives (e.g., GLENIUM® 7500), which may provide improved performance for formed building materials as described herein. It should also be noted that drying formed building materials comprising cement substitute has been found to have a surprising effect on compressive strength and porosity of such compositions comprising cement substitute.

Porosity of formed building materials produced from the compositions of Table A1, in which the cement component is sequestered-$CO_2$ component described herein to the exclusion of any additional cement components (e.g., OPC), may be, in some embodiments, at least 5%, 10%, 15%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 75%, 80%, 85%, 90%, or 95%. In some embodiments, the porosity of formed building materials produced from the compositions of Table A1 may be less than 95%, 90%, 85%, 80%, 75%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 15%, 10%, or 5%. Combinations of the foregoing porosities are also useful for describing the porosity of formed building materials produced from the compositions of Table A1. For example, the porosity of a formed building material may be, in some embodiments, at least 20% and less than 70%, such as at least 30% and less than 60%. FIG. 11 provides SEM images of a hardened paste comprising precipitation material that may be used as a complete cement substitute in formed building materials described herein. As shown, such a hardened paste comprises pores that may be occupied by mix water or admixture solution. Formed building materials comprising fine and coarse aggregate may also comprise pores that may be occupied by mix water or admixture solution.

Compressive strengths of formed building materials produced from the compositions of Table A1, in which the cement component is sequestered-$CO_2$ component described herein to the exclusion of any additional cement components (e.g., OPC), may be, in some embodiments, at least 500 psi, 750 psi, 1000 psi, 1250 psi, 1500 psi, 1750 psi, 2000 psi, 2250 psi, 2500 psi, 2750 psi, 3000 psi, 3250 psi, 3500 psi, 3750 psi, 4000 psi, 4250 psi, 4500 psi, 4750 psi, 5000 psi, 5250 psi, 5500 psi, 5750 psi, 6000 psi, 6250 psi, 6500 psi, 6750 psi, 7000 psi, 7250 psi, 7500 psi, 7750 psi, 8000 psi, 8250 psi, 8500 psi, 8750 psi, 9000 psi, 9,250 psi, 9,500 psi, 9,750 psi, or 10,000 psi at in 1, 7, 14, or 28 days. Compressive strengths of formed building materials produced from the compositions of Table A1, in which the cement component is sequestered-$CO_2$ component described herein to the exclusion of any additional cement components (e.g., OPC), may be, in some embodiments, less than 10,000 psi, 9750 psi, 9500 psi, 9250 psi, 9000 psi, 8750 psi, 8500 psi, 8250 psi, 8000 psi, 7750 psi, 7500 psi, 7250 psi, 7000 psi, 6750 psi, 6500 psi, 6250 psi, 6000 psi, 5750 psi, 5500 psi, 5250 psi, 5000 psi, 4750 psi, 45000 psi, 4250 psi, 4000 psi, 3750 psi, 3500 psi, 3250 psi, 3000 psi, 2750 psi, 2500 psi, 2250 psi, 2000 psi, 1750 psi, 1500 psi, 1250 psi, 1000 psi, 750 psi, or 500 psi at 1, 7, 14, or 28 days. Combinations of the foregoing compressive strengths are also useful for describing formed building materials produced from the compositions of Table A1, in which the cement component is sequestered-$CO_2$ component described herein to the exclusion of any additional cement components (e.g., OPC). For example, compressive strengths of formed building materials produced from the compositions of Table A1 in which the cement component is sequestered-$CO_2$ component described herein to the exclusion of any additional cement components (e.g., OPC) may be, in some embodiments, at least 2000 psi and less than 6000 psi at 1, 7, 14, or 28 days.

Experiments have shown that drying has a surprising effect on the compressive strength of formed building materials comprising the sequestered-$CO_2$ component described herein. For example, mortar cube were prepared in which 70% of the sequestered-$CO_2$ component (e.g., precipitation material comprising vaterite as described herein) was replaced with fine aggregate (e.g., sand) according at an ASTM method (C109). Compressive strength after seven days was 4500 psi, and detailed imaging showed that carbonates (either vaterite or another calcium carbonate polymorph such as a lower energy polymorph [e.g., calcite]) of the sequestered-$CO_2$ component act as a binder of the sand (i.e., the sequestered-$CO_2$ component acted much like a conventional hydraulic cement such as OPC) (see FIG. 12 for sequestered-$CO_2$ component binding to sand). Surprisingly, the compressive strength of 4500 psi was achieved for the exemplary mortars in which the residual water was removed by drying at 80° C. Without the removal of the residual water, a compressive strength of 3000 psi was achieved. In some embodiments, the compressive strength of formed building materials comprising sequestered-$CO_2$ component with aggregate (e.g., fine aggregate such as sand and/or coarse aggregate such as rock) may be as given herein with respect to Table A1 and Table A2, such as at least 1000 psi and less than 10,000 psi, at least 2000 psi and less than 9000 psi, at least 2000 psi and less than 8,000, at least 3000 psi and less than 7,000 psi at 1, 7, 14, or 28 days. In some embodiments, the porosity of formed building materials comprising sequestered-$CO_2$ component and aggregate (e.g., fine aggregate such as sand and/or coarse aggregate such as rock) may be as given herein with respect to Table A1 and Table A2, such as at least 20% and less than 70%, such as at least 30% and less than 60%.

As described herein, the cement component in compositions for producing formed building materials may be entirely sequestered-$CO_2$ component; however, the cement component in compositions for producing the formed building materials described herein may further comprise conventional hydraulic cement (e.g., OPC). Conventional hydraulic cements are not the sequestered-$CO_2$ component or derived from precipitation material as described herein. Compositions for producing formed building materials that contain a conventional cement component, may contain one or more of the following hydraulic cement compositions: Portland cement blends such as Portland blast furnace cement; Portland fly ash cement; Portland pozzolan cement; Portland silica fume cement; masonry cements comprising limestone, hydrated lime, air entrainers, retarders, waterproofers, and coloring agents; plastic cements, stucco cements; expansive cements; white blended cements; colored cements; very finely ground cements; and non-Portland cements such as pozzolan-lime cements; slag-lime cements; supersulfated cements; calcium sulfoaluminate cements; natural cements; geopolymer cements. Of interest in certain embodiments as the conventional hydraulic cement is Portland cement. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). As defined by the European Standard EN197.1, Portland cement clinker is a hydraulic material which shall consist of at least two-thirds by mass of calcium silicates (3 $CaO.SiO_2$ and 2 $CaO.SiO_2$), the remainder consisting of aluminum- and iron-containing clinker phases and other compounds. The ratio of CaO to $SiO_2$ shall not be less than 2.0. The magnesium content (MgO) shall not exceed 5.0% by mass. In certain embodiments, the Portland cement constituent may be any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

Various cement blends comprising the sequestered-$CO_2$ component may be used, and each cement blend may contribute to large reductions in carbon footprint for formed building materials described herein. The sequestered-$CO_2$ component may be employed as, for example, a partial cement substitute for ordinary Portland cement, optionally in conjunction with fly ash, slag, and/or metakaolin, to produce a cement blend for formed building materials with small, neutral (i.e., approximately zero), or negative carbon footprint. As provided herein, such sequestered-$CO_2$ component may comprise calcium carbonate polymorphs such as amorphous calcium carbonate, vaterite, aragonite, and/or calcite in the proportions further described herein. In some embodiments, a cement blend such as that in Table A2 may comprise a conventional cement and sequestered-$CO_2$ component, and may have at least 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.9% by weight of sequestered-$CO_2$ component, the remainder being primarily conventional cement (e.g., OPC), optionally in conjunction with fine and/or coarse aggregate, and further optionally in conjunction with supplementary cementitious materials such fly ash, slag, and/or metakaolin. In some embodiments, a cement blend such as that in Table A2 may comprise a conventional cement and sequestered-$CO_2$ component, and may have less than 99.9%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% by weight of sequestered-$CO_2$ component, the remainder being primarily conventional cement (e.g., OPC), optionally in conjunction with fine and/or coarse aggregate, and further optionally in conjunction with supplementary cementitious materials such fly ash, slag, and/or metakaolin. Combinations of the foregoing are also useful for describing cement blends comprising sequestered-$CO_2$ component and a conventional cement. For example, a cement blend comprising sequestered-$CO_2$ component and conventional cement, may be at least 5% and less than 30% by weight sequestered-$CO_2$ component, the remainder being primarily cement (e.g., OPC), optionally in conjunction with fine and/or coarse aggregate, and further optionally in conjunction with supplementary cementitious materials such fly ash, slag, and/or metakaolin. Without being bound by theory, it is thought that the addition of sequestered-$CO_2$ component comprising carbonates provides sites for nucleation, causing early strength gains in formed building materials as shown in FIG. 13. It is further thought that analogs of calcium aluminosulfate hydrates are formed in which the sulfates are replaced by carbonates in the precipitation material. Because carbonates mostly interact with Al- (or Fe-) containing phases to form carboaluminates hydrates, and since $Al_2O_3$ content can be low in cement (e.g., OPC), slag may be used (as described herein) to increase $Al_2O_3$ content when producing formed building materials described herein. Table A2 describes the composition of formed building materials comprising such components (e.g., cement component, aggregate, supplementary cementitious material ("SCM")):

TABLE A2

Compositions for formed building materials

| Compositions | Cement Component Cement Blend (Sequestered-$CO_2$ Component and Conventional Cement) | Aggregate Fine Aggregate | Aggregate Coarse Aggregate | SCM Fly Ash | SCM Slag | SCM Metakaolin |
|---|---|---|---|---|---|---|
| 32 | X | | | | | |
| 33 | X | X | | | | |
| 34 | X | X | X | | | |
| 35 | X | X | X | X | | |
| 36 | X | X | X | X | X | |
| 37 | X | X | X | X | X | X |
| 38 | X | X | X | X | | X |
| 39 | X | X | X | | X | X |
| 40 | X | X | X | | | X |
| 41 | X | | X | | | |
| 42 | X | | X | X | | |
| 43 | X | | X | X | X | |
| 44 | X | | X | X | X | X |
| 45 | X | X | | X | | |
| 46 | X | X | | X | X | |

TABLE A2-continued

Compositions for formed building materials

| Compositions | Cement Component Cement Blend (Sequestered-CO₂ Component and Conventional Cement) | Aggregate | | SCM | | |
|---|---|---|---|---|---|---|
| | | Fine Aggregate | Coarse Aggregate | Fly Ash | Slag | Metakaolin |
| 47 | X | X | | X | X | X |
| 48 | X | X | | X | | X |
| 49 | X | X | | | X | X |
| 50 | X | X | | | | X |
| 51 | X | | X | X | | |
| 52 | X | | X | X | X | |
| 53 | X | | X | X | X | X |
| 54 | X | | X | X | | X |
| 55 | X | | X | | X | X |
| 56 | X | | X | | | X |
| 57 | X | | | X | | |
| 58 | X | | | X | X | |
| 59 | X | | | X | X | X |
| 60 | X | | | X | | X |
| 61 | X | | | | X | X |
| 62 | X | | | | | X |

The fine aggregate described in the Table A2 may be conventional fine aggregate such as sand or aggregate comprising a sequestered-$CO_2$ component as described in U.S. patent application Ser. No. 12/475,378, filed 29 May 2009, which application is incorporated herein by reference in its entirety. The coarse aggregate described in the Table A2 may be conventional coarse aggregate such as gravel, crushed stone, slag, recycled concrete, geosynthentic aggregate, glass, or aggregate comprising a sequestered-$CO_2$ component as described in U.S. patent application Ser. No. 12/475,378. Fly ash, slag, and/or metakaolin are considered supplementary cementitious materials to a skilled person the art.

Porosity of formed building materials produced from the compositions of Table A2, in which the cement component is a cement blend comprising a conventional cement and sequestered-$CO_2$ component, may be, in some embodiments, at least 5%, 10%, 15%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 75%, 80%, 85%, 90%, or 95%. In some embodiments, the porosity of formed building materials of Table A2 may be less than 95%, 90%, 85%, 80%, 75%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 15%, 10%, or 5%. Combinations of the foregoing porosities are also useful for describing the porosity of formed building materials of Table A2. For example, the porosity of formed building materials may be, in some embodiments, at least 20% and less than 70%, such as at least 30% and less than 60%.

In some embodiments, for example, a cement blend comprising conventional cement and sequestered-$CO_2$ component, may be at least 10% and less than 90% by weight, such as at least 30% and less than 70% by weight, including at least 40 and less than 60% by weight, etc. sequestered-$CO_2$ component, the remainder being primarily cement (e.g., OPC), optionally in conjunction with fly ash, slag, and/or metakaolin. In some embodiments, the sequestered-$CO_2$ component may be employed as, for example, a complete (i.e., 100%) cement substitute for ordinary Portland cement (or any other cement), optionally in conjunction with fly ash, slag, and/or metakaolin, to produce a cement blend for a formed building material with a small, neutral (i.e., approximately zero), or negative carbon footprint.

Compressive strengths of formed building materials produced from the compositions of Table A2, in which the cement component may be sequestered-$CO_2$ component in combination with one or more additional cement component (e.g., OPC), may be, in some embodiments, at least at least 500 psi, 750 psi, 1000 psi, 1250 psi, 1500 psi, 1750 psi, 2000 psi, 2250 psi, 2500 psi, 2750 psi, 3000 psi, 3250 psi, 3500 psi, 3750 psi, 4000 psi, 4250 psi, 4500 psi, 4750 psi, 5000 psi, 5250 psi, 5500 psi, 5750 psi, 6000 psi, 6250 psi, 6500 psi, 6750 psi, 7000 psi, 7250 psi, 7500 psi, 7750 psi, 8000 psi, 8250 psi, 8500 psi, 8750 psi, 9000 psi, 9,250 psi, 9,500 psi, 9,750 psi, or 10,000 psi at in 1, 7, 14, or 28 days. Such formed building materials may have a compressive strength of less than 10,000 psi, 9750 psi, 9500 psi, 9250 psi, 9000 psi, 8750 psi, 8500 psi, 8250 psi, 8000 psi, 7750 psi, 7500 psi, 7250 psi, 7000 psi, 6750 psi, 6500 psi, 6250 psi, 6000 psi, 5750 psi, 5500 psi, 5250 psi, 5000 psi, 4750 psi, 45000 psi, 4250 psi, 4000 psi, 3750 psi, 3500 psi, 3250 psi, 3000 psi, 2750 psi, 2500 psi, 2250 psi, 2000 psi, 1750 psi, 1500 psi, 1250 psi, 1000 psi, 750 psi, or 500 psi at 1, 7, 14, or 28 days. Combinations of the foregoing compressive strengths are also useful for describing compressive strengths for formed building materials of Table A2, in which the cement component is a cement blend. For example, compressive strengths of such formed building materials may have a compressive strength of at least 2000 psi and less than 6000 psi at 1, 7, 14, or 28 days. As such, formed building materials with a small, neutral, or negative carbon footprint are suitable for use in any applications in which formed building materials are used.

The cement component, whether sequestered-$CO_2$ component alone or a cement blend comprising conventional cement and sequestered-$CO_2$ component, may form a binary mixture with up to 80% supplementary cementitious material by weight, the remainder of material being the cement component (excluding aggregate and water); ternary mixtures comprising at least two supplementary cementitious materials, quaternary mixtures comprising as least three supplementary cementitious materials, etc. may also have up to 80% supplementary cementitious materials by weight, the remainder of material being the cement component (e.g., sequestered-$CO_2$ component alone or a cement blend comprising conventional cement and the sequestered-$CO_2$ component). Table A1 and Table A2 provide further information on how supplementary cementitious materials may be combined with cement components to produce formed building materials comprising such supplementary cementitious materials. Unless indicated otherwise, other additives (e.g., GLENIUM® 7500) that may be used in compositions for producing formed building materials are assumed to be negligible with respect to the cement component (e.g., ordinary Portland cement ("OPC"); sequestered-$CO_2$ component; cement blends comprising conventional cement and sequestered-$CO_2$ component) and the supplementary cementitious materials. In some embodiments, a binary mixture comprising an supplementary cementitious materials and the cement component, whether sequestered-$CO_2$ component alone or a cement blend comprising conventional cement and sequestered-$CO_2$ component, may have at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight of supplementary cementitious materials (e.g., fly ash, slag, and/or metakaolin as in Table A1 or Table A2), the remainder being primarily the cement component. In some embodiments, a binary mixture comprising an supplementary cementitious materials and the cement component, whether sequestered-$CO_2$ component alone or a cement blend comprising conventional cement and sequestered-$CO_2$ component, may have less than 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% by weight of supplementary cementitious materials (e.g., fly ash, slag, and/or metakaolin as in Table A1 or Table A2), the remainder being primarily the cement component. Combinations of the foregoing are also possible. For example, in some embodiments, a binary mixture comprising the cement component and an supplementary cementitious materials (e.g., fly ash, slag, and/or metakaolin as in Table A1 or Table A2), may have at least 1% and less than 60%, at least 5% and less than 30%, at least 10% and less than 30% by weight of supplementary cementitious materials, the remainder being primarily the cement component. In some embodiments, a binary mixture is provided for formed building materials comprising 90% cement component (e.g., 70% OPC and 10% sequestered-$CO_2$ component) and 20% fly ash. And, optionally, in such embodiments, the resulting formed building material may have a compressive strength of at least 4000 psi in 7 days and/or a compressive strength of at least 6000 psi in 28 days. In terms of shrinkage, the formed building materials in such embodiments may have a shrinkage less than −0.015% at 7 days, −0.020% at 14 days, −0.025% at 21 days, and/or −0.030% at 28 days (SEAONC Method). In some embodiments, a binary mixture is provided for formed building materials comprising 85% cement component (e.g., 70% OPC and 15% sequestered-$CO_2$ component) and 15% fly ash. And, optionally, in such embodiments, the resulting formed building material may have a compressive strength of at least 4000 psi in 7 days and/or a compressive strength of at least 6000 psi in 28 days. In terms of shrinkage, the formed building materials in such embodiments may have a shrinkage less than −0.015% at 7 days, −0.020% at 14 days, −0.025% at 21 days, and/or −0.030% at 28 days (SEAONC Method). In some embodiments, a binary mixture is provided for formed building materials comprising 85% cement component (e.g., 70% OPC and 15% sequestered-$CO_2$ component) and 15% slag. In some embodiments, a binary mixture is provided for formed building materials comprising 60% cement component (e.g., 40% OPC and 20% sequestered-$CO_2$ component) and 40% slag. And, optionally, in such embodiments, the resulting formed building material may have a compressive strength of at least 6000 psi in 7 days and/or a compressive strength of at least 8000 psi in 28 days. In terms of shrinkage, the formed building materials in such embodiments may have a shrinkage less than −0.015% at 7 days, −0.020% at 14 days, −0.025% at 21 days, and/or −0.030% at 28 days (SEAONC Method). In some embodiments, a binary mixture is provided for formed building materials comprising 50% cement component (e.g., 30% OPC and 20% sequestered-$CO_2$ component) and 50% slag. And, optionally, in such embodiments, the resulting formed building material may have a compressive strength of at least 6000 psi in 7 days and/or a compressive strength of at least 8000 psi in 28 days. In terms of shrinkage, the formed building materials in such embodiments may have a shrinkage less than −0.015% at 7 days, −0.020% at 14 days, −0.025% at 21 days, and/or −0.030% at 28 days (SEAONC Method). In some embodiments, a binary mixture is provided for formed building materials comprising 40% cement component (e.g., 20% OPC and 20% sequestered-$CO_2$ component) and 60% slag. And, optionally, in such embodiments, the resulting formed building material may have a compressive strength of at least 5000 psi in 7 days and/or a compressive strength of at least 6000 psi in 28 days. In terms of shrinkage, the formed building materials in such embodiments may have a shrinkage less than −0.015% at 7 days, −0.020% at 14 days, −0.025% at 21 days, and/or −0.030% at 28 days (SEAONC Method).

Ternary mixtures (as well as quaternary mixtures, quinary mixtures, etc.) are best described with respect to the cement component, whether sequestered-$CO_2$ component alone or a cement blend comprising conventional cement and sequestered-$CO_2$ component, in combination with a bulk supplementary cementitious material, which bulk supplementary cementitious material includes, for example, one of fly ash, slag, or metakaolin in excess of any other supplementary cementitious material. In such ternary mixtures (as well as quaternary mixtures, quinary mixtures, etc.), the bulk supplementary cementitious material (e.g., fly ash, slag, or metakaolin) may be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight of the combination of cement component and the bulk supplementary cementitious material (e.g., fly ash, slag, and/or metakaolin as in Table A1 or Table A2). In some embodiments, the bulk supplementary cementitious material (e.g., fly ash, slag, or metakaolin) may be less than 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% by weight of the combination of cement component and the bulk supplementary cementitious material (e.g., fly ash, slag, and/or metakaolin as in Table A1 or Table A2). Combinations of the foregoing are also possible. For example, in some embodiments, the bulk supplementary cementitious material, may be at least 1% and less than 60%, at least 5% and less than 30%, at least 10% and less than 30% by weight of the combination of cement component and the bulk supplementary cementitious material (e.g., fly ash, slag, and/or metakaolin as in Table A1 or Table A2).

Further with respect to such ternary mixtures (as well as quaternary mixtures, quinary mixtures, etc.), in some embodiments, the combination of bulk supplementary cementitious material and cement component, whether the cement component is sequestered-$CO_2$ component alone or a cement blend comprising conventional cement and sequestered-$CO_2$ component, may comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, or 79% by weight of the ternary mixture, the remainder being one or more additional supplementary cementitious materials such as fly ash, slag, and/or metakaolin (e.g., supplementary cementitious materials as in Table A1 or Table A2). In some embodiments, the combination of bulk supplementary cementitious material and cement component, whether the cement component is sequestered-$CO_2$ component alone or a cement blend comprising conventional cement and sequestered-$CO_2$ component, may comprise less than 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% by weight of the ternary mixture, the remainder being one or more additional supplementary cementitious materials such as fly ash, slag, and/or metakaolin (e.g., supplementary cementitious materials as in Table A1 or Table A2). In some embodiments, the remainder of additional supplementary cementitious material(s) may comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, or 79% fly ash, optionally in combination with an amount (in weight percent) of slag and/or metakaolin as described herein (e.g., Table A1 or Table A2). In some embodiments, the remainder of additional supplementary cementitious material(s) may comprise less than 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% fly ash, optionally in combination with an amount (in weight percent) of slag and/or metakaolin as described herein (e.g., Table A1 or Table A2). In some embodiments, the remainder of additional supplementary cementitious material(s) may comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, or 79% slag, optionally in combination with an amount (in weight percent) of fly ash and/or metakaolin as described herein (e.g., Table A1 or Table A2). In some embodiments, the remainder of additional supplementary cementitious material(s) may comprise less than 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% slag, optionally in combination with an amount (in weight percent) of fly ash and/or metakaolin as described herein (e.g., Table A1 or Table A2). In some embodiments, the remainder of additional supplementary cementitious material(s) may comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, or 79% metakaolin, optionally in combination with an amount (in weight percent) of slag and/or fly ash as described herein (e.g., Table A1 or Table A2). In some embodiments, the remainder of additional supplementary cementitious material(s) may comprise less than 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1% metakaolin, optionally in combination with an amount (in weight percent) of slag and/or fly ash as described herein (e.g., Table A1 or Table A2).

In producing the formed building materials, an amount of the sequestered-$CO_2$ component may be combined with water and other additional components, which may include, but are not limited to clay, shale, soft slate, calcium silicate, quarried stone, Portland cement, fly ash, slag cement, aggregate (e.g., blast furnace slag, bottom ash, gravel, limestone, granite, sand, etc.), silica fume, pozzolans, reinforcing materials, such as steal or polymeric structures, etc., and then shaped into the final desired building material structure. Fabrication protocols may include extrusion, with or without heat of dry powder, powder made into a paste with fresh water, slurry from reactor, etc. Also of interest are fabrication protocols that include the use of rollers, e.g., to make a sheet, or rollers with impressions to make shapes. In addition, compression molding fabrication protocols may find use, e.g., dry molding, adding some water and molding, followed in some instances with sintering, etc. Fabrication protocols may include adding water (with or without additional binders such as plastics, Portland cement, etc.) to a dry composition of sequestered-$CO_2$ component (e.g., precipitation material comprising carbonates, bicarbonates, or a combination thereof), and casting the articles. Certain protocols may include heating the material to produce a formed building material via water turning into internal steam. Also of interest are protocols where amounts of precipitation material are maintained in an outdoor location so that they get rained on, recycling fresh water through the material to dissolve the metastable form and reprecipitate as a stable form, letting it stand in water for a time at room or elevated temp, and then producing the formed material from the set product.

Material that is not used to produce formed building materials may be used as amorphous building material. As with formed building materials, a substantial carbon reduction may result from using amorphous building material. For example, a substantial carbon reduction may result from combining both the cement credit (i.e., the $CO_2$ avoided) from offsetting the use of Portland cement and the quantity of sequestered carbon from fossil point sources. Each ton of material comprising a sequestered-$CO_2$ component (e.g., component comprising carbonates, bicarbonates, or combinations thereof) may result in a $CO_2$ reduction of up to 1 ton or more, such as 1.2 tons or more, including 1.6 tons or more, for example 2 tons or more of $CO_2$. Various binary, ternary, quaternary, etc. blends comprising a sequestered-$CO_2$ component (e.g., component comprising carbonates, bicarbonate, or a combination thereof) may result in such reductions. Whether for a formed or amorphous building material, sequestered-$CO_2$ component may be employed as, for example, a cement substitute (or a partial cement substitute), in conjunction with fly ash, slag, and/or Portland cement to produce a blended cement with a low, neutral (i.e., zero), or negative carbon footprint. Such blended cement may also have a compressive strength at or above 1,000 psi, including at or above 2,000 psi, e.g., at or above, 2,500 psi in 28 days or less, e.g., 14 days or less. As such, a blended cement with a low, neutral, or negative carbon footprint may produce quality concrete suitable for use in concrete pavement applications.

Also provided herein are low, neutral, and negative carbon footprint concrete mixes for use as an amorphous building material or in a formed building material. In some embodiments, low, neutral, or negative carbon footprint concrete mixes comprise a blended cement (e.g., supplementary cementitious material comprising a sequestered-$CO_2$ component comprising carbonates, bicarbonates, or a combination thereof in conjunction with fly ash, slag, and/or Portland cement) and an aggregate (e.g., the aggregate being coarse aggregate; fine aggregate such as sand; etc.), which aggregate may be prepared from a sequestered-$CO_2$ component in accordance with U.S. patent application Ser. No. 12/475,378, filed 29 May 2009, which is incorporated herein by reference. Such compositions may include, for example, a fine aggregate (e.g., sand) that has a sequestered $CO_2$ content of approximately 20% or more, e.g., 35% or more, including 50% or more. In some embodiments, the compressive strength of the concrete low, neutral, or negative carbon concrete is 2,500 psi or more at 28 days, e.g., 3000 psi or more, including 4,000 psi at 28 days. Some embodiments provide a carbon negative footprint concrete, which exhibits compressive strengths of 4,000 psi at 28 days. Equal early strengths (i.e., at 28 days) allow for the use of low, neutral, or negative carbon footprint concrete without negatively affecting construction schedules.

Embodiments achieve a low, neutral, or negative carbon footprint concrete, which not only meets the strength and early strength criteria (above), but also finishes like normal concrete. Blended cement-concrete compositions behave in a fashion similar to conventional Portland cement-concrete compositions enabling the blended cement-concrete compositions to be used in similar places and for similar functions. In some embodiments, blended cement-concrete compositions may be used in formed building materials. In some embodiments, blended cement-concrete compositions may be used for amorphous building material. For example, blended cement-concrete compositions may be placed into parking areas (e.g. a 5,000 square foot parking lot). Blended cement-concrete compositions, due to the higher albedo of such compositions, reduce carbon emissions via reduced lighting demands. This reduction of carbon emissions may occur over the lifetime of the blended cement-concrete compositions. For example, albedo and luminance measurements of low, neutral, or negative carbon footprint concrete parking areas compared to asphalt parking areas may be used to determine the difference in lighting needed and, thus, the level of carbon reduction that is possible due to the use of higher albedo concrete compositions. Albedo tests of such compositions demonstrate urban heat island reduction abilities, e.g., by 2-fold or more, 5-fold or more, 10-fold or more, 20-fold or more.

Utility

Building materials find use in a variety of different applications. Specific structures in which the building materials find use include, but are not limited to: buildings (both commercial and residential), infrastructure, e.g., walls, sound barriers, pipes, etc., and other man-made structures.

The subject methods and systems find use in $CO_2$ sequestration, particularly via sequestration in the built environment. Sequestering $CO_2$ comprises removal or segregation of $CO_2$ from the gaseous stream, such as a gaseous waste stream, and fixating it into a stable non-gaseous form so that the $CO_2$ cannot escape into the atmosphere. $CO_2$ sequestration comprises the placement of $CO_2$ into a storage stable form, e.g., a component of the built environment, such as a building, road, dam, levee, foundation, etc. As such, sequestering of $CO_2$ results in prevention of $CO_2$ gas from entering the atmosphere and long-term storage of $CO_2$ in a manner that $CO_2$ does not become part of the atmosphere. By storage stable form is meant a form of matter that can be stored above ground or underwater under exposed conditions (i.e., open to the atmosphere, underwater environment, etc.) without significant, if any, degradation for extended durations, e.g., 1 year or longer, 5 years or longer, 10 years or longer, 25 years or longer, 50 years or longer, 100 years or longer, assuming the building material of interest is maintained in its normal environment of its intended use.

The following examples are put forth so as to provide those of ordinary skill in the art with a complete disclosure and description, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

EXAMPLES

Materials produced in accordance with this disclosure used one or more of the following analytical instruments and/or methods for characterization.

Coulometry: Liquid and solid carbon containing samples were acidified with 2.0 N perchloric acid ($HClO_4$) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of perchloric acid with a heated block to aid digestion of the sample.

Brunauer-Emmett-Teller ("BET") Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapor and other adsorbants from the sample surfaces. The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis ("PSA"): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction ("XRD"): Powder X-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90 °2θ, at a scan rate of 2 °2θ per min, and a step size of 0.01 °2θ per step. The X-ray diffraction profile was analyzed by Rietveld refinement using the X-ray diffraction pattern analysis software Jade™ (version 9, Materials Data Inc. (MDI)).

Fourier Transform Infrared ("FT-IR") spectroscopy: FT-IR analyses were performed on a Nicolet 380 equipped with the Smart Diffuse Reflectance module. All samples were weighed to 3.5±0.5 mg and hand ground with 0.5 g KBr and subsequently pressed and leveled before being inserted into the FTIR for a 5-minute nitrogen purge. Spectra were recorded in the range 400-4000 $cm^{-1}$.

Scanning Electron Microscopy ("SEM"): SEM was performed using a Hitachi TM-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis. EDS analysis was performed using an Oxford Instruments SwiftED™ system, the sensor for which has a detection range of 11Na-92U with an energy resolution of 165 eV.

Alternatively, SEM was performed using a Hitachi SU-6600 field emission microscope capable of operation at accelerating voltages ranging from 0.5-30 kV at working pressures ranging from 10-8-300 Pa. Available detectors include a SE, BSE, and ESED. EDX analysis utilized an Oxford Instruments INCA Energy SEM 350 Energy Dispersive Microanalysis system with a INCA X-ACT Analytical Drift Detector, having a detection range of Be—Pu and a resolution of 129 eV. Sample preparation involves fixation to a stage by means of either a carbon-based adhesive or silver paint. Non-conductive samples are coated with a thin layer of either gold or carbon prior to analysis.

Chloride: Chloride concentrations were determined with Chloride QuanTab® Test Strips (Product No. 2751340), having a testing range between 300-6000 mg chloride per liter solution measured in 100-200 ppm increments.

X-ray Fluorescence ("XRF"): XRF analyses of solid powder samples were performed using a Thermo Scientific ARL QUANT'X Energy-Dispersive XRF spectrometer, equipped with a silver anode X-ray source and a Peltier cooled Si(Li) X-ray detector. The samples were pressed into 31 mm pellets using an aluminum sample cup. For each sample, three different spectra were gathered, each tailored for analysis of specific elements: the first using no X-ray filter at 4 kV, the second using a thin silver filter at 18 kV, and the third using a thick silver filter at 30 kV, all under vacuum conditions. Spectra were analyzed using WinTrace software, using a Fundamental Parameters analysis method attained from calibration with certified standard materials.

Thermogravimetric Analysis ("TGA"): TGA analyses of solid powder samples were performed with a TA Instruments SDT Q600 with simultaneous TGA/DSC (Differential Scanning calorimetry). Samples, in an alumina crucible, were placed into a furnace that was heated from room temperature to 1000° C. at a constant ramp rate of 20° C. per minute. The weight loss profile over temperature was analyzed using Universal Analysis software.

Inductively Coupled Plasma Optical Emission Spectrometry ("ICP-OES"): ICP-OES analyses of typical acidified, liquid samples were performed using a Thermo ICAP 6500 equipped with a CETAC autosampler. iTEVA control software was used for data acquisition and analysis. Although the detection limit for this method has not been determined typical detection limits are in the ppm range. Samples that contain high concentrations of dissolved salts (Na, Ca, Mg) were analyzed using the ICAP 6500 equipped with an ESI SEA fast autosampler equipped with a chelation column for matrix elimination analyte preconcentration.

Example 1

Preparation of Precipitation Material for Use as Partial Cement Substitute in Concrete 900 gallons of seawater was pumped at approximately 20 gallons per minute into a 1000-gallon tank with a covered headspace. Open access ports open for agitation, instrumentation, tank entry, and reagent addition were located on the top of the tank. An array of gas spargers was located in the bottom for sparging a carbon dioxide/air mixture. Approximately 30% (v/v) of the gas mixture sparged through the reactor was carbon dioxide gas. The seawater was agitated with an overhead mixer as the gas was sparged into the tank at a total flow rate of 40-50 lpm. The initial seawater temperature ranged from 15 to 20° C.

An aqueous solution of 50% sodium hydroxide (w/w) was pumped into the agitated, sparging vessel to maintain a pH of approximately pH 9.0. An automatic controller to maintain the desired pH adjusted the flow rate of the sodium hydroxide.

After 12 kg of 50% sodium hydroxide was added to the agitated, sparging vessel, both the caustic addition and the carbon dioxide gas flow to the vessel were ceased. The air continued to be sparged into the vessel and agitation maintained until the gas lines were purged of carbon dioxide. The air sparging was then ceased, but agitation maintained to keep the slurry in suspension. The final slurry temperature ranged from 15 to 25° C.

The resultant slurry was pumped to another covered tank with a conical bottom and outlet port at the bottom. The slurry was allowed to settle overnight. The supernatant was decanted the next day, and the settled slurry vacuum filtered.

The filter cake was re-suspended in fresh water to generate a pump able slurry for spray drying. The slurry was spray dried and the product collected from the spray dryer product collection cyclone.

X-ray fluorescence ("XRF") (Table 8) and coulometry (Table 9) data indicate that the precipitation material is mostly composed of calcium carbonate.

TABLE 8

XRF elemental analysis of precipitation material

| | Na | Mg | Al | Si | S | Cl | K | Ca | Fe |
|---|---|---|---|---|---|---|---|---|---|
| Weight % | 1.44 | 0.27 | 0.22 | 0.24 | 0.14 | 1.52 | 0.01 | 37.99 | 0.14 |

TABLE 9

Percent $CO_2$ content (coulometry)

| | % $CO_2$ |
|---|---|
| Weight % | 40.85 |

X-ray diffraction ("XRD") analysis (FIG. 2) of the precipitation material indicates the presence of aragonite ($CaCO_3$) as the major phase, and halite (NaCl) as a minor component.

Scanning electron microscope (SEM) images of the precipitation material at 1000× (left) and 4000× (right) are provided as well (FIG. 3).

Example 2

Formed Materials

A. Concrete Cylinder (or Post)

A concrete cylinder was made from a batch of concrete prepared with spray-dried precipitation material such as that described in Example 1. The precipitation material was used as a partial cement substitute of Portland cement, replacing 17% by mass of the Portland cement. The batch was mixed in a small mixing drum using the following mix weights:

| | |
|---|---|
| Portland Cement | 13.98 lbs |
| Fly Ash | 3.55 lbs |
| Aragonite precipitate | 3.70 lbs |

| | |
|---|---|
| Water | 9.4 lbs |
| Sand | 45.74 lbs |
| Small coarse aggregate | 8.58 lbs |
| Medium coarse aggregate | 51.46 lbs |
| Large coarse aggregate | 8.58 lbs |

Cylinders measuring 4"×8" were formed according to ASTM C31. Each cylinder was consolidated in two equal layers and tamped 25 times each layer with a ⅜" rod. The cylinders were then finished with a concrete trowel and capped. The integrity of the cylinders allowed for cutting the cylinders into 0.75"-1.5" thick sections, which sections were then polished on both sides.

B. Concrete Tile (Modified Dimensions)

A filter cake of precipitation material prepared as in Example 1 was spray dried to a moisture content of approximately 4%. The spray-dried material was then dry blended with ordinary type-V Portland cement in a 4:1 ratio (ordinary Portland cement:spray-dried precipitation material) to obtain a total cementitious mixture. The total cementitious mixture was combined with fine aggregate, coarse aggregate, and water to form a concrete mixture. The products were mixed together in a small concrete mixing drum. The amounts added were as follows: 48.4 lb total cementitious (9.7 lb carbonate aragonite, 38.7 lb type-V Portland cement), 24.2 lb tap water, 111 lb fine aggregate, and 136 lb coarse aggregate. The concrete mixture was removed from the mixing drum into a wheelbarrow. The concrete was then scooped from the wheelbarrow into forms of the tile. The tile dimensions were 609.6 mm×609.6 mm×88.9 mm, approximately three times thicker (i.e., "modified") than tiles described hereinabove. The concrete was consolidated into the forms using a ⅝" tamping rod to prevent bug-holes. The tile was screeded and smooth-trowel finished. The following day, forms were removed yielding a modified concrete tile.

C. Paver

This study is related to using a carbonate composition to make pavers. The carbonate composition was prepared by blending six batches of the carbonate compositions that were prepared using similar conditions and reagents. Carbonate compositions were prepared by mixing brine solution (containing 0.19M Ca in sea water) with alkaline solution (containing 0.5M NaOH, pH 10.8-11.2 and carbonate obtained by mixing $CO_2$ in NaOH solution) in a 15-gallon precipitation tank. The dewatering was carried out using Lamella and Andritz and the composition was spray dried. The slurry in the tank or the precipitator showed particle size analysis (PSA) of 4.2 µm at 2.4 std; and vaterite with trace amount of calcite. The slurry in Lamella showed PSA of 7 µm at 3.5 std; and vaterite with trace amount of calcite. The slurry in Andritz showed PSA of 3.7 µm at 2.6 std and detectable amount of calcite. The dried materials showed mean particle size 3.5 µm; BET 12 m2/g; 83% vaterite; and 17% calcite.

The blended carbonate composition, after treatment with water, was poured as a paver.

Some of the data related to composition containing 20% carbonate composition (as described above to be a blend of six compositions) and 80% OPC, is as provided below in Table 10.

TABLE 10

Data related to composition containing 20% carbonate composition.

| Property | Method | GU Spec. | 20% carbonate composition + 80% OPC |
|---|---|---|---|
| Flow | ASTM C1437 | 110 +/− 5% | 89% @ 0.49 |
| Vicat set time, min | ASTM C191 | 45-240 | 51 |
| 1 day compression, psi | ASTM C109 | N/A (1740 for HE) | 1940 (98%) |
| 3 days compression, psi | ASTM C109 | 1890 | 3150 (99%) |
| 7 days compression, psi | ASTM C109 | 2900 | 3940 (93%) |
| Air content of mortar, % | ASTM C185 | Report Value | 4% |

D. Paver

This study is related to using a carbonate composition to make pavers. The carbonate composition was prepared by blending three batches of the carbonate compositions that were prepared using similar conditions and reagents.

Carbonate composition 1 was prepared by mixing brine solution (containing 0.17M Ca, 0.02M Mg (Mg as $MgCl_2$), and 0.01M $SO_4$ ($Na_2SO_4$ as sulfate source) in municipal water) with alkaline solution (containing 0.5M NaOH, pH 10.7-10.9 and carbonate obtained by mixing $CO_2$ in NaOH solution) in a 15-gallon precipitation tank with an inline mixer.

Carbonate composition 2 was prepared by mixing brine solution (containing 0.2M Ca, 0.01M Mg (Mg as $MgCl_2$), and 0.01M $SO_4$ ($Na_2SO_4$ as sulfate source) in municipal water) with alkaline solution (containing 0.5M NaOH, pH 10.7-10.9 and carbonate obtained by mixing $CO_2$ in NaOH solution) in a 15-gallon precipitation tank with an inline mixer.

Carbonate composition 3 was prepared by mixing brine solution (containing 0.2M Ca, 0.01M Mg (Mg as $MgCl_2$), and 0.01M $SO_4$ ($Na_2SO_4$ as sulfate source) in municipal water) with alkaline solution (containing 0.5M NaOH, pH 10.7-10.9 and carbonate obtained by mixing $CO_2$ in NaOH solution) in a 15-gallon precipitation tank with an inline mixer.

The three carbonate compositions were blended together. The carbonate composition thus obtained, was mixed with OPC and slag such that the mix design was 40% OPC, 40% slag, and 20% carbonate composition. The blended composition, after treatment with water and aggregate, was poured in a paver mold and compressed. When ready, the pavers were removed from the molds and stored on racks to cure. Table 11 illustrates compressive strength of the Ordinary Portland cement alone and when mixed with the carbonate composition.

TABLE 11

Properties for paver mixes using ordinary Portland cement (OPC) mix alone and mixed with the carbonate composition.

| | Paver mix with OPC alone | Paver mix with blend of OPC and carbonate composition |
|---|---|---|
| OPC | 460 lb/yd³ | 185 lb/yd³ |
| carbonate composition | 0 | 275 lb/yd³ |
| water/cement ratio | 0.39 | 0.36 |
| 1 day compressive strength | 3210 psi | 2410 psi |
| 7 day compressive strength | 6820 psi | 8380 psi |

TABLE 11-continued

Properties for paver mixes using ordinary Portland cement (OPC) mix alone and mixed with the carbonate composition.

|  | Paver mix with OPC alone | Paver mix with blend of OPC and carbonate composition |
|---|---|---|
| 28 day compressive strength | 8550 psi | 10,090 psi |

E. Paver

This study is related to using a carbonate composition to make pavers. The carbonate composition was prepared using similar reagents and conditions as given in the foregoing examples. The carbonate composition (about 99% mono-dispersed vaterite; about 2.5 micron particle size), was mixed with OPC and slag (XRF: $Al_2O_3$ 11%, $SiO_2$ 30%, CaO 45%; BET 107 $m^2/g$; PSA 8 μm; XRD: amorphous, anhydrite—$CaSO_4$) such that the mix design was 40% OPC, 40% slag, and 20% carbonate composition. The blended composition, after addition of aggregate, and treatment with water (water: cement ratio of 0.39), was poured in a paver mold and compressed. When ready, the pavers were removed from the molds and stored on racks. The pavers were cured without additional heat or humidity. XRD showed formation of monocarbonaluminate from addition of the carbonate composition. Table 12 provides the compressive strength of the pavers, tested in accordance with ASTM C140-8A, Section 7:

TABLE 12

Properties for pavers comprising 40% OPC, 40% slag, and 20% carbonate composition.

| Paver | Area (in$_2$) | Max load (lbs) | Compressive Strength |
|---|---|---|---|
| 1 | 33.92 | 327,000 | 9640 |
| 2 | 34.00 | 309,000 | 9090 |
| 3 | 34.02 | 343,000 | 10080 |
| 4 | 33.80 | 344,500 | 10190 |
| 5 | 31.73 | 265,500 | 8370 |
| 6 | 33.88 | 306,000 | 9030 |
| 7 | 33.71 | 312,000 | 9260 |
| 8 | 33.92 | 351,000 | 10350 |

All examples and conditional language recited herein are principally intended to aid the reader in understanding the principles and the concepts contributed by the inventors to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein as such embodiments are provided by way of example only. Indeed, numerous variations, changes, and substitutions may now occur to those skilled in the art without departing from the invention. It is intended that the following claims define the scope of the invention and that methods and structures within the scope of these claims and their equivalents be covered thereby.

What is claimed is:

1. A lightweight construction panel, comprising: at least 50% w/w sequestered-$CO_2$ component, wherein the sequestered-$CO_2$ component comprises metastable carbonate selected from the group consisting of vaterite, aragonite, and combination thereof, wherein the sequestered-$CO_2$ component has a $\delta^{13}$ C less than -15%, and wherein the lightweight construction panel has a porosity of at least 30%.

2. The lightweight construction panel of claim 1, wherein the construction panel has a porosity of between 30-90%.

3. The lightweight construction panel of claim 1, wherein the construction panel further comprises one or more additives selected from anti-desiccant, plasticizer, fibrous material, accelerator, set retarder, foaming agent, mildew resistance agent, fire resistance agent, and polyvinyl alcohol.

4. The lightweight construction panel of claim 1, wherein the construction panel further comprises recycled material selected from fly ash, slag, cement kiln dust, and combinations thereof.

5. The lightweight construction panel of claim 1, wherein the construction panel comprises between 50-99% w/w carbonate or combination of carbonate and bicarbonate.

6. The lightweight construction panel of claim 1, wherein the construction panel further comprises at least one additional component selected from clay, shale, soft slate, calcium silicate, quarried stone, Portland cement, metakaolin, cement, aggregate, silica fume, and pozzolan.

7. The lightweight construction panel of claim 1, wherein the construction panel is a cement board.

8. The lightweight construction panel of claim 7, wherein the cement board has a flexural strength of between 1-7.5 MPa, compressive strength of between 5-50 MPa, or both.

9. The lightweight construction panel of claim 1, wherein the construction panel is a drywall product.

10. The lightweight construction panel of claim 1, wherein the construction panel is a fiber-cement siding.

11. The lightweight construction panel of claim 10, wherein the fiber-cement siding has a flexural strength of between 0.5-5 MPa, compressive strength of between 2-25 MPa, or both.

12. A method for producing a construction panel, comprising:
a) processing a waste gas stream comprising carbon dioxide with a process water to produce a composition wherein the composition comprises a metastable carbonate comprising vaterite, wherein the vaterite has a $\delta^{13}$ C less than -15%;
b) producing a slurry mixture from the composition; and
c) processing the slurry mixture to form a lightweight construction panel wherein the construction panel comprises at least 50% w/w aragonite and has a porosity of between 30-90%.

13. The method of claim 12, comprising transforming the vaterite to aragonite when the lightweight construction panel is formed.

14. The method of claim 12, further comprising concentrating the composition to dryness to produce a dry composition.

15. The method of claim 12, wherein the method further comprises adding one or more additives to the slurry mixture, wherein the one or more additives are selected from the group consisting of anti-desiccant, fibrous material, accelerator, set retarder, plasticizer, foaming agent, polyvinyl alcohol, fire resistance agent, and mildew resistance agent.

16. The method of claim 12, wherein the method further comprises adding recycled material to the slurry mixture wherein the recycled material is selected from the group consisting of fly ash, slag, cement kiln dust, and combinations thereof.

17. The method of claim 12, further comprising depositing the slurry mixture in a mold without backing material, or between two sheets of backing material, wherein the backing material comprises sheets of paper or fiberglass.

18. A lightweight construction panel produced in accordance with method claim 12.

19. The method of claim 12, wherein the method further comprises adding at least one additional component to the slurry mixture selected from clay, shale, soft slate, calcium silicate, quarried stone, Portland cement, metakaolin, cement, aggregate, silica fume, and pozzolan.

20. The method of claim 12 wherein the lightweight construction panel is cement board, fiber-cement siding, or drywall.

21. The lightweight construction panel of claim 9, wherein the drywall has a flexural strength of between 0.1-3 MPa, compressive strength of between 1-40 MPa, or both.

22. The lightweight construction panel of claim 9, wherein the drywall product further comprises paper pulp.

23. The lightweight construction panel of claim 9, wherein the drywall product has a flexural strength between 0.1 to 3 MPa.

24. The lightweight construction panel of claim 9, wherein the drywall product does not comprise paper.

25. The lightweight construction panel of claim 9, wherein the drywall product further comprises two sheets of paper or fiberglass on an exterior of the drywall product.

* * * * *